United States Patent
Genda et al.

(10) Patent No.: US 12,443,040 B2
(45) Date of Patent: Oct. 14, 2025

(54) LOUVER, HEAD MOUNTED DISPLAY, AND OPTICAL APPARATUS

(71) Applicant: CANON KABUSHIKI KAISHA, Tokyo (JP)

(72) Inventors: Hideo Genda, Tokyo (JP); Ryoshu Iura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 17/861,330

(22) Filed: Jul. 11, 2022

(65) Prior Publication Data
US 2023/0031619 A1    Feb. 2, 2023

(30) Foreign Application Priority Data

Jul. 16, 2021 (JP) .................. 2021-118034
Mar. 22, 2022 (JP) .................. 2022-045093
Jun. 17, 2022 (JP) .................. 2022-097691

(51) Int. Cl.
*G02B 17/00* (2006.01)
*G02B 5/00* (2006.01)
*G02B 27/01* (2006.01)

(52) U.S. Cl.
CPC ......... *G02B 27/0172* (2013.01); *G02B 5/005* (2013.01)

(58) Field of Classification Search
CPC ............ G02B 17/006; G02B 2207/123; G02B 19/0019
See application file for complete search history.

(56) References Cited

U.S. PATENT DOCUMENTS

| 5,661,603 A | * | 8/1997 | Hanano | G02B 30/35 |
| | | | | 359/628 |
| 2012/0234371 A1 | * | 9/2012 | Zhang | H10F 77/488 |
| | | | | 136/246 |

FOREIGN PATENT DOCUMENTS

| CN | 102683462 A | 9/2012 |
| CN | 105467636 A | 4/2016 |
| JP | H08-129146 A | 5/1996 |
| JP | H11-023812 A | 1/1999 |
| JP | H11-95160 A | 4/1999 |
| JP | 2005-084172 A | 3/2005 |
| JP | 2009-075266 A | 4/2009 |

OTHER PUBLICATIONS

Dec. 1, 2013, 2022 European Official Action in European Patent Appln. No. 22184641.3.
Dec. 19, 2023 Japanese Official Action in Japanese Patent Appln. No. 2022-097691.
Jun. 9, 2025 Chinese Official Action in Chinese Patent Appln. No. 202210835000.8.

* cited by examiner

*Primary Examiner* — Joseph P Martinez
(74) *Attorney, Agent, or Firm* — Venable LLP

(57) ABSTRACT

A louver includes a light blocking portion having a first surface and a second surface and a base portion made of a transparent material. The light blocking portion is formed in the base portion, being made of a light blocking material. The second surface is a surface that is in contact with the transparent material and that is located on an outer-edge side of the base portion. The first surface is a surface that is in contact with the transparent material and that is opposite to the second surface. A surface roughness of the first surface is larger than a surface roughness of the second surface.

4 Claims, 24 Drawing Sheets

LOUVER, HEAD MOUNTED DISPLAY, AND OPTICAL APPARATUS

BACKGROUND OF THE INVENTION

Field of the Invention

The present invention relates to a head mounted display, a louver used in an optical apparatus such as the head mounted display, and a method of manufacturing the louver.

Description of the Related Art

In a variety of fields including the virtual reality, head mounted displays have been used in recent years. The head mounted display has more advantageous features than those of the direct-view flat-panel display and the projection display that projects images. For example, the head mounted display can display an image viewed by a user in a desired direction, and superimpose an image on an image of the outside world that is seen at a position of a user.

As schematically illustrated in FIG. 15, a head mounted display includes a display panel 21 that displays an image, and an optical element 22 that focuses display light IMG from the display panel 21, at or near a user's eye 24. Note that FIG. 15 is a conceptual schematic diagram. Thus, for example, an optical-path changing element, such as a mirror or a polarizing beam splitter (PBS), may be disposed between the display panel 21 and the user's eye 24; and the display panel 21 and the optical element 22 may be disposed at different positions. The optical element 22 may be a transmissive optical element such as a convex lens, a reflective optical element such as a concave mirror, or a combination thereof.

By the way, for improving the visibility of users, it is proposed that a louver is disposed in the housing of a head mounted display.

For example, Japanese Patent Application Publication No. H11-95160 proposes a configuration in which a louver that has a light blocking effect is disposed on a combiner of a head mounted display. The combiner is used for combining the external light coming from a front direction and the display light from a displayed image.

In addition, Japanese Patent Application Publication No. 2009-75266 discloses a technology for reducing the ghost, which is a double image displayed on the screen.

For providing easy-to-see images for a user in a head mounted display, it is necessary to send the display light from the display panel to the user's eyes with less loss and disturbance and prevent the external light and the stray light, produced in the head mounted display, from reaching the user's eyes as much as possible.

However, it is difficult for the louvers disclosed in Japanese Patent Application Publication No. H11-95160 and Japanese Patent Application Publication No. 2009-75266, to sufficiently achieve the above-described aims.

SUMMARY OF THE INVENTION

According to a first aspect of the present invention, a louver includes a light blocking portion having a first surface and a second surface and a base portion made of a transparent material. The light blocking portion is formed in the base portion, being made of a light blocking material. The second surface is a surface that is in contact with the transparent material and that is located on an outer-edge side of the base portion. The first surface is a surface that is in contact with the transparent material and that is opposite to the second surface. A surface roughness of the first surface is larger than a surface roughness of the second surface.

According to a second aspect of the present invention, a louver includes a light blocking portion. The light blocking portion is formed in a base portion made of a transparent material, being made of a light blocking material. A surface roughness Ra of a third surface is smaller than 20 nm. The third surface is an end surface of the light blocking portion in contact with the transparent material on an eye side.

According to a third aspect of the present invention, a louver includes a first light blocking portion being made of a light blocking material, a base portion made of a transparent material, and a second light blocking portion made of a light blocking material. The first light blocking portion is formed in the base portion. The second light blocking portion is formed on at least part of a side surface of the base portion.

Further features of the present invention will become apparent from the following description of exemplary embodiments with reference to the attached drawings.

DESCRIPTION OF THE EMBODIMENTS

Figure 1:
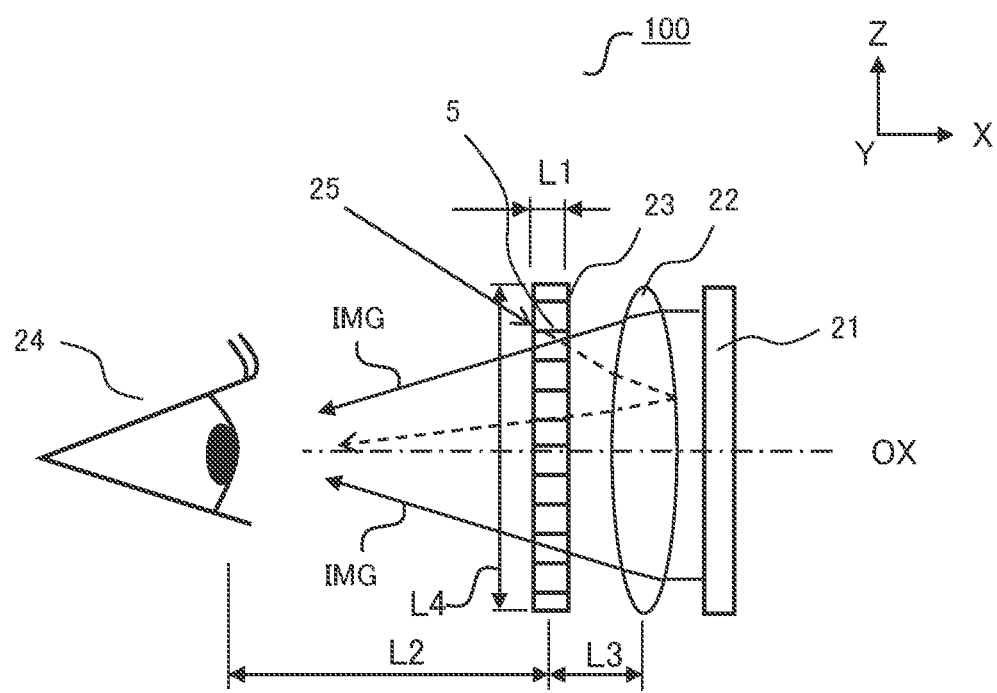
FIG. 1 is a schematic diagram illustrating a configuration of an optical system of a head mounted display of a first embodiment.

Next, a head mounted display of an embodiment of the present invention, a louver used in the head mounted display, and the like will be described with reference to the accompanying drawings. Note that since the embodiments described below are examples, detailed configurations and the like can be modified as appropriate by a person skilled in the art without departing from the spirit of the present invention. In addition, in the drawings referred to in the description of the following embodiments and examples, a component given an identical reference numeral has an identical function, unless otherwise specified.

First Embodiment

Optical System of Head Mounted Display

FIG. 1 is a schematic diagram illustrating a configuration of an optical system of a head mounted display 100 of a first embodiment. Note that since FIG. 1 is a schematic diagram for illustrating a configuration of the optical system, components for mounting the head mounted display 100 on a user's head, a housing, a communication portion for transmitting/receiving image information, a power supply portion, and the like are not illustrated in FIG. 1.

FIG. 1 illustrates a display panel 21 that serves as a display portion, an optical element 22 that serves as an optical portion, a louver 23, and a user's eye 24. The head mounted display 100 includes a single optical-system unit for a right eye, and a single optical-system unit for a left eye. Thus, a display panel for the unit for a right eye displays an image for the right eye, and a display panel for the unit for a left eye displays an image for the left eye. FIG. 1 illustrates the single optical-system unit for a right eye or the single optical-system unit for a left eye. The display panel 21 may be an organic electroluminescence panel or a liquid crystal panel.

The optical element 22, which serves as an optical portion, focuses display light IMG emitted from the display panel 21, at or near a user's eye, so that the user recognizes an image displayed on the display panel 21, as an enlarged image having a distance of distinct vision. The optical element 22 is disposed on the optical path of the display light IMG extending from the display panel 21 to the position of the user's eye 24, such that an optical axis OX of the optical element 22 connects the center of the display panel 21 and the position of the user's eye 24. Typically, the optical element 22 is a single convex lens. However, the optical element 22 may be a lens system in which a plurality of lenses is combined with each other so as to have the positive power as a whole. In addition, in a case where the optical element 22 is a lens system, the optical element 22 may include a component that does not have a function to form an image. For example, the optical element 22 may include a component having a function that causes the light from the whole of the display panel 21, to be incident on a user's eye in an efficient manner.

The louver (louver element) 23 is a plate-like member disposed in an optical-path space through which the optical path of the display light IMG passes from the optical element 22 to the user's eye. In other words, the louver 23 is disposed on the optical path of the display light IMG extending from the optical portion (that directs the display light outputted from the display panel, toward the user's eye) toward the user's eye.

The louver 23 contains a plurality of light blocking portions. As described later with reference to FIG. 3B, when viewed from the direction of the optical axis OX of the optical element 22, the plurality of light blocking portions of the louver 23 are formed along a plurality of concentric circles having different diameters. The louver 23 is disposed such that the center of the concentric circles is positioned on the optical axis OX of the optical element 22. In FIG. 1, the length of the louver 23 along the optical axis OX is denoted by L1. In addition, the distance from the position of the user's eye 24 to the center of the louver 23 along the optical axis OX is denoted by L2, and the distance from the center of the louver 23 to the center of the optical element 22 is denoted by L3. Note that the center of the louver 23 is a center of a light blocking portion 5 obtained when the louver 23 is viewed along the optical axis OX. Preferably, the length L1 is set in a range equal to or larger than 0.3 mm and equal to or smaller than 3 mm, the distance L2 is set in a range equal to or smaller than 30 mm, and the distance L3 is set in a range equal to or larger than 5 mm and equal to or smaller than 25 mm. In addition, a length L4 of the louver 23 in the vertical direction is set so that the louver 23 covers the cross section of the optical path of the display light IMG that travels from the optical element 22 toward the user's eye.

The light blocking portion 5 of the louver 23 is disposed at a position and posture that allows the light blocking portion 5 to block external light 25 while transmitting most of the display light IMG. The external light 25 is light that travels toward the optical element 22, and the display light IMG is light that travels from the optical element 22 toward the user's eye 24. The external light 25, indicated by a solid line in FIG. 1, reaches the light blocking portion 5 of the louver 23; but is blocked by the light blocking portion 5. Thus, the external light 25 does not travel along an optical path indicated by a dotted line, so that the external light 25 hardly reaches the user's eye 24, as an external-light ghost.

Figure 2:
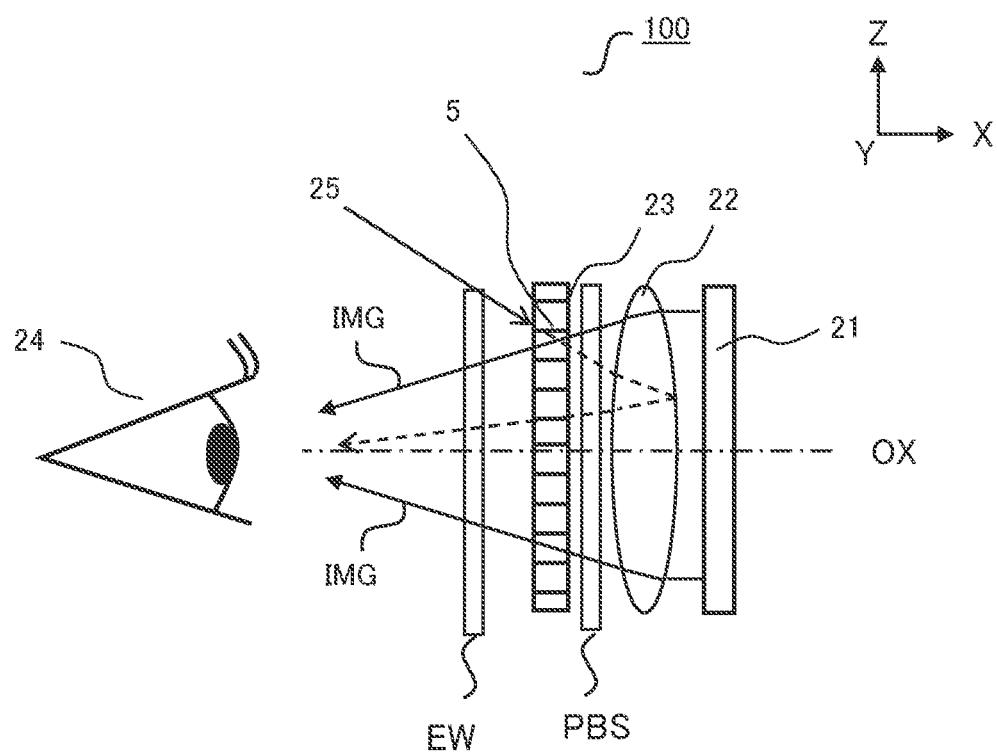
FIG. 2 is a schematic diagram illustrating a configuration of an optical system of a head mounted display of a modification of the first embodiment.

Note that the head mounted display 100 may further include an optical element. For example, as illustrated in FIG. 2, the head mounted display 100 may include a polarizing beam splitter (PBS) between the optical element 22 and the louver 23. Additionally or alternatively the head mounted display 100 may include a window member EW (that is a transparent plate member) between the louver 23 and the user's eye 24, for protecting the interior of the apparatus from dust or the like. Even in such a case, the louver 23 of the present embodiment is disposed in an optical-path space through which the optical path of the display light IMG passes from the optical element 22 toward the user's eye.

Figure 4:
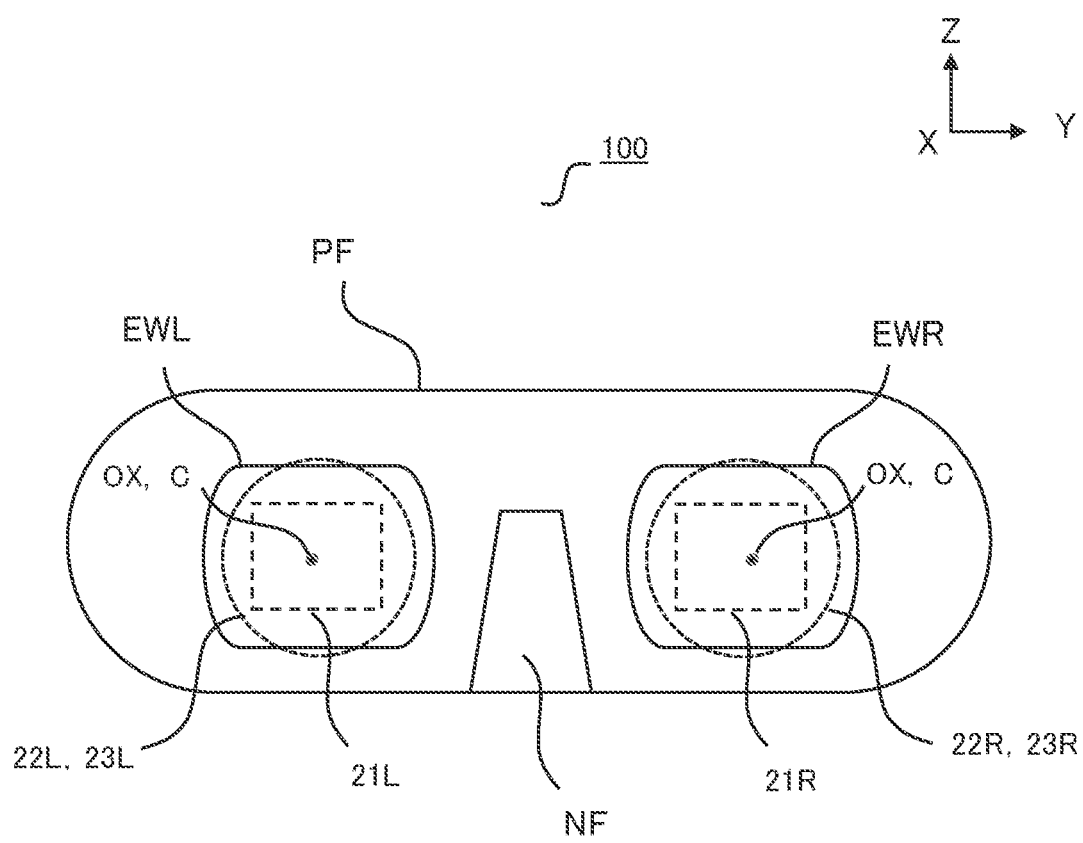
FIG. 4 is a plan view in which a head mounted display of the first embodiment is viewed from a user side.

FIG. 4 is a plan view in which the head mounted display 100 of the present embodiment is viewed from a user side. Note that since FIG. 4 is a schematic diagram for illustrating a configuration of the optical system, components for mounting the head mounted display 100 on a user's head, a communication portion for transmitting/receiving image information, a power supply portion, and the like are not illustrated in FIG. 4.

A frame (frame portion) PF is made of a light blocking material, and functions as a housing that supports a display panel and an optical member. The frame PF serves also as a cover that blocks the external light coming from a front direction. In the frame PF, a nose-pad portion NF is formed for positioning the head mounted display 100 with respect to a user's face. For a user's right eye, a window member EWR, a louver 23R, an optical system 22R, and a display panel 21R are disposed in this order from a user's face side. For a user's left eye, a window member EWL, a louver 23L, an optical system 22L, and a display panel 21L are disposed in this order from a user's face side. Note that if the louver 23 serves also as the window member, as illustrated in FIG. 1, that protects the interior of the apparatus from dust or the like, the window members EWR and EWL may not be disposed.

Preferably, the aspect ratio of each of the display panels 21R and 21L is 4:3 or 16:9. However, the present disclosure is not limited to this. The display panel, the image-forming optical system, and the louver are disposed such that in a plan view in which the head mounted display 100 is viewed from a user side, the center of the display panel, the optical axis OX of the image-forming optical system, and a center line C of the louver overlap with each other. However, for causing the convergence, the center of the display panel, the optical axis OX of the image-forming optical system, and the center line C of the louver may be slightly shifted from each other.

In addition, as illustrated in FIG. 4, the outer shape of the louver may be made substantially equal to the outer shape of the image-forming optical system (e.g., the outer shape of a convex lens or a concave mirror). In this case, increasing the use efficiency of the display light and blocking the external light can be both achieved with good balance.

Louver

Figure 3A:
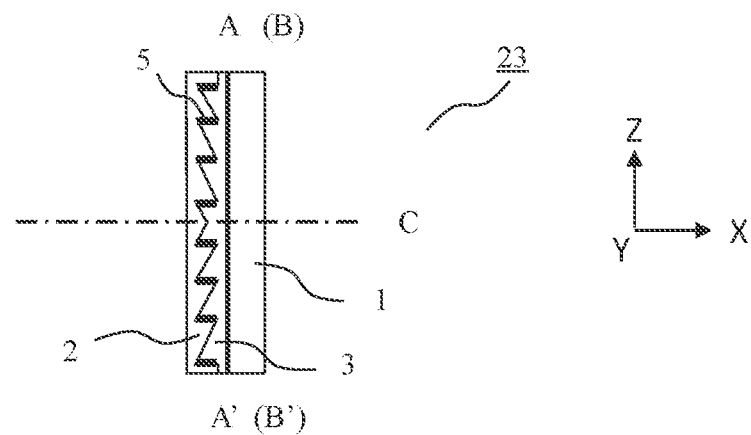
FIG. 3A is a schematic cross-sectional view illustrating a cross section of a plate-like louver 23, taken along a direction perpendicular to a main surface of the louver 23.
Figure 3B:
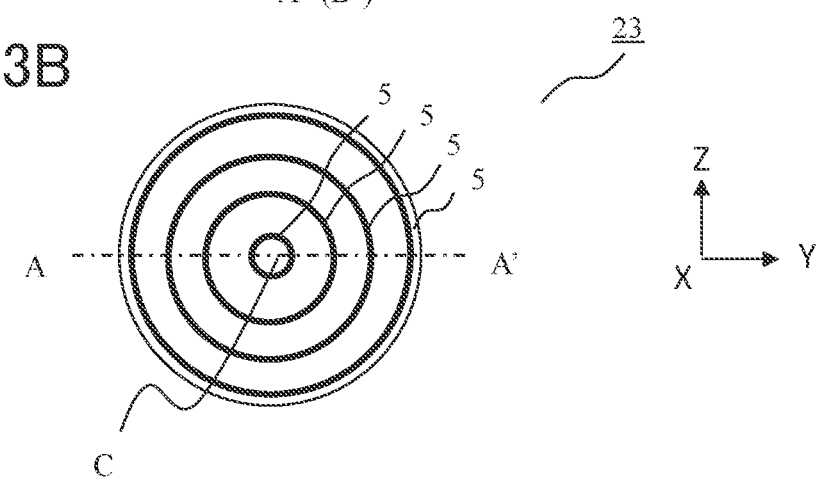
FIG. 3B is a plan view of the louver 23 in which a main surface of the louver 23 is viewed from a direction of an optical axis OX.

Next, the louver (louver element) 23 will be described in detail with reference to the accompanying drawings. FIG. 3A is a schematic cross-sectional view illustrating a cross section of the plate-like louver 23, taken along a direction perpendicular to a main surface of the louver 23. FIG. 3B is a plan view in which a main surface of the plate-like louver 23 is viewed from the direction of the optical axis OX illustrated in FIG. 1. Note that the cross-sectional view of FIG. 3A illustrates a cross section of the louver 23, taken along a line A-A' of FIG. 3B. In each of FIGS. 3A and 3B, a coordinate system that corresponds to the XYZ coordinate system illustrated in FIG. 1 is provided for showing the posture of the louver 23 mounted in the head mounted display 100.

The center line C is a line that passes through a center point of the louver 23 located in a plan view of the louver 23, and that is perpendicular to a main surface of the louver 23. In FIG. 3A, the center line C is indicated by an alternate long and short dashed line. The louver 23 is mounted in the head mounted display 100 such that the center line C is substantially equal to the optical axis OX of the optical element 22.

The louver 23 is a plate-like optical element, as a whole. Specifically, the louver 23 is an optical element in which a substrate 1 made of transparent material, a first base portion 2 made of transparent resin material, a second base portion 3 made of transparent resin material, and the light blocking portion 5 made of a light blocking material are integrated with each other. Note that in the following description, the first base portion 2, the second base portion 3, and the light blocking portion 5 may be collectively called a louver body. In addition, the first base portion 2 and the second base portion 3 may be collectively and simply called a base portion.

In the embodiment illustrated in FIG. 3A, the louver 23 includes the substrate 1. However, if the mechanical strength of the louver 23 is ensured by the louver body alone, the louver 23 may not include the substrate 1, and may be constituted by the first base portion 2, the second base portion 3, and the light blocking portion 5. In contrast, if the louver body is required to be protected more securely, another substrate 1 may be disposed on the first base portion 2 side, in addition to the substrate 1 disposed on the second base portion 3 side. In this case, the louver body may be held between the two substrates 1.

Hereinafter, the substrate and the louver body will be described in this order, and after that, the surface roughness of the light blocking portion that is a feature of the present embodiment will be described in detail.

Substrate

The substrate 1 may be made of any one of a glass material and an optical resin material as long as the glass material and the optical resin material have desired optical properties, such as transparency. If the importance is placed on less variation of properties (reliability, durability), the glass material is suitably used. The glass material may be one of various glass materials including a commonly used optical glass, a quartz glass, and a glass ceramic. Examples of the optical glass include a silicate glass, borosilicate glass, and a phosphate glass. If the importance is placed on costs or weight reduction, a resin is suitable used. Examples of the resin include a thermoplastic resin, a thermosetting resin, an ultraviolet curable resin, and a two-component curable resin. Examples of the thermoplastic resin include polymethylmethacrylate (PMMA), polycarbonate, polystyrene, MS resin, AS resin, polyolefin such as polyethylene or polypropylene, polyester such as polyethylene terephthalate or polybutylene terephthalate, polyvinyl chloride, cellulose acylate, thermoplastic elastomer, and cycloolefin polymer. Examples of the thermosetting resin include phenol resin. The resin used for the substrate 1 may be one of the above-described resins, or may be two or more of the above-described resins. The substrate 1 may be made by using, for example, a thermal imprint method, an optical imprint method, an extrusion molding method, or an injection molding method.

The main surface of the substrate 1 in a cross-sectional view may not necessarily be a flat surface as illustrated in FIG. 3A, and may be a concave spherical surface, a convex spherical surface, an axially symmetric aspherical surface, or the like. In addition, the outer shape of the substrate 1 viewed from the direction perpendicular to the main surface of the substrate 1 (that is, a direction extending along the center line C) may be one of various shapes. For example, the outer shape of the substrate 1 may be selected from a circular shape and a rectangular shape.

Louver Body

The louver body includes the first base portion 2, the second base portion 3, and the light blocking portion 5. As illustrated in FIG. 3A, a main surface of the first base portion 2 on a side (i.e., on the user's eye side) from which the display light IMG is outputted in a state where the louver 23 is assembled to the head mounted display 100 is a flat surface. In addition, a main surface (that faces the second base portion 3) of the first base portion 2 on a side toward which the display light IMG is transmitted has concave and convex portions. A main surface of the second base portion 3 on a side (i.e., on the optical element 22 side) toward which the display light IMG is transmitted is a flat surface, and a main surface (that faces the first base portion 2) of the second base portion 3 on a side from which the display light IMG is outputted has concave and convex portions. Note that if the main surface of the substrate 1 is not flat in a cross-sectional view, the above-described flat surfaces of the first base portion 2 and the second base portion 3 are changed to surfaces (non-flat surfaces) in accordance with the shape of the main surface of the substrate 1.

The concave and convex portions of the first base portion 2 and the concave and convex portions of the second base portion 3 fit in each other or are in contact with each other, and the first base portion 2 and the second base portion 3 are integrated with each other. The material of the first base portion 2 and the material of the second base portion 3 have a substantially identical refractive index. Preferably, the first base portion 2 and the second base portion 3 are made of an identical type of resin material. The resin material may be any one of resin materials as long as the resin materials have sufficient optical properties, such as transmittance, and sufficient reliability. Preferably, a photosensitive resin material is suitably used because the base portion can be easily manufactured by using the photosensitive resin material. Specifically, an acrylate-based resin, a polycarbonate resin, or the like is suitably used. The optical resin material may contain inorganic fine particles for achieving predetermined optical properties. The type of the inorganic fine particles contained in the optical resin material is selected in consideration of desired optical properties. Specifically, examples of the type of the inorganic fine particles include zirconia oxide, titanium oxide, zinc oxide, indium oxide, tin oxide, antimony oxide, indium tin oxide (ITO), antimony-doped tin oxide (ATO), and zinc-doped indium oxide (IZO).

The concave and convex portions of the first base portion 2 and the concave and convex portions of the second base portion 3 may have any shape as long as the concave and convex portions of the first base portion 2 and the concave and convex portions of the second base portion 3 can fit in each other or be in contact with each other and can form the light blocking portion 5 at a predetermined position and posture, as described later. As illustrated in FIG. 3A, the cross-sectional shape of the concave and convex portions is preferably a sawtooth shape in which triangles are aligned with each other. However, the cross-sectional shape may be another shape. For example, the cross-sectional shape may be a shape in which triangles such as isosceles triangles or right triangles, rectangles, trapezoids, semicircles, or the like are continuously aligned with each other. In addition, when viewed from the direction of the optical axis OX illustrated in FIG. 1, the concave and convex portions are formed along a plurality of concentric circles having different diameters.

When a portion in which the first base portion 2 and the second base portion 3 fit in each other or are in contact with each other is viewed along a Z direction, portions in each of which the first base portion 2 and the second base portion 3 are in contact with each other, and portions 4 in each of which the light blocking portion 5 is held between the first base portion 2 and the second base portion 3 are alternately formed. In other words, when viewed along the Z direction, base portions made of the transparent resin material and the light blocking portions are alternately formed. Note that the Z direction is, in other words, a direction parallel to the main surface, a direction orthogonal to the center line C, or the vertical direction.

Figure 5A:
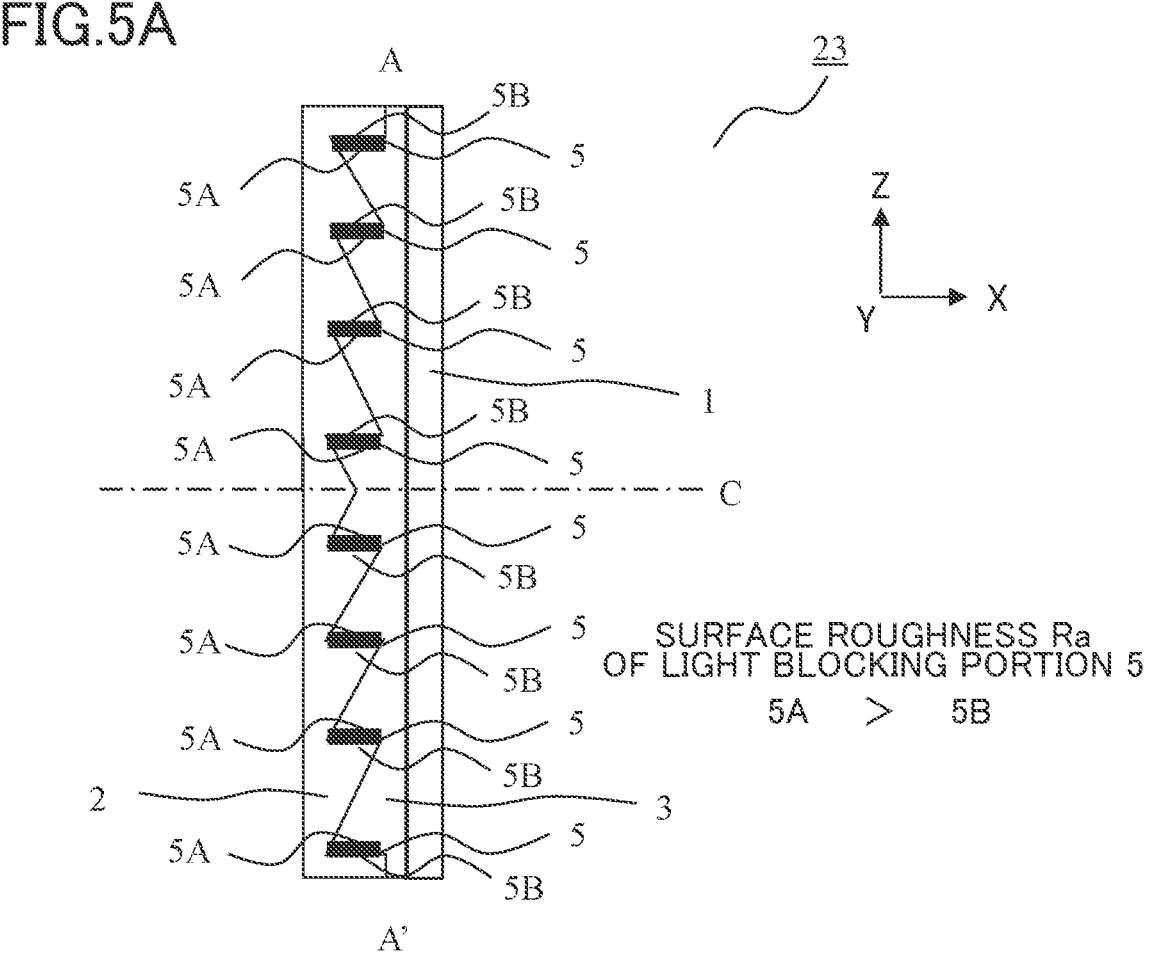
FIG. 5A is a cross-sectional view of a louver for illustrating surface roughness of a light blocking portion.
Figure 5B:
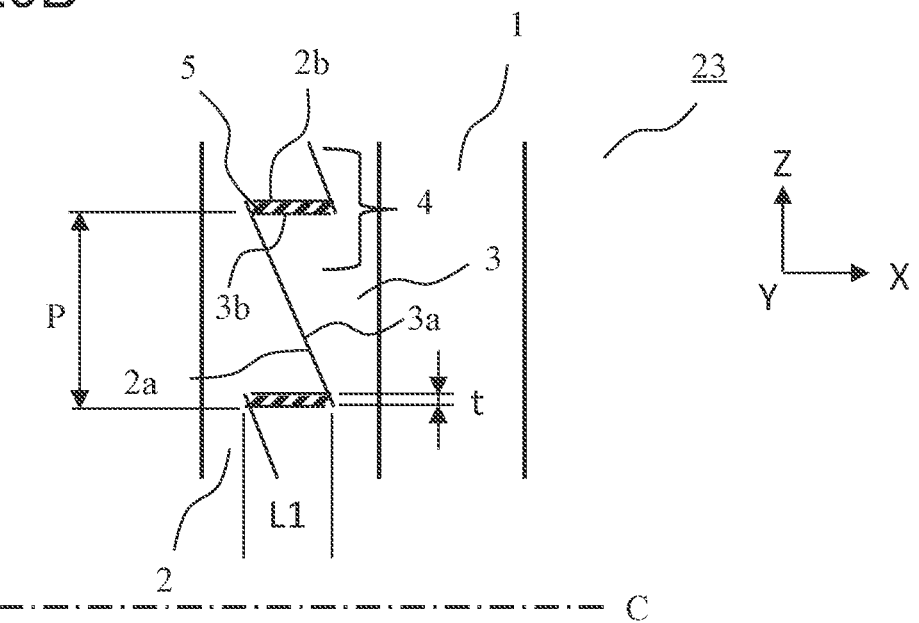
FIG. 5B is a cross-sectional view of the louver in which one portion of the louver is extracted and enlarged.

FIG. 5B is a cross-sectional view in which one portion of FIG. 3A is extracted and enlarged. A surface 2a of the first base portion 2 and a surface 3a of the second base portion 3 are in contact with each other in a boundary plane. Since the identical materials are in contact with each other in the boundary plane, the boundary plane causes no optical effect and serves as a window that transmits the display light IMG.

On the other hand, the light blocking portion 5 is held between a surface 2b of the first base portion 2 and a surface 3b of the second base portion 3. When viewed from the direction of the optical axis OX illustrated in FIG. 1, the light blocking portion 5 is formed like a plurality of concentric circles having different diameters, as illustrated in FIG. 3B. Note that FIG. 3A is a cross-sectional view taken along a line A-A' of FIG. 3B. As illustrated in FIG. 1, the light blocking portion 5 is positioned and oriented so that the light blocking portion 5 effectively blocks the external light 25 from traveling toward the optical element 22, while hardly blocking the display light IMG from traveling from the optical element 22 toward the user's eye 24.

Figure 3C:
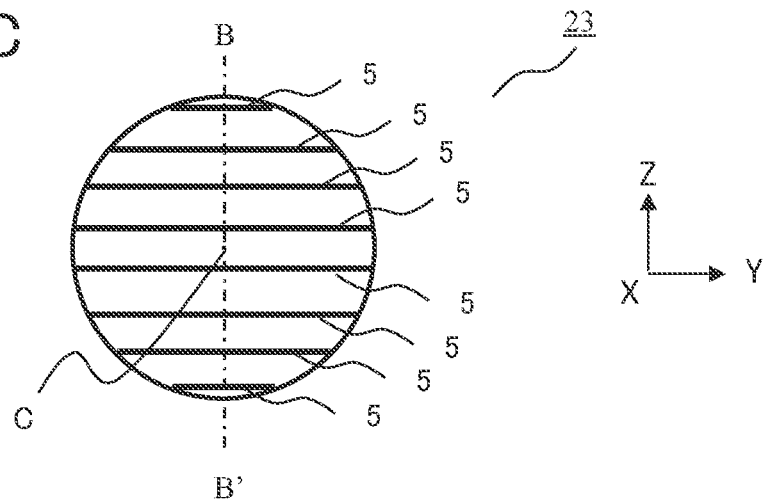
FIG. 3C is a plan view of a louver 23 of a modification in which a main surface of the louver 23 is viewed from the direction of the optical axis OX.

Note that in the present embodiment, the shape of the light blocking portion 5 in a plan view is not limited to the shape of the plurality of concentric circles illustrated in FIG. 3B. For example, the shape of the light blocking portion 5 may be a shape of stripes, as illustrated in FIG. 3C. In this case, FIG. 3A is a cross-sectional view taken along a line B-B' of FIG. 3C.

As illustrated in FIG. 3A, in the louver 23 of the present embodiment, a plurality of light blocking portions is disposed at intervals along the vertical direction (Z direction) orthogonal to the optical axis OX of the optical element 22. As illustrated in FIG. 3A, when viewed along the vertical direction (Z direction) orthogonal to a direction (Y direction) that passes through the right and left eyes of a user, the louver 23 of the present embodiment has a structure that is symmetric with respect to the center line C in the vertical direction.

The louver 23 is mounted in the head mounted display 100 such that the center line C is substantially equal to the optical axis of the optical portion, that is, the optical axis OX of the optical element 22 illustrated in FIG. 1. In other words, the center of the plurality of concentric circles or the center of the plurality of stripes that constitute the light blocking portion 5 is positioned on a line that connects the center of the display panel 21 and the position of the user's eye 24. If the concentric light blocking portion is used, it produces excellent uniformity in brightness of a displayed image. In addition, the louver including the concentric light blocking portion can be easily made because when the louver is made by using a mold and a dispenser, the stress applied evenly in all directions causes less strain and the light blocking material can be easily applied if the substrate is rotated.

In FIG. 5B, a distance of adjacent light blocking portions (i.e., a difference between radii of adjacent concentric circles or a distance of adjacent stripes) is denoted by P, and a thickness of a light blocking portion (i.e., a width of a light blocking portion viewed from the direction of the optical axis OX) is denoted by t. Preferably, a value of t/P is equal to or smaller than 9% (t/P≤9%). Specifically, it is preferable that P have a value in a range equal to or larger than 500 μm and equal to or smaller than 2000 and that t has a value in a range equal to or larger than 0.1 μm and equal to or smaller than 45 In addition, it is preferable that a length L1 of the light blocking portion 5 in the direction of the optical axis have a value in a range equal to or larger than 1 mm and equal to or smaller than 3 mm.

As described above, it is preferable for securing sufficient light blocking performance, that the thickness t be equal to or larger than 0.1 the distance P be equal to or smaller than 2000 and the length L1 be equal to or larger than 1 mm. If the thickness t is equal to or larger than 45 or the distance P is equal to or smaller than 500 or the length L1 is equal to or larger than 3 mm, the ratio at which the light blocking portion 5 blocks the display light IMG will increase, causing a displayed image to be darkened. For this reason, it is preferable that the thickness t, the distance P, and the length L1 be set so as to have values in the above-described ranges. In particular, if t/P<9% is satisfied, preventing the ghost caused by the external light, and ensuring the brightness and uniformity of a displayed image can be both achieved with good balance.

The light blocking portion 5 has only to block the visible light components of the external light 25 from traveling toward the optical element 22. Thus, the light blocking portion 5 is made of a light-absorbing material that absorbs the visible light, or is made of a light-reflecting material that reflects the visible light. In another case, the light blocking portion 5 may have a multilayer structure in which the light-absorbing material and the light-reflecting material are layered on each other. Note that in a case where the light-reflecting material that reflects the visible light is used, the position and the shape of the light blocking portion 5 are set such that the external light reflected from the light-reflecting material does not become stray light.

The material that absorbs the visible light may be selected appropriately from a coating material that contains pigment and a coating material that contains dye. In particular, a black coating material is preferably selected if higher light-absorption capacity is required, and a coating material that contains pigment is preferably used if higher durability is required. Examples of the pigment include ivory black, peach black, lamp black, bitumen, carbon black, and aniline black. Among these pigments, carbon black or aniline black is preferably used. Note that the color material can be selected and used as appropriate, for example, for producing the effect in accordance with a wavelength of the incident external light.

The reflection layer formed on the light blocking portion may be a specular reflection layer or a diffuse reflection layer. The specular reflection layer can reduce the external-light ghost by reflecting the external light toward a direction in which the external light does not affect the display light IMG. Preferably, the specular light-reflection layer is made by using a material that contains a metallic pigment, such as aluminum, silver, nickel, stainless steel, copper, zinc, or iron. If fine powder made from one of aluminum, silver, nickel, and stainless steel, or from a mixture thereof is used, a specular light-reflection layer having a color of silver is formed. If fine powder made from one of copper, zinc, or iron, or from a mixture thereof is used, a specular light-reflection layer having a color of gold or a red-copper color is formed. A diffuse light-reflection layer easily evens the distribution in the amount of light, reduces the external-light ghost, and reduces unevenness in brightness. Preferably, the diffuse light-reflection layer is made by using a material that contains a pigment, such as silver white, titanium white, zinc white, or aluminum powder. Note that the difference in refractive index between the light blocking portion and the base portion is preferably equal to or larger than 0.01 and equal to or smaller than 0.2.

The method of forming the light blocking portion is not limited to a particular method, and can be selected from appropriate manufacturing methods. For example, a coating method or a vacuum deposition method may be used. In the coating method, a predetermined surface of the concave and convex portions of the first base portion 2 and/or the second base portion 3 is coated with a material that contains a coloring agent. In the vacuum deposition method, a metal material such as aluminum is vacuum-deposited on a predetermined surface of the concave and convex portions of the first base portion 2 and/or the second base portion 3. The coating method for forming the light blocking portion 5 includes a contact coating method and a noncontact coating method. In the contact coating method, a predetermined surface of the concave and convex portions of the first base portion 2 and/or the second base portion 3 is coated with a material that contains a coloring agent, by using a brush or a sponge for example. The brush is used also in the edge-blackening of lenses. In the noncontact coating method, a predetermined surface of the concave and convex portions of the first base portion 2 and/or the second base portion 3 is coated with a material that contains a coloring agent, by using a spray or a dispenser for example. As described later, if a dispenser is used, a coating material is given from an oblique direction toward a predetermined surface of the concave and convex portions of the first base portion 2 and/or the second base portion 3, so that the annular light blocking portions can be formed.

Surface Roughness of Light Blocking Portion

Next, surface roughness of the light blocking portion 5 that is one of features of the present embodiment will be described with reference to FIG. 5A. FIG. 5A illustrates the cross-sectional view of FIG. 3A, more specifically. In the present embodiment, a plurality of light blocking portions is formed in the louver 23, and each of the light blocking portions includes a main surface 5A closer to the center line C and a main surface 5B opposite to the center line C with respect to the light blocking portion. In other words, a surface of a light blocking portion, which is in contact with the base portion made of a transparent material, located on a center side of the base portion is referred to as a surface (first surface) 5A, and a surface of the light blocking portion located on an outer-edge side of the base portion is referred to as a surface (second surface) 5B.

In the light blocking portion 5 of the louver 23 of the present embodiment, a surface roughness Ra of the main surface 5A closer to the center line C is larger than a surface roughness Ra of the main surface 5B opposite to the center line C with respect to the light blocking portion (5A>5B). Hereinafter, the surface roughness Ra represents the arithmetic mean roughness.

Figure 6A:
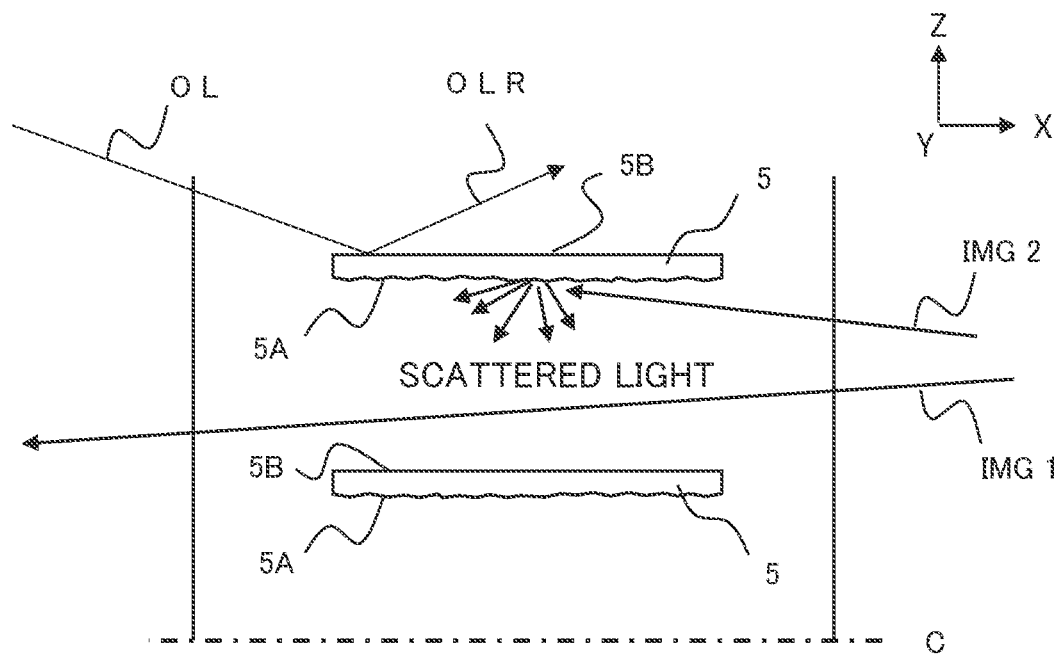
FIG. 6A is a schematic cross-sectional view for illustrating an optical effect of a light blocking portion of the first embodiment.
Figure 6B:
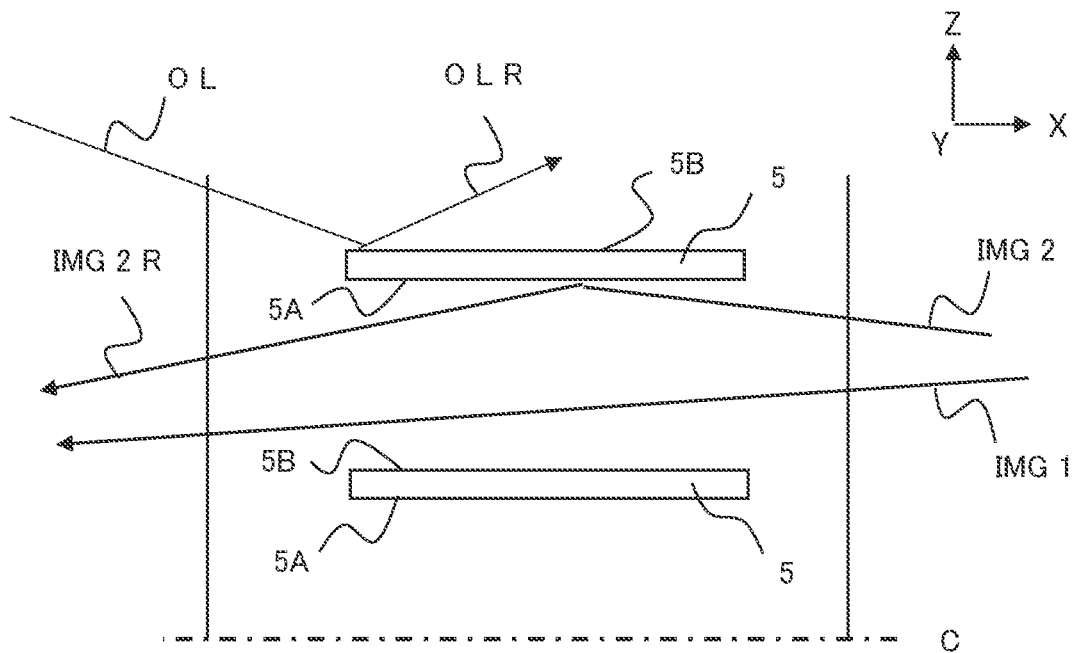
FIG. 6B is a schematic cross-sectional view for illustrating an optical effect of a light blocking portion of a first comparative embodiment.

The reason that the surface roughness Ra of the light blocking portion 5 is set so as to satisfy 5A>5B in the present embodiment will be described in detail with reference to FIGS. 6A to 7B. For convenience of the description and illustration, only one portion of the louver body is schematically illustrated in enlarged cross-sectional views of FIGS. 6A to 7B. FIG. 6A is a schematic cross-sectional view in the present embodiment, in which the surface roughness Ra of the light blocking portion 5 is set so as to satisfy 5A>5B. FIG. 6B is a schematic cross-sectional view in a first comparative embodiment, in which the surface roughness Ra of the main surface 5A is made substantially equal to the surface roughness Ra of the main surface 5B and the flatness of the main surfaces 5A and 5B is increased (the surface roughness Ra of the main surfaces 5A and 5 is decreased).

Figure 7A:
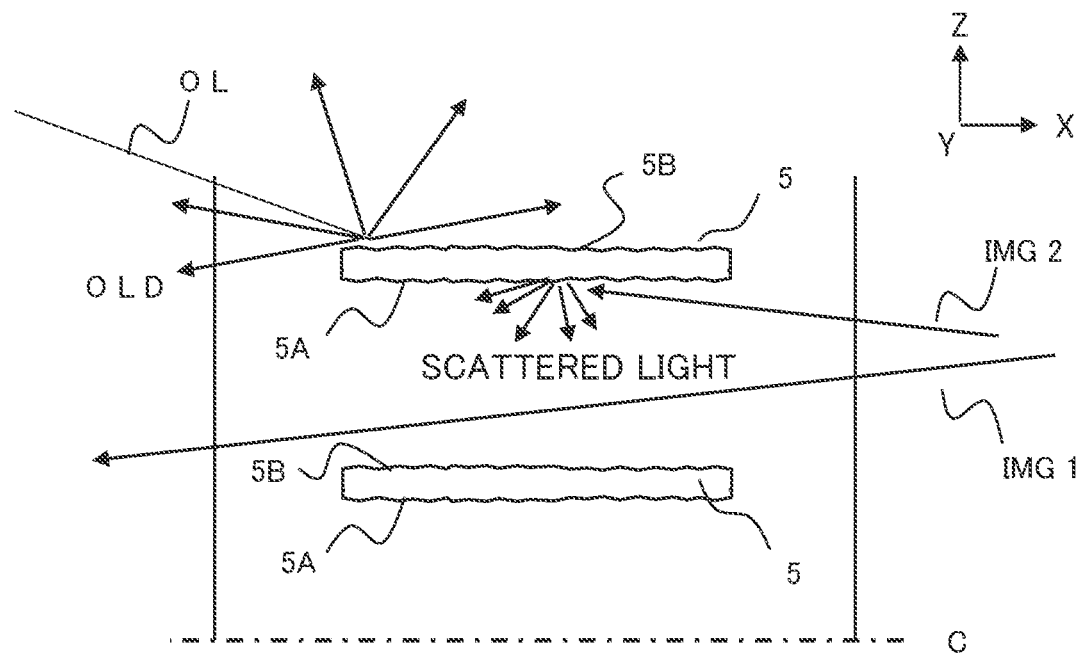
FIG. 7A is a schematic cross-sectional view for illustrating an optical effect of a light blocking portion of a second comparative embodiment.
Figure 7B:
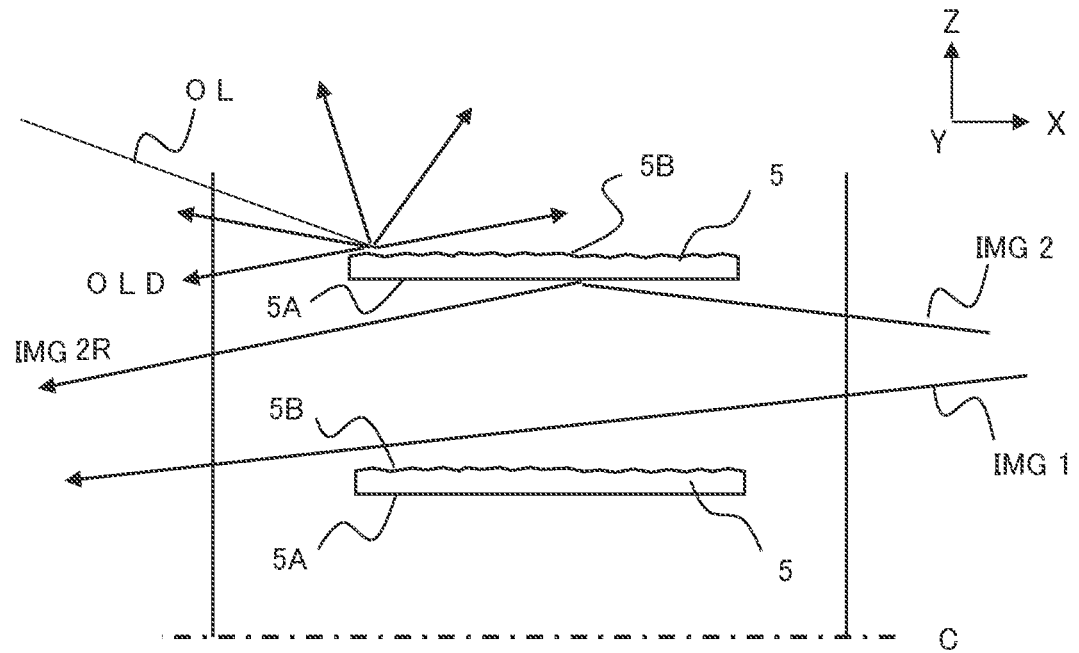
FIG. 7B is a schematic cross-sectional view for illustrating an optical effect of a light blocking portion of a third comparative embodiment.

FIG. 7A is a schematic cross-sectional view in a second comparative embodiment, in which the surface roughness Ra of the main surface 5A is made substantially equal to the surface roughness Ra of the main surface 5B and the main surfaces 5A and 5B are roughed (the surface roughness Ra of the main surfaces 5A and 5B is increased). FIG. 7B is a schematic cross-sectional view in a third comparative embodiment, in which the surface roughness Ra of the main surface 5B is made larger than the surface roughness Ra of the main surface 5A (5A<5B) in contrast to the present embodiment.

As illustrated in FIG. 5B, when viewed along the optical axis OX, the light blocking portion 5 has the length L1. Thus, the main surface 5A or 5B may be irradiated with part of the display light IMG, which is condensed by the optical element 22 and travels toward a user's eye in the head mounted display.

Although not illustrated in FIGS. 6A to 7B, the main surface 5B, which is a main surface separated more from the center line C, is irradiated with the display light. However, the amount of the display light with which the main surface 5B is irradiated is smaller than the amount of the display light with which the main surface 5A is irradiated. Even if the display light is reflected from the main surface 5B, the optical path of the display light will be changed toward a direction in which the reflected light will not reach a user's eye. Thus, the reflection of the display light on the main surface 5B less affects the quality of images.

In contrast, the amount of display light with which the main surface 5A, closer to the center line C, is irradiated is larger than the amount the display light with which the main surface 5B is irradiated. Thus, as illustrated in FIG. 6B or 7B, if the main surface 5A has high flatness (i.e., small surface roughness Ra), part of the display light IMG is reflected from the main surface 5A while the optical path of the part of the display light IMG is changed. As a result, the reflected display light IMG2R travels along an optical path different from the proper optical path made by the optical element 22, and reaches a user's eye. The reflected display light IMG2R causes the deterioration of quality of images, such as the deterioration in contrast and resolution, that is disadvantageous for users.

In the present embodiment, however, the surface roughness of the main surface 5A of the light blocking portion, closer to the center line C, is made larger. Thus, as illustrated in FIG. 6A, the display light IMG2 with which the main surface 5A is irradiated is scattered, and only a small part of the scattered light reaches a user's eye. Therefore, the louver 23 of the present embodiment can reduce the cause of the deterioration of quality of images, such as the deterioration in contrast and resolution.

The external light enters the housing of the head mounted display, and if the external light is reflected in the housing, stray light is produced. As illustrated in FIGS. 6A to 7B, it is highly likely that the main surface 5B, which is separated more from the center line C, is irradiated with the external light and the stray light, denoted by OL. If the main surface 5B is roughened (or has a higher surface roughness Ra) as illustrated in FIG. 7A or 7B, the external light scattered by the main surface 5B or part of the stray light, denoted by OLD, reaches a user's eye. In general, the external light or the stray light OL has higher brightness than that of the display light. Thus, even part of the scattered light will cause the deterioration of quality of images, such as ghost, which is disadvantageous for users.

In the louver 23 of the present embodiment, however, the surface roughness of the main surface 5B, which is separated more from the center line C of the light blocking portion, is made smaller. Thus, as illustrated in FIG. 6A, the external light or the stray light OL with which the main surface 5B is irradiated is reflected toward a direction in which the reflected light OLR does not reach a user's eye. Therefore, the louver 23 of the present embodiment can reduce the cause of the deterioration of quality of images, such as ghost.

Thus, the present embodiment can achieve both of reducing the deterioration in contrast and resolution, and reducing the ghost. The deterioration in contrast and resolution is caused by the display light being reflected from the louver, and the ghost is caused by the external light and the stray light being scattered by the louver. In contrast, the comparative embodiments illustrated in FIGS. 6B, 7A, and 7B cannot achieve both of reducing the deterioration in contrast and resolution, and reducing the ghost, unlike the present embodiment.

Preferably, the surface roughness Ra of the main surface 5A closer to the center line C is equal to or larger than 20 nm and equal to or smaller than 2000 nm. This is because the scattering power for scattering the display light can be obtained if the surface roughness Ra is equal to or larger than 20 nm, and because the louver 23 cannot be easily made if the surface roughness Ra is larger than 2000 nm. In addition, it is preferable that the surface roughness Ra of the main surface 5B separated more from the center line C is equal to or smaller than 20 nm. This is because if the surface roughness Ra of the main surface 5B is equal to or smaller than 20 nm, the external light and the stray light can be reflected, without scattered, toward a direction in which the reflected light does not reach a user's eye.

Next, a method of measuring the surface roughness Ra of the main surfaces 5A and 5B will be described. First, with reference to FIGS. 8A and 8B, a method of measuring the surface roughness Ra of the louver 23 including the concentric light blocking portion 5 illustrated in FIG. 3B will be described. Note that since the below-described measuring method is one example, the surface roughness Ra may be measured by using another method.

Figure 8A:
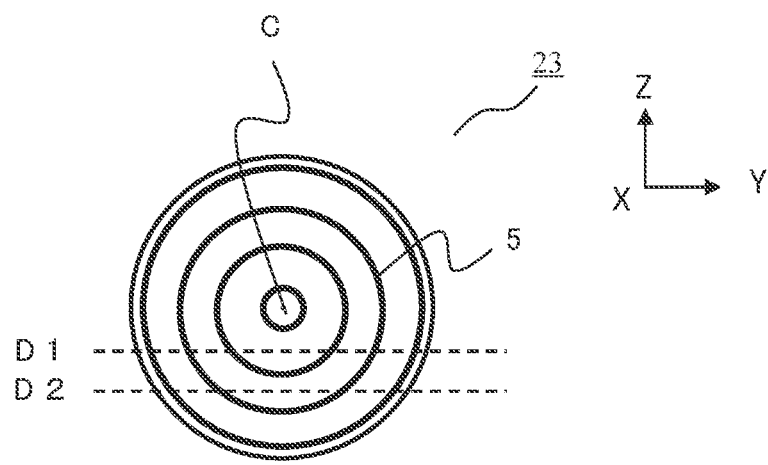
FIG. 8A is a diagram for illustrating a method of making a sample used for measuring the surface roughness of a concentric light blocking portion.
Figure 8B:
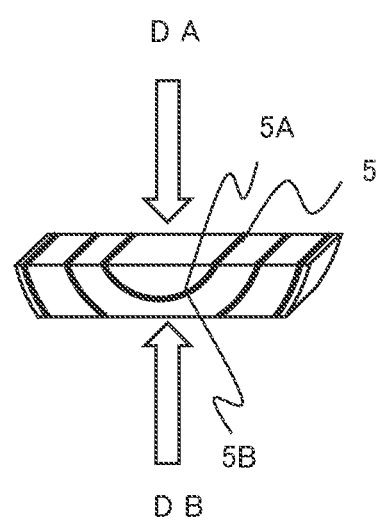
FIG. 8B is a diagram for illustrating a method of measuring the surface roughness of the light blocking portion.

First, the louver 23 is cut along a line D1 and a line D2 illustrated in FIG. 8A, for making a sample piece for observation illustrated in FIG. 8B. The sample piece for observation is cut so that the main surface 5A of the light blocking portion 5, closer to the center line C, can be observed by an observer who faces the main surface 5A, through the resin from an observation direction DA, and that the main surface 5B of the light blocking portion 5, separated more from the center line C, can be observed by the observer who faces the main surface 5B, through the resin from an observation direction DB. For example, the louver 23 can be cut by using a micro-cutting machine, BS-300CP, made by Meiwafosis Co., Ltd. The band speed of the micro-cutting machine may be set at 60 m/min. After the louver 23 is cut, the cut surface is polished. For example, the cut surface is polished by a diamond lap (#2000) by using a precision polishing machine Doctor-Lap ML-180, and is finished with a polishing cloth.

After the sample piece for observation is made, the main surface 5A is observed by an observer who faces the main surface 5A, though the resin from the observation direction DA, and the main surface 5B is observed by the observer who faces the main surface 5B, though the resin from the observation direction DB. Specifically, the surface roughness Ra of a square area with sides of about 0.2 mm is measured by using a white-light interferometer, Newview 8300, made by Zygo Corporation. The object lens magnification may be 10. For example, for each of the main surfaces 5A and 5B, values of the surface roughness Ra of five points of the square area are measured, and an average of the values is determined as the surface roughness Ra of the sample.

Figure 9A:
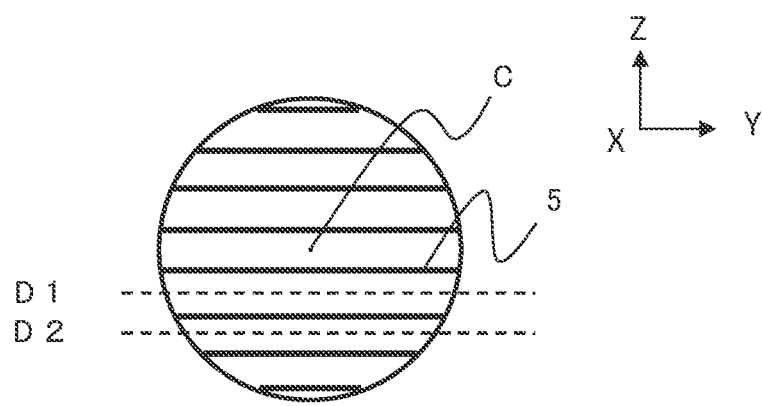
FIG. 9A is a diagram for illustrating a method of making a sample used for measuring the surface roughness of a striped light blocking portion.
Figure 9B:
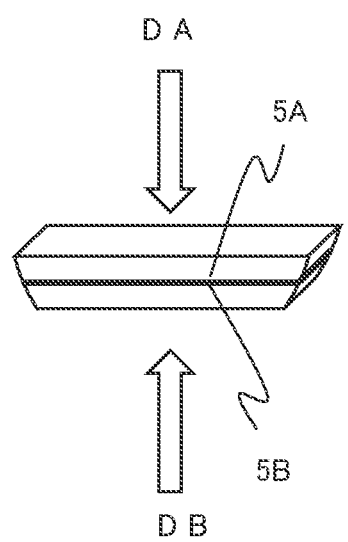
FIG. 9B is a diagram for illustrating a method of measuring the surface roughness of the light blocking portion.

In a case where the surface roughness Ra of the louver 23 including the striped light blocking portion 5 and illustrated in FIG. 3C is measured, the louver 23 is cut along a line D1 and a line D2 illustrated in FIG. 9A, for making a sample piece for observation illustrated in FIG. 9B. Since the following observation procedure is the same as that for the concentric light blocking portion, the description thereof will be omitted.

Method of Manufacturing Louver

Next, a method of manufacturing the louver of the present embodiment will be described. In the method of manufacturing the louver of the present embodiment, the surface roughness of the light blocking portion of the louver is controlled. Specifically, as one method, when the base portion that serves as a base of the light blocking portion is molded by using resin material, the surface roughness of the base portion is controlled so that the base portion has a predetermined surface roughness. The surface roughness of the base portion can be controlled under conditions of molding, used when the base portion is molded through transfer by using a mold. Specifically, the surface roughness of the base portion can be controlled by selecting a type of resin material, the temperature of the resin material obtained when the resin material is injected, a pressure keeping condition, and the like. The surface roughness of a molding surface of a mold used when the base portion is formed through transfer is especially useful as a parameter for controlling the surface roughness of the light blocking portion of the louver.

As described above, in the method of manufacturing the louver of the present embodiment, the surface roughness of the light blocking portion of the louver is controlled. Specifically, as one method, the surface roughness of the light blocking portion is controlled by coating the base portion with a light blocking material under predetermined conditions. The predetermined conditions include selecting of a coating method, such as liquid-phase coating or vacuum film coating, and selecting of a coating apparatus. If the liquid-phase coating is used, the predetermined conditions include the physical properties of the coating material (e.g., viscosity, temperature, additives, etc.), a coating method (e.g., dispenser, inkjet, coater, etc.), and a drying method (e.g., natural drying, air blow, oven, etc.). The volume of solvent contained in the coating material is especially useful as a parameter for controlling the surface roughness of the light blocking portion of the louver.

The above-described methods for controlling the surface roughness of the light blocking portion of the louver may be used, combined appropriately with each other, or with conditions changed as appropriate.

First Example

A first example of the method of manufacturing a louver of the present embodiment will be described with reference to FIGS. 10A to 10D and 11A to 11C.

Figure 10A:
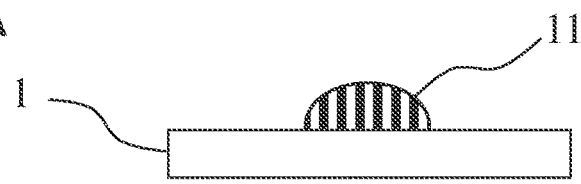
FIG. 10A is a diagram illustrating a stage in which a resin material is given onto a substrate in a first example of a method of manufacturing a louver of the first embodiment.

First, as illustrated in FIG. 10A, an appropriate amount of ultraviolet-curable resin material 11 is given onto the substrate 1 for forming the second base portion 3.

Figure 10B:
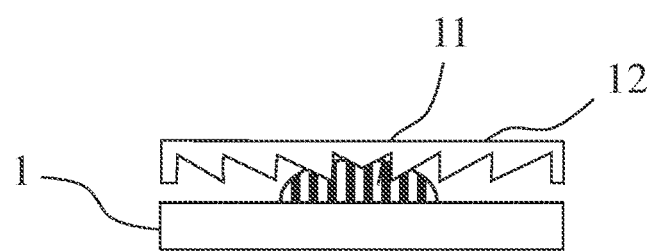
FIG. 10B is a diagram illustrating a stage in which the resin material on the substrate is being molded by using a mold.

Then, as illustrated in FIG. 10B, the resin material 11 is pressed by using a mold 12 used for forming the shape of the second base portion 3 through transfer, so that the space between the mold 12 and the substrate 1 is filled with the resin material 11 such that no gap is formed. On the mold 12, a pattern is formed, and the pattern is used for forming a plurality of concentric concave and convex portions having different diameters in a main surface of the second base portion 3. More specifically, the transfer surface of the mold 12 for forming the surface 3b of the second base portion 3 illustrated in FIG. 5B has a shape that causes the surface roughness Ra of the surface 3b to be equal to or larger than 20 nm and equal to or smaller than 2000 nm. Note that the shape of the transfer surface of the mold 12 can be controlled by adjusting conditions of a cutting process or a blasting process performed when the transfer surface is formed on the mold 12.

Figure 10C:
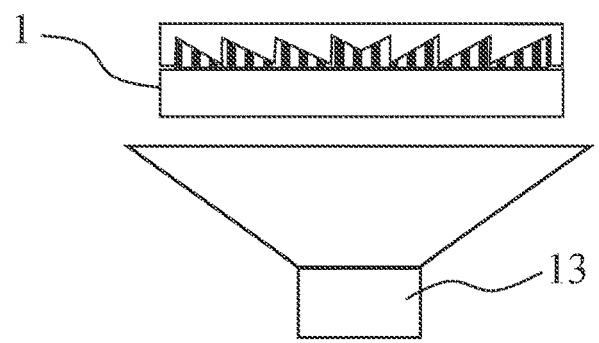
FIG. 10C is a diagram illustrating a stage in which the resin material is cured by irradiating the resin material with ultraviolet light.
Figure 10D:
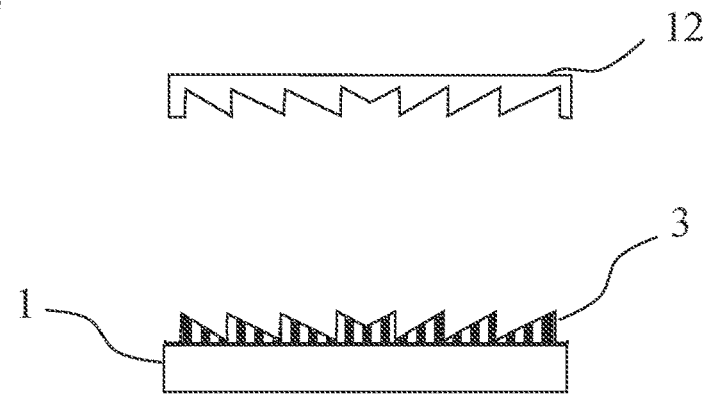
FIG. 10D is a diagram illustrating a stage in which the mold is separated from the resin material.

After the space between the mold 12 and the substrate 1 is filled with the resin material 11, the ultraviolet-curable resin material 11 is irradiated with ultraviolet light emitted from an ultraviolet light source 13, for curing the resin material 11, as illustrated in FIG. 10C. After the resin material 11 is irradiated with the ultraviolet light, the second base portion 3 that is in close contact with the substrate 1 is released from the mold 12, as illustrated in FIG. 10D. After that, the second base portion 3 and the substrate 1 may be set in an oven and heated for completely curing the resin material 11. In this manner, the surface roughness Ra of the surface 3b of the second base portion 3 is made equal to or larger than 20 nm and equal to or smaller than 2000 nm.

Figure 11A:
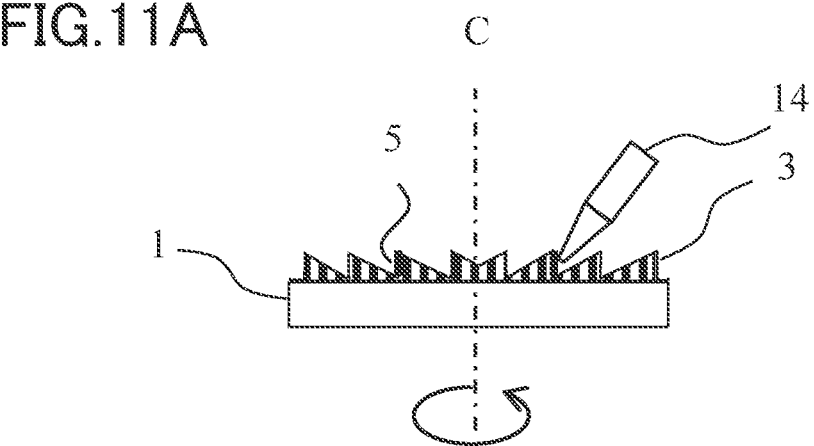
FIG. 11A is a diagram illustrating a stage in which a material for the light blocking portion is applied by using a dispenser in the first example of the method of manufacturing a louver of the first embodiment.

Then, the light blocking portion is formed on the surface 3b of the second base portion 3, which has been described with reference to FIG. 5B. Specifically, as illustrated in FIG. 11A, the substrate 1 is rotated on a rotation axis that is equal to the center line C of the plurality of concentric circles having different diameters, and the material for the light blocking portion 5 is applied along the surface 3b of each concentric circle by using a dispenser 14. The coating material that contains the light blocking material is applied onto the surface 3b, with the dispenser 14 being tilted appropriately. Thus, the coating material can be applied onto the surface 3b alone, without being applied onto the surface 3a. After the coating material is applied onto the surface 3b, the coating material is heated and baked in an oven, for drying and curing the coating material. In this manner, the light blocking portion 5 is formed on the second base portion 3.

In this example, the surface 3b of the second base portion 3 having the surface roughness Ra equal to or larger than 20 nm and equal to or smaller than 2000 nm is coated with the light blocking material, so that the main surface 5A of the light blocking portion 5 closer to the center line C is formed. Thus, the shape of the main surface 5A is made equal to the shape of the surface 3b of the second base portion 3, and the surface roughness Ra of the main surface 5A becomes equal to or larger than 20 nm and equal to or smaller than 2000 nm. The shape of the front surface of the light blocking portion 5 (i.e., a surface of the light blocking portion 5 opposite to the second base portion 3 that is a base of the light blocking portion 5) that is exposed to the outside after the light blocking material is applied can be controlled under the conditions of application performed by using the dispenser 14.

For example, if the viscosity of the coating material is decreased by increasing the content of the solvent of the coating material used for forming the light blocking portion, a thin coating film is formed. As a result, the shape of the front surface of the light blocking portion 5 is made substantially equal to the shape of the surface of the base of the light blocking portion 5, with high accuracy. In contrast, if the viscosity of the coating material is increased by decreasing the content of the solvent of the coating material, the shape of the front surface of the light blocking portion 5 tends to be different from the shape of the surface of the base of the light blocking portion 5. In another case, the shape of the front surface of the light blocking portion 5 may be controlled by changing the drying condition (for example, whether air blow is performed or not) used after the coating material is applied. In this example, the coating material is applied after the content of the solvent of the coating material is adjusted so that the surface roughness of the front surface of the light blocking portion 5 becomes smaller than the surface roughness of the base of the light blocking portion 5. As a result, the surface roughness of the main surfaces of the light blocking portion 5 is controlled so that 5A>5B is satisfied.

Then, an appropriate amount of ultraviolet-curable resin material 16 is given onto the second base portion 3 on which the light blocking portion 5 is formed. Then, the resin material 16 is pressed by using a mold plate 15 used for forming the shape of the flat surface of the first base portion 2 through transfer, so that the space between the mold plate 15 and the second base portion 3 on which the light blocking portion 5 is formed is filled with the resin material 16 such that no gap is formed. Note that the mold plate 15 is made of a transparent material that transmits the ultraviolet light, and that the molding surface of the mold plate 15 that contacts the resin material 16 is a flat surface.

Figure 11B:
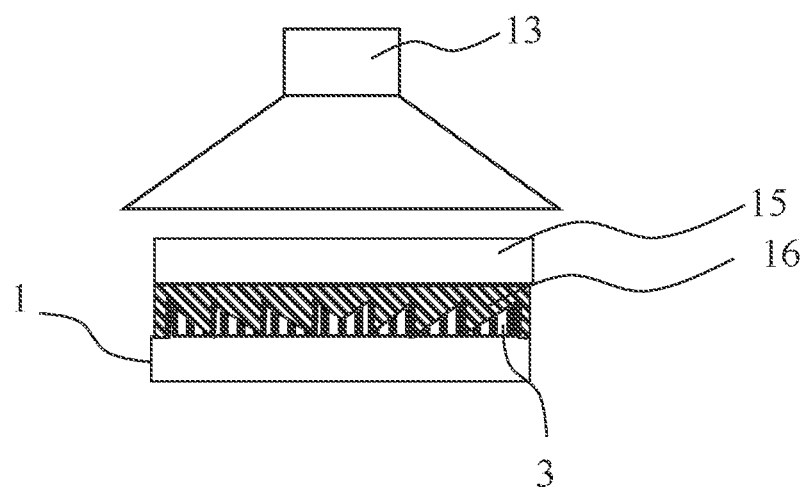
FIG. 11B is a diagram illustrating a stage in which a resin material is given for forming a first base portion and then the resin material is cured by irradiating the resin material with ultraviolet light through a mold plate.
Figure 11C:
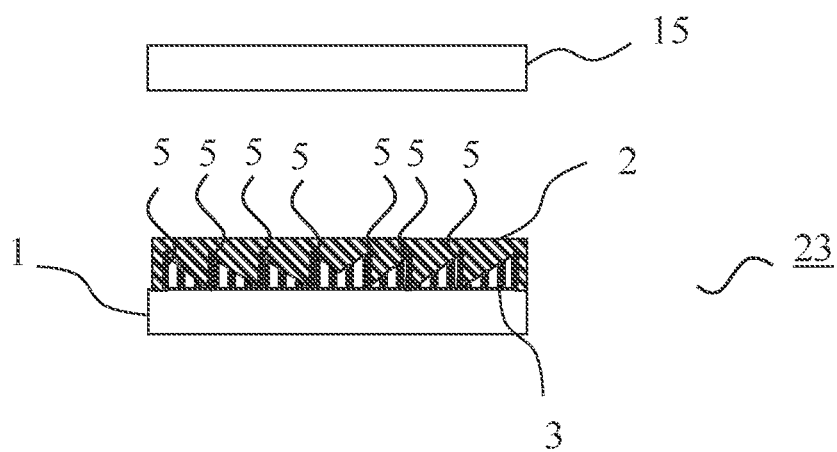
FIG. 11C is a diagram illustrating a stage in which the mold plate is separated from the resin material.

After the space between the mold plate 15 and the second base portion 3 is filled with the resin material 16, the ultraviolet-curable resin material 16 is irradiated with ultraviolet light emitted from the ultraviolet light source 13, for curing the resin material 16, as illustrated in FIG. 11B. After the resin material 16 is irradiated with the ultraviolet light, the substrate 1, the second base portion 3, and the first base portion 2 are released from the mold 15, as illustrated in FIG. 11C. After that, the substrate 1, the second base portion 3, and the first base portion 2 may be set in an oven and heated for completely curing the resin material 16.

By using the first example of the above-described manufacturing method, the louver 23 of the present embodiment having two layers that are in close contact with each other can be made. In this example, the shape of the surface of the mold having the surface roughness Ra equal to or larger than 20 nm and equal to or smaller than 2000 nm is transferred to the surface 3b of the second base portion 3 that is a base of the main surface 5A of the light blocking portion 5 closer to the center line C. Then, the coating material is applied onto the surface 3b after the content of the solvent of the coating material is adjusted so that the surface roughness of the front surface of the light blocking portion 5 becomes smaller than the surface roughness of the base of the light blocking portion 5. As a result, the light blocking portion 5 in which the surface roughness of one main surface and the surface roughness of the other main surface satisfy 5A>5B is formed.

Second Example

Next, a second example of the method of manufacturing a louver of the present embodiment will be described with reference to FIGS. 12A to 12D and 13A to 13C. The second example differs from the above-described first example in that the substrate 1 is disposed on the first base portion 2 side, and that the surface 2b of the first base portion 2 illustrated in FIG. 5B is formed earlier above the substrate 1 by using a mold.

Figure 12A:
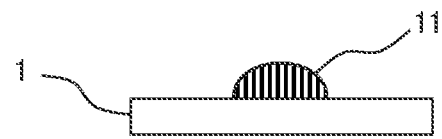
FIG. 12A is a diagram illustrating a stage in which a resin material is given onto a substrate in a second example of the method of manufacturing a louver of the first embodiment.

In the second example, as illustrated in FIG. 12A, an appropriate amount of ultraviolet-curable resin material 11 is given onto the substrate 1 for forming the first base portion 2.

Figure 12B:
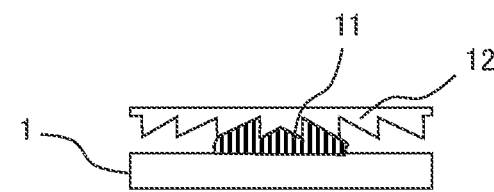
FIG. 12B is a diagram illustrating a stage in which the resin material on the substrate is being molded by using a mold.

Then, as illustrated in FIG. 12B, the resin material 11 is pressed by using a mold 12 used for forming the shape of the first base portion 2 through transfer, so that the space between the mold 12 and the substrate 1 is filled with the resin material 11 such that no gap is formed. On the mold 12, a pattern is formed, and the pattern is used for forming a plurality of concentric concave and convex portions having different diameters in a main surface of the first base portion 2. More specifically, the transfer surface of the mold 12 for forming the surface 2b of the first base portion 2 illustrated in FIG. 5B has a surface roughness Ra equal to or smaller than 20 nm. Note that the shape of the transfer surface of the mold 12 can be controlled by adjusting conditions of a cutting process or a blasting process performed when the transfer surface is formed on the mold 12.

Figure 12C:
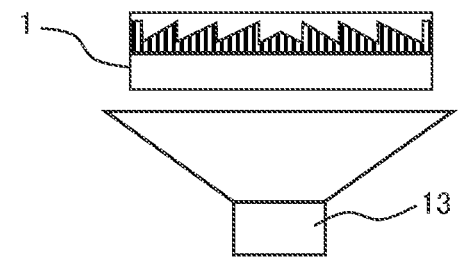
FIG. 12C is a diagram illustrating a stage in which the resin material is cured by irradiating the resin material with ultraviolet light.
Figure 12D:
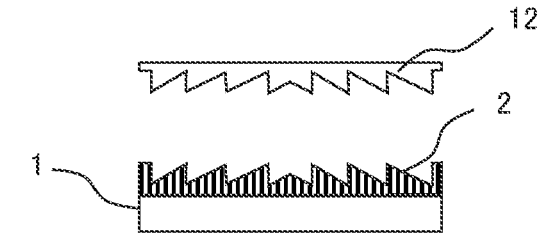
FIG. 12D is a diagram illustrating a stage in which the mold is separated from the resin material.

After the space between the mold 12 and the substrate 1 is filled with the resin material 11, the ultraviolet-curable resin material 11 is irradiated with ultraviolet light emitted from the ultraviolet light source 13, for curing the resin material 11, as illustrated in FIG. 12C. After the resin material 11 is irradiated with the ultraviolet light, the first base portion 2 that is in close contact with the substrate 1 is released from the mold 12, as illustrated in FIG. 12D. After that, the substrate 1 and the first base portion 2 may be set in an oven and heated for completely curing the resin material 11. In this manner, the surface roughness Ra of the surface 2b of the first base portion 2 is made equal to or smaller than 20 nm.

Figure 13A:
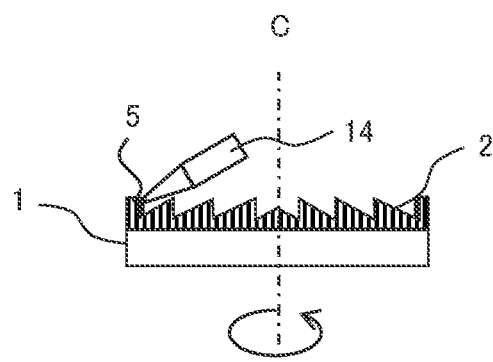
FIG. 13A is a diagram illustrating a stage in which a material for the light blocking portion is applied by using a dispenser in the second example of the method of manufacturing a louver of the first embodiment.

Then, the light blocking portion is formed on the surface 2b of the first base portion 2, which has been described with reference to FIG. 5B. Specifically, as illustrated in FIG. 13A, the substrate 1 is rotated on a rotation axis that is equal to the center line C of the plurality of concentric circles having different diameters, and the material for the light blocking portion 5 is applied along the surface 2b of each concentric circle by using a dispenser 14. The coating material that contains the light blocking material is applied onto the surface 2b, with the dispenser 14 being tilted appropriately. Thus, the coating material can be applied onto the surface 2b alone, without being applied onto the surface 2a. After the coating material is applied onto the surface 2b, the coating material is heated and baked in an oven, for drying and curing the coating material. In this manner, the light blocking portion 5 is formed on the first base portion 2.

In this example, the surface 2b of the first base portion 2 having the surface roughness Ra equal to or smaller than 20 nm is coated with the light blocking material, so that the main surface 5B of the light blocking portion 5 separated more from the center line C is formed. Thus, the shape of the main surface 5B is made equal to the shape of the surface 2b of the first base portion 2, and the surface roughness Ra of the main surface 5B becomes equal to or smaller than 20 nm. The shape of the front surface of the light blocking portion 5 (i.e., a surface of the light blocking portion 5 opposite to the first base portion 2 that is a base of the light blocking portion 5) that is exposed to the outside after the light blocking material is applied can be controlled under the conditions of application performed by using the dispenser 14. For example, if the viscosity of the coating material is increased by decreasing the content of the solvent of the coating material, the shape of the front surface of the light blocking portion 5 tends to be different from the shape of the surface of the base of the light blocking portion 5. In another case, the shape of the front surface of the light blocking portion 5 may be controlled by changing the drying condition (for example, whether air blow is performed or not) used after the coating material is applied. In this example, the coating material is applied after the content of the solvent of the coating material is adjusted so that the surface roughness of the front surface of the light blocking portion 5 becomes larger than the surface roughness of the base of the light blocking portion 5. As a result, the surface roughness of the main surfaces of the light blocking portion 5 is controlled so that 5A>5B is satisfied.

Then, an appropriate amount of ultraviolet-curable resin material 16 is given onto the first base portion 2 on which the light blocking portion 5 is formed. Then, the resin material 16 is pressed by using a mold plate 15 used for forming the shape of the flat surface of the second base portion 3 through transfer, so that the space between the mold plate 15 and the first base portion 2 on which the light blocking portion 5 is formed is filled with the resin material 16 such that no gap is formed. Note that the mold plate 15 is made of a transparent material that transmits the ultraviolet light, and that the molding surface of the mold plate 15 that contacts the resin material 16 is a flat surface.

Figure 13B:
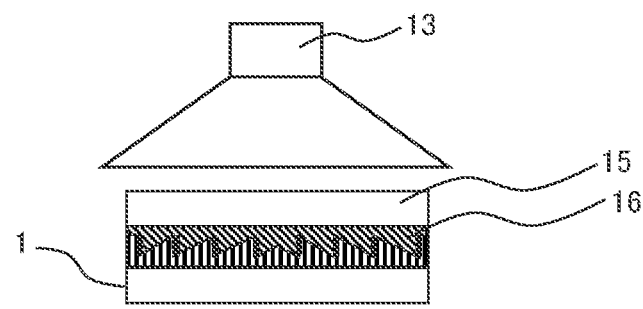
FIG. 13B is a diagram illustrating a stage in which a resin material is given for forming a second base portion and then the resin material is cured by irradiating the resin material with ultraviolet light through a mold plate.
Figure 13C:
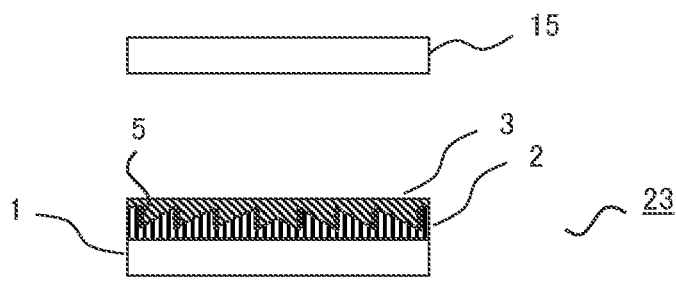
FIG. 13C is a diagram illustrating a stage in which the mold plate is separated from the resin material.

After the space between the mold plate 15 and the first base portion 2 is filled with the resin material 16, the ultraviolet-curable resin material 16 is irradiated with ultraviolet light emitted from the ultraviolet light source 13, for curing the resin material 16, as illustrated in FIG. 13B. After the resin material 16 is irradiated with the ultraviolet light, the substrate 1, the first base portion 2, and the second base portion 3 are released from the mold 15, as illustrated in FIG. 13C. After that, the substrate 1, the first base portion, and the second base portion 3 may be set in an oven and heated for completely curing the resin material 16.

By using the second example of the above-described manufacturing method, the louver 23 of the present embodiment having two layers that are in close contact with each other can be made. In this example, the shape of the surface of the mold having the surface roughness Ra equal to or smaller than 20 nm is transferred to the surface 2b of the first base portion 2 that is a base of the main surface 5A of the light blocking portion 5 closer to the center line C. Then, the coating material is applied onto the surface 2b after the content of the solvent of the coating material is adjusted so that the surface roughness of the front surface of the light blocking portion 5 becomes larger than the surface roughness of the base of the light blocking portion 5. As a result, the light blocking portion 5 in which the surface roughness of one main surface and the surface roughness of the other main surface satisfy 5A>5B is formed.

If the louver of the present embodiment is mounted in the head mounted display, the display light can propagate to a user's eye in a state where the loss and disturbance of the display light are reduced, and it is possible to reduce the external light and the stray light, produced in the head mounted display, that reach user's eyes.

EXAMPLES

Hereinafter, specific examples and comparative examples will be described. The sample of each of the examples was made by using the first example or the second example of the above-described manufacturing method. In addition, by using the method (described in the present embodiment) of controlling the surface roughness, the surface roughness Ra of one main surface and the surface roughness Ra of the other main surface were set so as to satisfy 5A=5B in Comparative Example 1 and Comparative Example 2, and the surface roughness Ra of one main surface and the surface roughness Ra of the other main surface were set so as to satisfy 5A<5B in Comparative Example 3.

First, the conditions common to the examples and the comparative examples will be described. The substrate 1 used was an optical glass that contains boron and silicon. Specifically, the substrate 1 used was a disk-shaped plate having a diameter φ of 45 mm and made by using an S-BSL7 made by OHARA INC. The mold 12 used for forming the concave and convex portion in a base portion was made by cutting a NiP layer plated on a base metal material, by using a precision machine tool, and by forming a desired shape of the surface of the mold 12 that is to be inverted into the shape of the concave and convex portions of the base portion. The NiP layer plated on the base metal material was cut with high precision, and the surface roughness of the surface of the mold 12 was adjusted.

The first base portion 2 was made by using an ultraviolet-curable acrylic-resin compound that has a refractive index of 1.58 after the resin is cured. The light blocking portion 5 was made by applying the coating material of the light blocking portion 5 onto the concentric circles of the first base portion 2 by using a dispenser, from an oblique direction, while the substrate 1 was rotated on the center of rotation that is equal to the center of the concentric circles of the first base portion 2. The reason the dispenser was used is that the dispenser can inject an appropriate amount of coating material for forming a film having a thickness of about 10 μm, and that the number (e.g., about 20) of the concentric circles formed per one substrate and coated with the coating material is small. In addition, the use of dispenser is convenient for processes performed before and after the coating process. The coating material was made by diluting undiluted solution with organic solvent. After the coating, the substrate 1 and the first base portion 2 were set in an oven that was set at 80° C., and heated and dried for four hours. The refractive index obtained after the coating material was dried was 1.68.

The shape of the light blocking portions in a plan view is concentric. A pitch P of light blocking portions (i.e., a distance between adjacent light blocking portions, or the difference between radii of adjacent concentric circles) was set at 1 mm. In addition, the length L1 of the light blocking portion 5 in the direction of the optical axis was set at 1 mm. In addition, the thickness t of the light blocking portion 5 (i.e., a width of the light blocking portion viewed from the direction of the optical axis OX) was set at 10 The second base portion 3 was made by using the ultraviolet-curable resin-material compound, which is the same as that of the first base portion 2; and the louver element having two layers that are in close contact with each other was completed.

Each sample was evaluated as described below. The head mounted display in which a louver element to be evaluated had been mounted was set in a darkroom in which the head mounted display is not affected by the external light. In addition, a digital camera was set at a position that corresponds to a position of an eye of a user that wears the head mounted display.

First, for evaluating the deterioration of quality of images caused by the display light being reflected from a main surface of the light blocking portion, a chart in which black-and-white solid squares, each having sides of 1 mm, were arranged like a lattice, was displayed on the head mounted display, and the image of the chart was captured by the digital camera. The ratio of the white-color display portions to the black-color display portions, based on data, was 1:1. The light-intensity average value of five white-color display portions of an image captured by the digital camera was determined as an intensity of white-color display portion, and the light-intensity average value of five black-color display portions of an image captured by the digital camera was determined as an intensity of black-color display portion.

In a case where the ratio of the intensity of display light from the black-color display portion to the intensity of display light from the white-color display portion was equal to or smaller than 0.01, the sample was evaluated as "A" or "Good". In contrast, in a case where the ratio of the intensity of display light from the black-color display portion to the intensity of display light from the white-color display portion was larger than 0.01, the sample was evaluated as "B" or "Poor".

Next, for evaluating the deterioration of quality of images caused by the external light or the stray light, produced by the reflection of the external light, being reflected from a main surface of the light blocking portion, a white parallel light having a diameter of 5 mm and used instead of the external light or the stray light, produced by the reflection of the external light, was emitted from an LED lamp. The white parallel light was emitted from six directions. The six directions were defined such that three directions inclined by 45°, 60°, and 75° with respect to a Y-Z plane of the louver element were defined, and that the three angles were defined in two directions: an upward direction extending from the rear viewed from a user, and a sideward direction extending from the rear viewed from a user. In addition, the louver was irradiated with the white parallel light at three positions: a center position of the louver, a midpoint between the center position and an outer circumferential edge of the louver in the upward direction Z, and a midpoint between the center position and an outer circumferential edge of the louver in the sideward direction Y. Thus, the number of conditions on directions and positions of the irradiation are 18 in total. In addition, the intensity of the white parallel light per unit area was set 100 times larger than the intensity of light from a white screen of the display panel 21. In a state where the white screen was produced by the display panel 21 and the LED lamp was on, an image of the white screen was captured by the digital camera. The light-intensity average value of five white-color display portions of an image captured by the digital camera was determined as an intensity of white-color display portion. After that, in a state where a black screen was produced by the display panel 21 and the light was emitted from the LED lamp under the above-described 18 conditions, the light-intensity average value of all portions of an image captured by the digital camera was determined an intensity of undesired light.

In a case where the ratio of the intensity of undesired light to the intensity of white-color display portion was equal to or smaller than 0.01, the sample was evaluated as "A" or "Good". In contrast, in a case where the ratio of the intensity of undesired light to the intensity of white-color display portion was larger than 0.01, the sample was evaluated as "B" or "Poor".

Example 1

The surface roughness Ra of the molding surface of the mold 12 for forming the base portion was set at 8 nm. The surface roughness Ra of the surface 2b of the first base portion 2, whose shape was formed by the mold 12 through transfer, was 8 nm. The surface 2b was coated with the coating material, which is the raw material of the light blocking portion 5, by using the dispenser 14. The coating raw material used was a solution in which an undiluted solution was diluted 4 times with organic solvent. The surface roughness Ra of the main surface 5B of the light blocking portion 5 was 8 nm because the shape of the main surface 5B was made equal to the shape of the surface 2b of the first base portion 2. The surface roughness Ra of the main surface 5A of the light blocking portion 5 was 100 nm. As described above, in Example 1, the surface roughness Ra of the main surfaces of the light blocking portion 5 satisfies the relationship of 5A>5B.

Example 2

The louver of Example 2 was made by using the same method as that for the louver of Example 1, except for the coating material used for making the light blocking portion 5. In Example 2, the coating raw material used was a solution in which an undiluted solution was diluted 1.5 times with organic solvent. The surface roughness Ra of the main surface 5B of the light blocking portion 5 was 8 nm because the shape of the main surface 5B was made equal to the shape of the surface 2b of the first base portion 2. The surface roughness Ra of the main surface 5A of the light blocking portion 5 was 1800 nm.

As described above, in Example 2, the surface roughness Ra of the main surfaces of the light blocking portion 5 satisfies the relationship of 5A>5B.

Example 3

The louver of Example 3 was made by using the same method as that for the louver of Example 1, except for the coating material used for making the light blocking portion 5. In Example 3, the coating raw material used was a solution in which an undiluted solution was diluted 10 times with organic solvent. The surface roughness Ra of the main surface 5B of the light blocking portion 5 was 8 nm because the shape of the main surface 5B was made equal to the shape of the surface 2b of the first base portion 2. The surface roughness Ra of the main surface 5A of the light blocking portion 5 was 25 nm. As described above, in Example 3, the surface roughness Ra of the main surfaces of the light blocking portion 5 satisfies the relationship of 5A>5B.

Example 4

The louver of Example 4 was made by using the same method as that for the louver of Example 1, except that the surface roughness Ra of the molding surface of the mold 12 used for forming the base portion was set at 20 nm. The surface roughness Ra of the surface 2b of the first base portion 2, whose shape was formed as replica by the mold 12 through transfer, was 18 nm. The surface roughness Ra of the main surface 5B of the light blocking portion 5 was 18 nm because the shape of the main surface 5B was made equal to the shape of the surface 2b of the first base portion 2. The surface roughness Ra of the main surface 5A of the light blocking portion 5 was 100 nm. As described above, in Example 4, the surface roughness Ra of the main surfaces of the light blocking portion 5 satisfies the relationship of 5A>5B.

Comparative Example 1

Comparative Example 1 is a specific example of the first comparative embodiment described with reference to FIG. 6B. Thus, in Comparative Example 1, the surface roughness Ra of the main surface 5A is substantially the same as the surface roughness Ra of the main surface 5B, and the main surfaces 5A and 5B have higher flatness (i.e., smaller surface roughness Ra). The surface roughness Ra of the main surfaces 5A and 5B was set at 8 nm.

Comparative Example 2

Comparative Example 2 is a specific example of the second comparative embodiment described with reference to FIG. 7A. Thus, in Comparative Example 2, the surface roughness Ra of the main surface 5A is substantially the same as the surface roughness Ra of the main surface 5B, and the main surfaces 5A and 5B are roughened (that is, the main surfaces 5A and 5B have larger surface roughness Ra). The surface roughness Ra of the main surfaces 5A and 5B was set at 1800 nm.

Comparative Example 3

Comparative Example 3 is a specific example of the third comparative embodiment described with reference to FIG. 7B. Thus, in Comparative Example 3, the surface roughness Ra of the main surface 5B was made larger than the surface roughness Ra of the main surface 5A (5A<5B). The surface roughness Ra of the main surface 5A was set at 8 nm, and the surface roughness Ra of the main surface 5B was set at 100 nm.

Table 1 illustrates the evaluation results of the examples and the comparative examples.

TABLE 1

| EVALUATION SAMPLE | SURFACE ROUGHNESS Ra OF 5A | SURFACE ROUGHNESS Ra OF 5B | REFLECTION OF DISPLAY LIGHT | REFLECTION OF EXTERNAL LIGHT AND STRAY LIGHT |
| --- | --- | --- | --- | --- |
| EXAMPLE 1 | 100 nm | 8 nm | A | A |
| EXAMPLE 2 | 1800 nm | 8 nm | A | A |

TABLE 1-continued

| EVALUATION SAMPLE | SURFACE ROUGHNESS Ra OF 5A | SURFACE ROUGHNESS Ra OF 5B | REFLECTION OF DISPLAY LIGHT | REFLECTION OF EXTERNAL LIGHT AND STRAY LIGHT |
|---|---|---|---|---|
| EXAMPLE 3 | 25 nm | 8 nm | A | A |
| EXAMPLE 4 | 100 nm | 18 nm | A | A |
| COMPARATIVE EXAMPLE 1 | 8 nm | 8 nm | B | A |
| COMPARATIVE EXAMPLE 2 | 1800 nm | 1800 nm | A | B |
| COMPARATIVE EXAMPLE 3 | 8 nm | 100 nm | B | B |

When the louver of each of Examples 1 to 4 was mounted in the head mounted display and used, the head mounted display was able to display an image for a user in a state where the loss and disturbance of the display light were reduced, and it was possible to reduce the external light and the stray light that reach user's eyes. In contrast, when the louver of each of Comparative Examples 1 to 3 was mounted in the head mounted display and used, the louver was not able to achieve both of reducing the deterioration of quality of images caused by the reflection of display light and reducing the deterioration of quality of images caused by the scattering of the external light and the stray light.

Second Embodiment

Louver Body

The louver body includes the first base portion 2, the second base portion 3, and the light blocking portion 5. As illustrated in FIG. 3A, a main surface of the first base portion 2 on a side (i.e., on the user's eye side) from which the display light IMG is outputted in a state where the louver 23 is assembled to the head mounted display 100 is a flat surface. In addition, a main surface (that faces the second base portion 3) of the first base portion 2 on a side toward which the display light IMG is transmitted has concave and convex portions. A main surface of the second base portion 3 on a side (i.e., on the optical element 22 side) toward which the display light IMG is transmitted is a flat surface, and a main surface (that faces the first base portion 2) of the second base portion 3 on a side from which the display light IMG is outputted has concave and convex portions. Note that if the main surface of the substrate 1 is not flat in a cross-sectional view, the above-described flat surfaces of the first base portion 2 and the second base portion 3 are changed to surfaces (non-flat surfaces) in accordance with the shape of the main surface of the substrate 1.

The concave and convex portions of the first base portion 2 and the concave and convex portions of the second base portion 3 fit in each other or are in contact with each other, and the first base portion 2 and the second base portion 3 are integrated with each other. The material of the first base portion 2 and the material of the second base portion 3 have a substantially identical refractive index. Preferably, the first base portion 2 and the second base portion 3 are made of an identical type of resin material. The resin material may be any one of resin materials as long as the resin materials have sufficient optical properties, such as transmittance, and sufficient reliability. Preferably, a photosensitive resin material is suitably used because the base portion can be easily manufactured by using the photosensitive resin material. Specifically, an acrylate-based resin, a polycarbonate resin, or the like is suitably used. The optical resin material may contain inorganic fine particles for achieving predetermined optical properties. The type of the inorganic fine particles contained in the optical resin material is selected in consideration of desired optical properties. Specifically, examples of the type of the inorganic fine particles include zirconia oxide, titanium oxide, zinc oxide, indium oxide, tin oxide, antimony oxide, indium tin oxide (ITO), antimony-doped tin oxide (ATO), and zinc-doped indium oxide (IZO).

The concave and convex portions of the first base portion 2 and the concave and convex portions of the second base portion 3 may have any shape as long as the concave and convex portions of the first base portion 2 and the concave and convex portions of the second base portion 3 can fit in each other or be in contact with each other and can form the light blocking portion 5 at a predetermined position and posture, as described later. As illustrated in FIG. 3A, the cross-sectional shape of the concave and convex portions is preferably a sawtooth shape in which triangles are aligned. However, the cross-sectional shape may be another shape. For example, the cross-sectional shape may be a shape in which triangles such as isosceles triangles or right triangles, rectangles, trapezoids, semicircles, or the like are continuously aligned. In addition, when viewed from the direction of the optical axis OX illustrated in FIG. 1, the concave and convex portions are formed along a plurality of concentric circles having different diameters.

When a portion in which the first base portion 2 and the second base portion 3 fit in each other or are in contact with each other is viewed along a Z direction, portions in each of which the first base portion 2 and the second base portion 3 are in contact with each other, and portions in each of which a light blocking portion 5 is held between the first base portion 2 and the second base portion 3 are alternately formed. In other words, when viewed along the Z direction, base portions made of transparent resin material and light blocking portions are alternately formed. Note that the Z direction is, in other words, a direction parallel to the main surface, a direction orthogonal to the center line C, or the vertical direction.

Figure 16A:
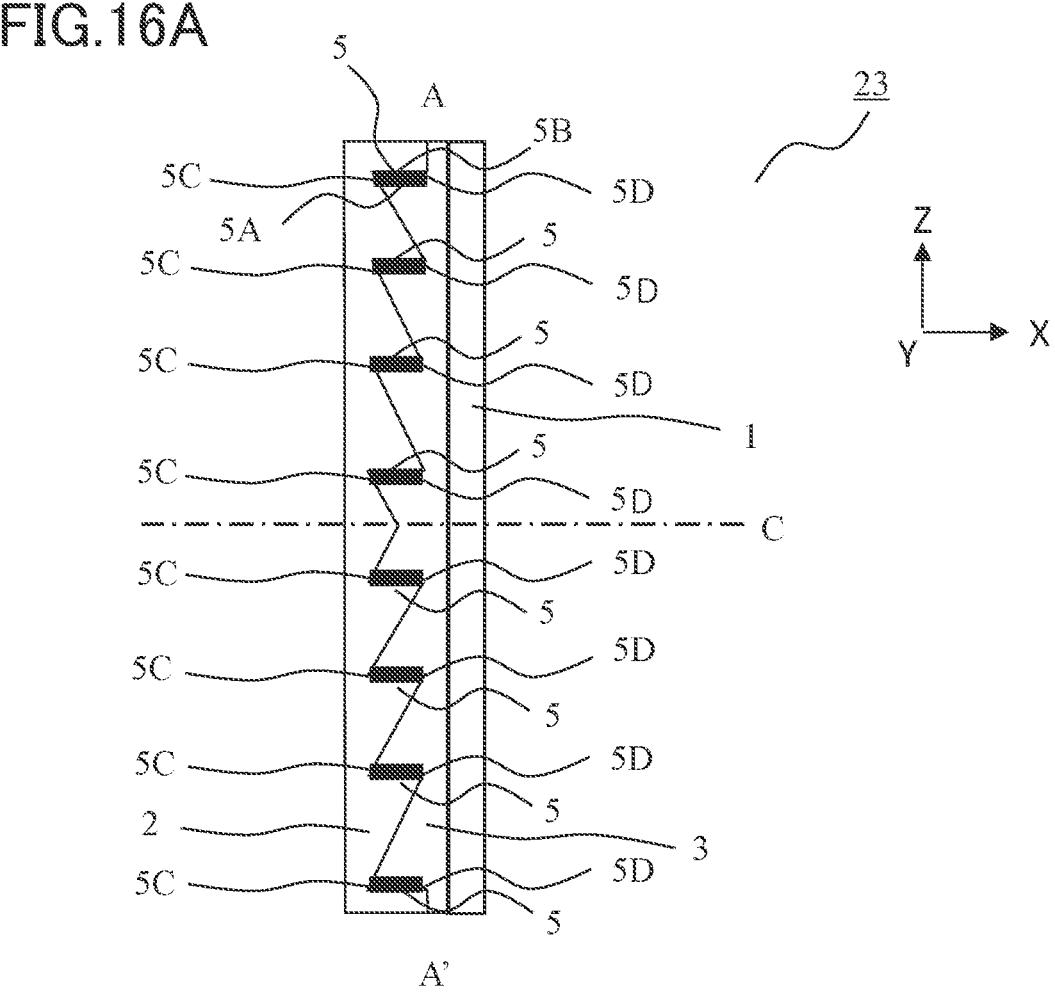
FIG. 16A is a cross-sectional view of a louver for illustrating surface roughness of a light blocking portion of a second embodiment.
Figure 16B:
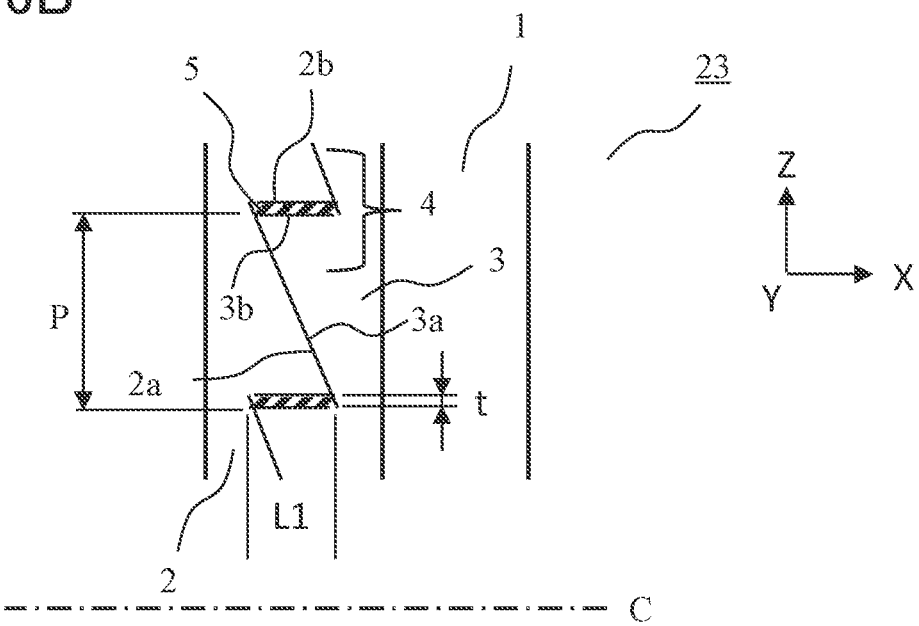
FIG. 16B is a cross-sectional view in which one portion of the louver is extracted and enlarged.

FIG. 16B is a cross-sectional view in which one portion of FIG. 3A is extracted and enlarged. A surface 2a of the first base portion 2 and a surface 3a of the second base portion 3 are in contact with each other in a boundary plane. Since the identical materials are in contact with each other in the boundary plane, the boundary plane causes no optical effect and serves as a window that transmits the display light IMG.

On the other hand, the light blocking portion 5 is held between a surface 2b of the first base portion 2 and a surface 3b of the second base portion 3. When viewed from the direction of the optical axis OX illustrated in FIG. 1, the light blocking portion 5 is formed like a plurality of concentric circles having different diameters, as illustrated in FIG. 3B. Note that FIG. 3A is a cross-sectional view taken along a line A-A' of FIG. 3B. As illustrated in FIG. 1, the light blocking portion 5 is positioned and oriented so that the light blocking portion 5 effectively blocks the external light 25 from traveling toward the optical element 22, while hardly blocking the display light IMG from traveling from the optical element 22 toward the user's eye 24.

Note that in the present embodiment, the shape of the light blocking portion 5 in a plan view is not limited to the shape of the plurality of concentric circles illustrated in FIG. 3B. For example, the shape of the light blocking portion 5 may be a shape of stripes, as illustrated in FIG. 3C. In this case, FIG. 3A is a cross-sectional view taken along a line B-B' of FIG. 3C.

As illustrated in FIG. 3A, in the louver 23 of the present embodiment, a plurality of light blocking portions is disposed at intervals along the vertical direction (Z direction) orthogonal to the optical axis OX of the optical element 22. As illustrated in FIG. 3A, when viewed along the vertical direction (Z direction) orthogonal to a direction (Y direction) that passes through the right and left eyes of a user, the louver 23 of the present embodiment has a structure that is symmetric with respect to the center line C in the vertical direction.

The louver 23 is mounted in the head mounted display 100 such that the center line C is substantially equal to the optical axis of the optical portion, that is, the optical axis OX of the optical element 22 illustrated in FIG. 1. In other words, the center of the plurality of concentric circles or the center of the plurality of stripes that constitute the light blocking portion 5 is positioned on a line that connects the center of the display panel 21 and the position of the user's eye 24. If the concentric light blocking portion is used, it produces excellent uniformity in brightness of a displayed image. In addition, the louver including the concentric light blocking portion can be easily made because when the louver is made by using a mold and a dispenser, the stress applied evenly in all directions causes less strain and the light blocking material can be easily applied if the substrate is rotated.

In FIG. 16B, a distance of adjacent light blocking portions (i.e., a difference between radii of adjacent concentric circles or a distance of adjacent stripes) is denoted by P, and a thickness of a light blocking portion (i.e., a width of a light blocking portion viewed from the direction of the optical axis OX) is denoted by t. Preferably, a value of t/P is equal to or smaller than 9% (t/P≤9%). Specifically, it is preferable that P have a value in a range equal to or larger than 500 μm and equal to or smaller than 2000 and that t has a value in a range equal to or larger than 0.1 μm and equal to or smaller than 45 In addition, it is preferable that a length L1 of the light blocking portion 5 in the direction of the optical axis have a value in a range equal to or larger than 1 mm and equal to or smaller than 3 mm.

As described above, it is preferable for securing sufficient light blocking performance, that the thickness t be equal to or larger than 0.1 the distance P be equal to or smaller than 2000 and the length L1 be equal to or larger than 1 mm. If the thickness t is equal to or larger than 45 or the distance P is equal to or smaller than 500 or the length L1 is equal to or larger than 3 mm, the ratio at which the light blocking portion 5 blocks the display light IMG will increase, causing a displayed image to be darkened. For this reason, it is preferable that the thickness t, the distance P, and the length L1 be set so as to have values in the above-described ranges. In particular, if t/P≤9% is satisfied, preventing the ghost caused by the external light, and ensuring the brightness and uniformity of a displayed image can be both achieved with good balance.

Note that the thickness t of the light blocking portion may be referred to as a width of a later-described end surface 5C on the eye side, or a width of an end surface 5D on the display panel side. More preferably, the thickness t is set in a range equal to or larger than 5 μm and equal to or smaller than 45 μm for forming a surface structure that controls the reflection of the external light from the end surface 5C on the eye side or the reflection of the display light from the end surface 5D on the display panel side.

The light blocking portion 5 has only to block the visible light components of the external light 25 from traveling toward the optical element 22. Thus, the light blocking portion 5 is made of a light-absorbing material that absorbs the visible light, or is made of a light-reflecting material that reflects the visible light. In another case, the light blocking portion 5 may have a multilayer structure in which the light-absorbing material and the light-reflecting material are layered on each other. Note that if the light-reflecting material that reflects the visible light is used, the position and the shape of the light blocking portion 5 are set such that the external light reflected from the light-reflecting material does not become stray light.

The material that absorbs the visible light may be selected appropriately from a coating material that contains pigment and a coating material that contains dye. In particular, a black coating material is preferably selected if higher light-absorption capacity is required, and a coating material that contains pigment is preferably used if higher durability is required. Examples of the pigment include ivory black, peach black, lamp black, bitumen, carbon black, and aniline black. Among these pigments, carbon black or aniline black is preferably used. Note that the color material can be selected and used as appropriate, for example, for producing the effect in accordance with a wavelength of the incident external light.

The reflection layer formed on the light blocking portion may be a specular reflection layer or a diffuse reflection layer. The specular reflection layer can reduce the external-light ghost by reflecting the external light toward a direction in which the external light does not affect the display light IMG. Preferably, the specular light-reflection layer is made by using a material that contains a metallic pigment, such as aluminum, silver, nickel, stainless steel, copper, zinc, or iron. If fine powder made from one of aluminum, silver, nickel, and stainless steel, or from a mixture thereof is used, a specular light-reflection layer having a color of silver is formed. If fine powder made from one of copper, zinc, or iron, or from a mixture thereof is used, a specular light-reflection layer having a color of gold or a red-copper color is formed. A diffuse light-reflection layer easily evens the distribution in the amount of light, reduces the external-light ghost, and reduces unevenness in brightness. Preferably, the diffuse light-reflection layer is made by using a material that contains a pigment, such as silver white, titanium white, zinc white, or aluminum powder. Note that the difference in refractive index between the light blocking portion and the base portion is preferably equal to or larger than 0.01 and equal to or smaller than 0.2.

The method of forming the light blocking portion is not limited to a particular method, and can be selected from appropriate manufacturing methods. For example, a coating method or a vacuum deposition method may be used. In the coating method, a predetermined surface of the concave and convex portions of the first base portion 2 and/or the second base portion 3 is coated with a material that contains a coloring agent. In the vacuum deposition method, a metal material such as aluminum is vacuum-deposited on a predetermined surface of the concave and convex portions of the first base portion 2 and/or the second base portion 3. The coating method for forming the light blocking portion 5 includes a contact coating method and a noncontact coating method. In the contact coating method, a predetermined surface of the concave and convex portions of the first base portion 2 and/or the second base portion 3 is coated with a material that contains a coloring agent, by using a brush or a sponge for example. The brush is used also in the edge-blackening of lenses. In the noncontact coating method, a predetermined surface of the concave and convex portions of the first base portion 2 and/or the second base portion 3 is coated with a material that contains a coloring agent, by using a spray or a dispenser for example. As described later, when a dispenser is used, a coating material is given from an oblique direction toward a predetermined surface of the concave and convex portions of the first base portion 2 and/or the second base portion 3, so that the annular light blocking portions can be formed.

Surface Roughness of Light Blocking Portion

Next, surface roughness of the light blocking portion 5 that is one of features of the present embodiment will be described with reference to FIG. 16A. FIG. 16B illustrates the cross-sectional view of FIG. 3A, more specifically. Note that in the following description, a +X direction indicates a direction indicated by an arrow of the X axis in a coordinate system illustrated in each figure, and a −X direction indicates a direction opposite to (or turned by 180 degrees from) the direction indicated by an arrow of the X axis in a coordinate system in each figure. The same holds true for other directions other than the X direction.

In the present embodiment, a plurality of light blocking portions is formed in the louver 23, and each of the light blocking portions includes a main surface 5A closer to the center line C and a main surface 5B opposite to the center line C with respect to the light blocking portion. In other words, a surface of the light blocking portion, which is in contact with the base portion made of a transparent material, located on a center side of the base portion is referred to as a surface (first surface) 5A, and a surface of the light blocking portion located on an outer-edge side of the base portion is referred to as a surface (second surface) 5B.

In addition, an end surface of each light blocking portion on the −X direction side is denoted by 5C, and an end surface of each light blocking portion on the +X direction side is denoted by 5D. The surface 5C is referred to also as an end surface (third surface) on the eye side, and the surface 5D is referred to also as an end surface (fourth surface) on the display panel side.

In the light blocking portion 5 of the louver 23 of the present embodiment, the end surface 5C on the eye side (that is an end surface on the −X direction side) has a surface roughness Ra smaller than 20 nm. The reason that the surface roughness Ra of the end surface 5C on the eye side of the light blocking portion 5 of the present embodiment is set smaller than 20 nm will be described in detail with reference to FIGS. 17A to 18B. For convenience of the description and illustration, only one portion of the louver body is schematically illustrated in enlarged cross-sectional views of FIGS. 17A to 18B.

Figure 17A:
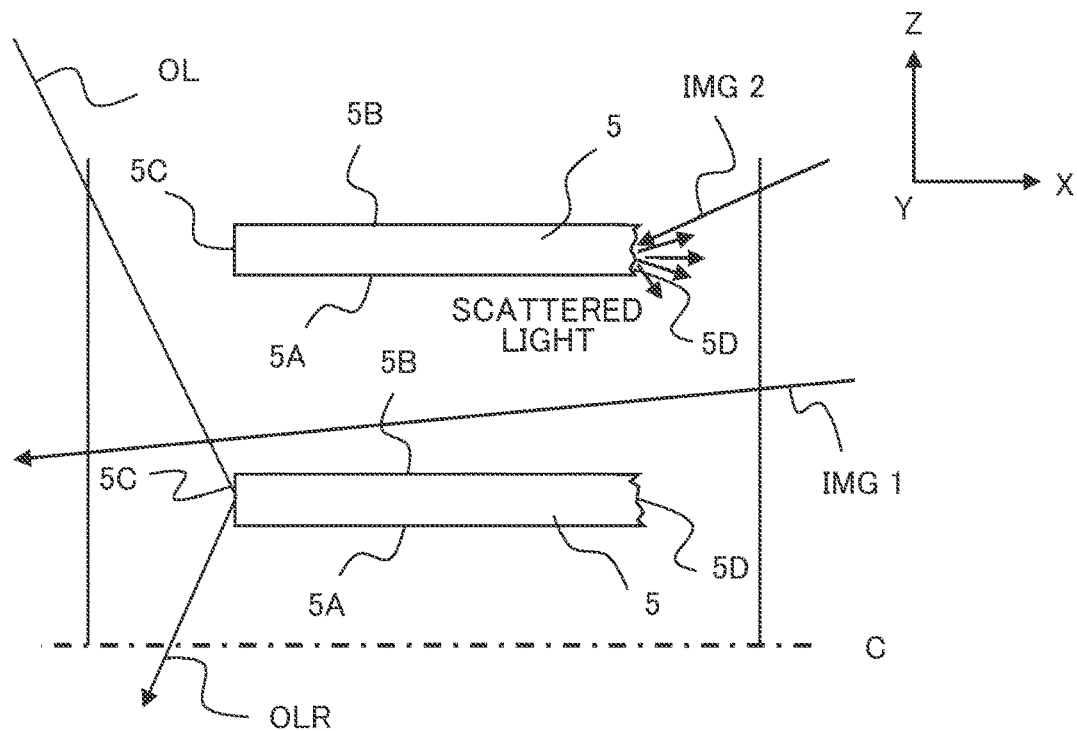
FIG. 17A is a schematic cross-sectional view for illustrating an optical effect of a light blocking portion of the second embodiment A.
Figure 17B:
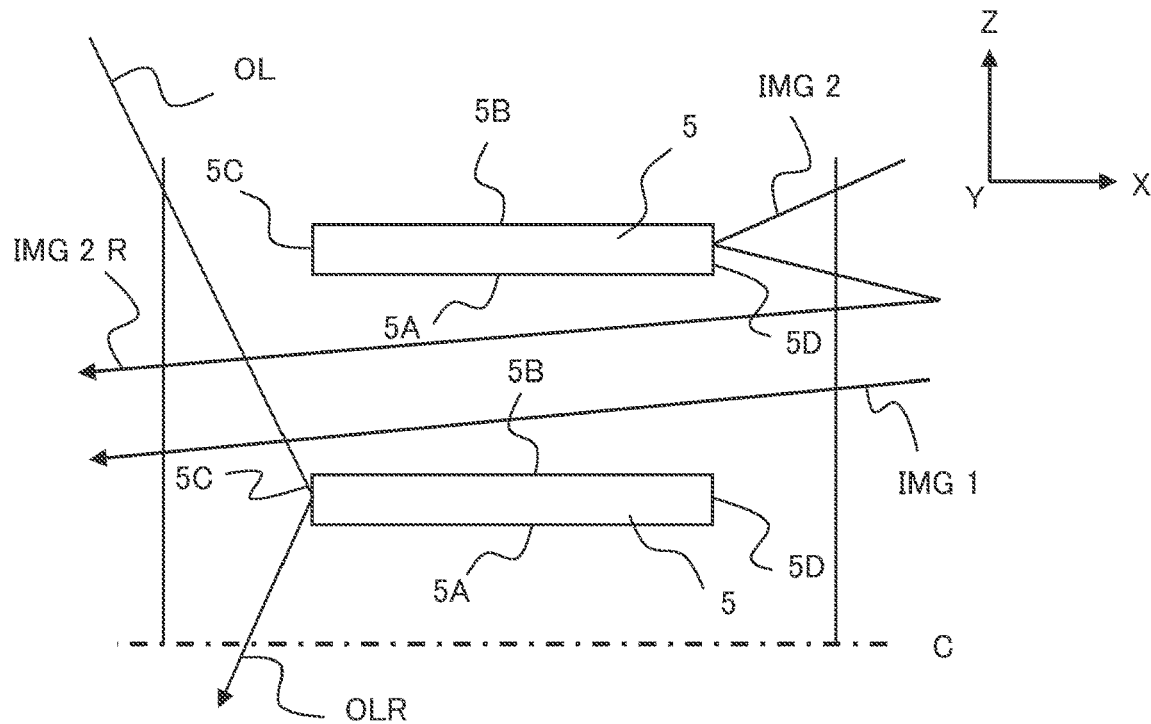
FIG. 17B is a schematic cross-sectional view for illustrating an optical effect of a light blocking portion of the second embodiment B.
Figure 18A:
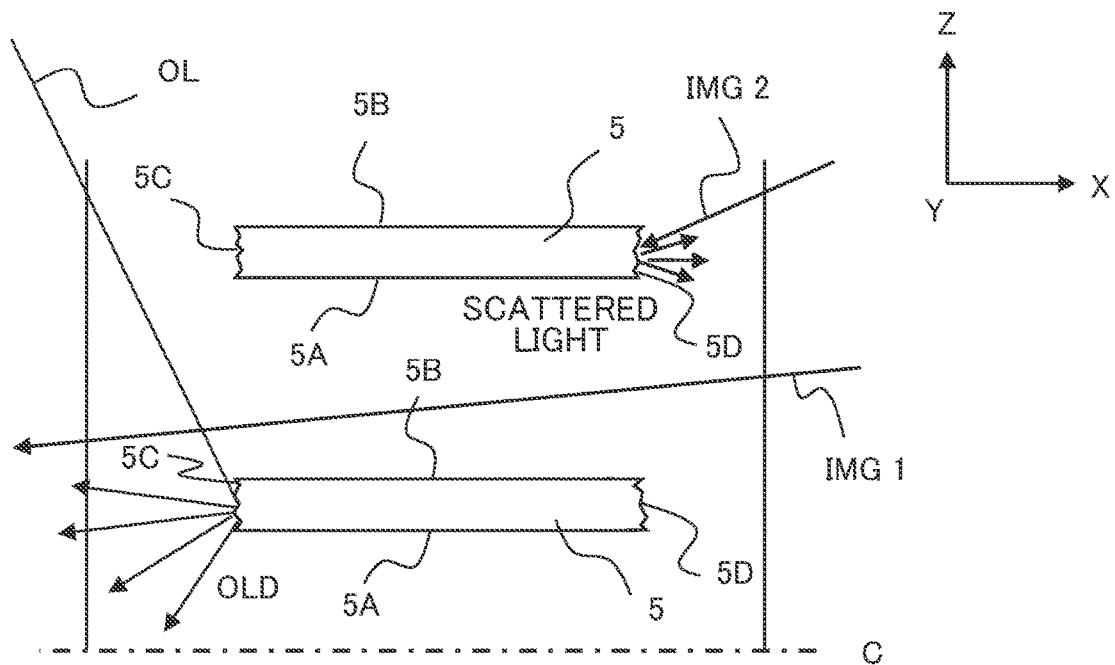
FIG. 18A is a schematic cross-sectional view for illustrating an optical effect of a light blocking portion of a fourth comparative embodiment.
Figure 18B:
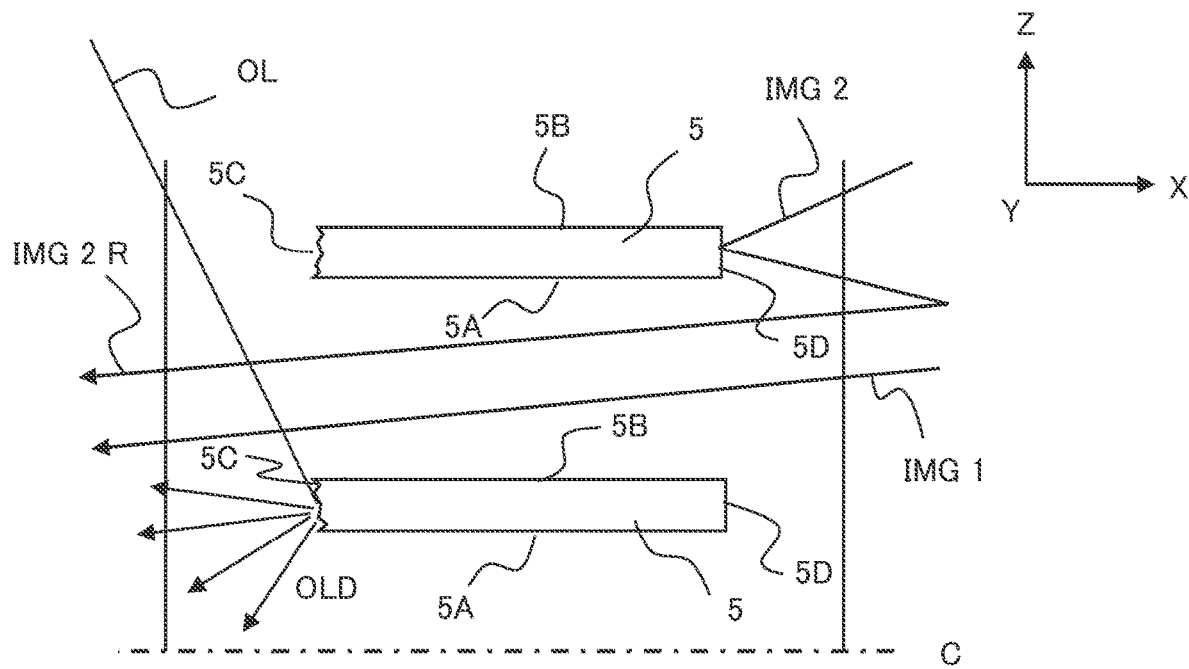
FIG. 18B is a schematic cross-sectional view for illustrating an optical effect of a light blocking portion of a fifth comparative embodiment.

FIG. 17A illustrates a structure of the second embodiment A. In FIG. 17A, the end surface 5C on the eye side of the light blocking portion 5 is a flat surface having a surface roughness Ra smaller than 20 nm, and the end surface 5D on the display panel side is a rough surface having a surface roughness Ra larger than that of the end surface 5C on the eye side. FIG. 17B illustrates a structure of the second embodiment B. In FIG. 17B, the end surface 5C on the eye side and the end surface 5D on the display panel side of the light blocking portion 5 are both flat surfaces having a surface roughness Ra smaller than 20 nm. FIG. 18A illustrates a structure of a fourth comparative embodiment. In FIG. 18A, the end surface 5C on the eye side and the end surface 5D on the display panel side of the light blocking portion 5 are both rough surfaces having a surface roughness Ra equal to or larger than 20 nm. FIG. 18B illustrates a structure of a fifth comparative embodiment. In FIG. 18B, the end surface 5C on the eye side of the light blocking portion 5 is a rough surface having a surface roughness Ra equal to or larger than 20 nm, and the end surface 5D on the display panel side is a flat surface having a surface roughness Ra smaller than that of the end surface 5C on the eye side. Note that the main surface 5A of the light blocking portion 5 closer to the center line C of the louver 23 has an identical surface roughness in the embodiments and the comparative embodiments, and the main surface 5B of the light blocking portion 5 opposite to the center line C of the louver 23 with respect to the light blocking portion also has an identical surface roughness in the embodiments and the comparative embodiments. Thus, in the embodiments and the comparative embodiments, the influence of only the end surface 5C on the eye side and the end surface 5D on the display panel side can be compared with each other.

As illustrated in FIG. 16B, when viewed along the optical axis OX (the center line C), the light blocking portion 5 has the thickness t.

Thus, the end surface 5C on the eye side may be irradiated with the external light OL that enters the housing of the head mounted display. In addition, the end surface 5D on the display panel side may be irradiated with display light IMG2 that is part of the display light. Since the external light OL may have light intensity larger than that of the display light IMG2, and may reach user's eyes after a single reflection on the end surface 5C on the eye side, the external light OL significantly affects the quality of images.

When the louver is used, components of the external light having lower incident angles with respect to the louver are blocked by a user's head. Thus, other components of the external light having higher incident angles with respect to the louver enter the housing.

The end surface 5C on the eye side of the louver 23 of the second embodiment A and the second embodiment B is a flat surface that has higher flatness and that has a surface roughness Ra smaller than 20 nm. Thus, as illustrated in FIG. 17A or 17B, the external light OL that is incident on the end surface 5C on the eye side at a high incident angle is reflected from the end surface 5C on the eye side, toward a direction in which the reflected external light OLR does not reach a user's eye. That is, in the second embodiment A and the second embodiment B, it is possible to reduce the deterioration of quality of images, such as flare or ghost, caused by the reflection of the external light OL.

Next, the influence caused by the display light IMG2 with which the end surface 5D on the display panel side is irradiated in the second embodiment A and the second embodiment B will be described. In the second embodiment A, since the end surface 5D on the display panel side is a rough surface having a surface roughness Ra equal to or larger than 20 nm, the display light IMG2 is reflected as scattered light, as illustrated in FIG. 17A. The scattered light reflected toward various directions has low intensity. Thus, even if part of the scattered light is reflected again by the optical element 22 or the like and travels toward a user's eye in an optical path, the part of the scattered light, which has low intensity, hardly causes the deterioration of quality of images, such as ghost or the deterioration in contrast. On the other hand, in the second embodiment B, since the end surface 5D on the display panel side is a flat surface having a surface roughness Ra smaller than 20 nm, the display light IMG2 is reflected specularly, as illustrated in FIG. 17B. Thus, in the arrangement of the light blocking portion 5, if the specularly reflected light is reflected again by the optical element 22 or the like and travels toward a user's eye, the specularly reflected light IMG2R may cause ghost or the deterioration in contrast. Both of the second embodiment A and the second embodiment B can reduce flare or ghost caused by the external light OL. In addition to this, the second embodiment A can reduce the deterioration of quality of images, such as ghost or the deterioration in contrast, caused by the display light.

Next, the influence caused by the external light OL with which the end surface 5C on the eye side of the louver 23 is irradiated in the fourth and the fifth comparative embodiments will be described. In the fourth and the fifth comparative embodiments, the end surface 5C on the eye side is a rough surface that is less flat and that has a surface roughness equal to or larger than 20 nm. Thus, as illustrated in FIG. 18A or 18B, the external light OL with which the end surface 5C on the eye side is irradiated is reflected as scattered light OLD in a wide range of directions. As described previously, the external light has higher intensity. Thus, even if part of the scattered light reaches user's eyes, the part of the scattered light will cause the deterioration of quality of images, such as ghost or flare. Thus, the fourth and the fifth comparative embodiments will cause insufficient quality of images for users in practical use, compared to the second embodiment A and the second embodiment B.

The influence caused by the display light IMG2 with which the end surface 5D on the display panel is irradiated is the same as that described in the second embodiment A and the second embodiment B. Thus, in both of the fourth and the fifth embodiments, flare or ghost caused by the external light OL is larger than that in the second embodiment A and the second embodiment B. In addition to this, in the fifth comparative embodiment, the deterioration of quality of images, such as ghost or the deterioration in contrast, caused by the display light occurs easily.

As described above, in the embodiments illustrated in FIGS. 17A and 17B, it is possible to reduce the occurrence of flare and the like caused by the external light being scattered by the end surface 5C on the eye side. In contrast, in the comparative embodiments illustrated in FIGS. 18A and 18B, it is not possible to reduce the occurrence of flare and the like because the external light is scattered by the end surface 5C on the eye side. In the embodiment illustrated in FIG. 17A, in addition to the reduction of the flare caused by the external light being scattered by the end surface 5C on the eye side, it is possible to reduce the deterioration of quality of images, such as ghost or the deterioration in contrast, caused by the display light being reflected from the end surface 5D on the display panel side.

Note that regarding the main surface (first surface) 5A of the light blocking portion closer to the center line C and the main surface (second surface) 5B of the light blocking portion opposite to the center line C with respect to the light blocking portion, it is preferable that the surface roughness Ra of the first surface be made larger than the surface roughness Ra of the second surface (5A>5B). The external light that enters the housing of the head mounted display, and the stray light that is produced by the external light being reflected in the housing are highly likely to hit the main surface 5B, which is separated more from the center line C.

Thus, if the main surface (second surface) 5B has larger surface roughness Ra, the main surface 5B causes the occurrence of scattered light that will easily reach user's eyes. Thus, in an embodiment, it is preferable not only that the end surface (third surface) 5C on the eye side be a surface that has high flatness and that has a surface roughness Ra smaller than 20 nm, but also that the main surface (first surface) 5A have a surface roughness Ra larger than that of the main surface (second surface) 5B. Specifically, it is preferable that the surface roughness Ra of the main surface (first surface) 5A be equal to or larger than 20 nm and equal to or smaller than 2000 nm. In addition, it is preferable that the surface roughness Ra of the main surface (second surface) 5B be equal to or smaller than 20 nm.

Preferably, the surface roughness Ra of the main surface 5A closer to the center line C is equal to or larger than 20 nm and equal to or smaller than 2000 nm. This is because the scattering power for scattering the display light can be obtained if the surface roughness Ra is equal to or larger than 20 nm, and because the louver 23 cannot be easily made if the surface roughness Ra is larger than 2000 nm. In addition, it is preferable that the surface roughness Ra of the main surface 5B, separated more from the center line C, be equal to or smaller than 20 nm. This is because the external light or the stray light can be reflected, without scattered, toward a direction in which the reflected light or the stray light does not reach a user's eye, if the surface roughness Ra of the main surface 5B is equal to or smaller than 20 nm.

Next, a method of measuring the surface roughness Ra of end surface (third surface) 5C on the eye side and the surface roughness Ra of the end surface (fourth surface) 5D on the display panel side will be described. Note that since the below-described measuring method is one example, the surface roughness Ra may be measured by using another method.

Figure 19A:
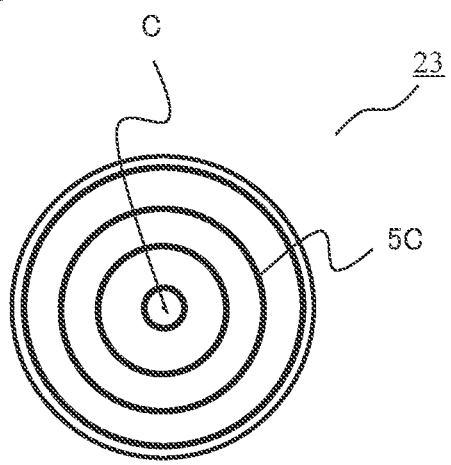
FIG. 19A is a diagram for illustrating a method of measuring the surface roughness of an end surface of a concentric light blocking portion, located on an eye side.

For measuring the surface roughness Ra of the louver 23 in which the concentric light blocking portion 5 is formed as illustrated in FIG. 3B, the louver 23 is set so as to face a direction in which an observer can face the end surface (third surface) 5C on the eye side through the resin of the first base portion 2, as illustrated in FIG. 19A. Specifically, the surface roughness Ra of a square area with sides of about 0.2 mm is measured by using a white-light interferometer, Newview 8300, made by Zygo Corporation. The object lens magnification may be 10. For example, values of the surface roughness Ra of five points of the end surface 5C on the eye side are measured, and an average of the values is determined as the surface roughness Ra of the sample.

Figure 19B:
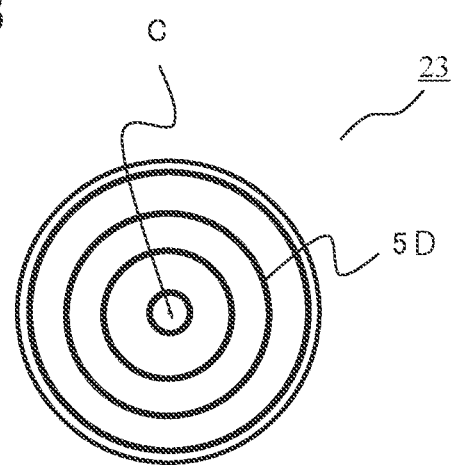
FIG. 19B is a diagram for illustrating a method of measuring the surface roughness of an end surface of the concentric light blocking portion, located on a display panel side.

Similarly, as illustrated in FIG. 19B, the louver 23 is set so as to face a direction in which an observer can face the end surface (fourth surface) 5D on the display panel side through the resin of the second base portion 3. The specific method of measuring the surface roughness Ra is the same as that described with reference to FIG. 19A.

Figure 20A:
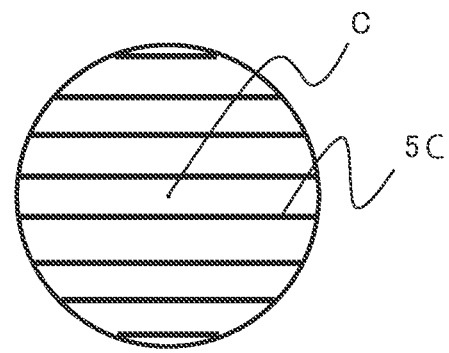
FIG. 20A is a diagram for illustrating a method of measuring the surface roughness of an end surface of a striped light blocking portion, located on an eye side.

For measuring the surface roughness Ra of the louver 23 in which the striped light blocking portion 5 is formed as illustrated in FIG. 3B, the louver 23 is set so as to face a direction in which an observer can face the end surface (third surface) 5C on the eye side through the resin of the first base portion 2, as illustrated in FIG. 20A. Specifically, the surface roughness Ra of a square area with sides of about 0.2 mm is measured by using a white-light interferometer, Newview 8300, made by Zygo Corporation. The object lens magnification may be 10. For example, values of the surface roughness Ra of five points of the end surface 5C on the eye side are measured, and an average of the values is determined as the surface roughness Ra of the sample.

Figure 20B:
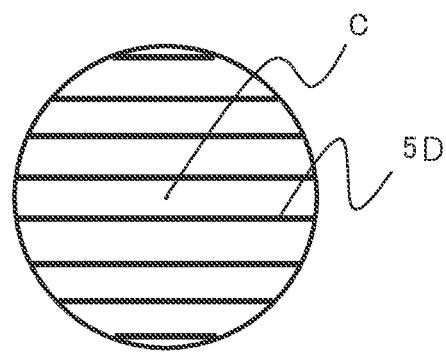
FIG. 20B is a diagram for illustrating a method of measuring the surface roughness of an end surface of the striped light blocking portion, located on a display panel side.

Similarly, as illustrated in FIG. 20B, the louver 23 is set so as to face a direction in which an observer can face the end surface (fourth surface) 5D on the display panel side through the resin of the second base portion 3. The specific method of measuring the surface roughness Ra is the same as that described with reference to FIG. 20A.

Method of Manufacturing Louver

Next, a method of manufacturing the louver of the present embodiment will be described. In the method of manufacturing the louver of the present embodiment, the surface roughness of the light blocking portion of the louver is controlled. Specifically, as one method, when the base portion that serves as a base of the light blocking portion is molded by using resin material, the surface roughness of the base portion is controlled so that the base portion has a predetermined surface roughness. The surface roughness of the base portion can be controlled under conditions of molding, used when the base portion is molded through transfer by using a mold. Specifically, the surface roughness of the base portion can be controlled by selecting a type of resin material, the temperature of the resin material obtained when the resin material is injected, a pressure keeping condition, and the like. The surface roughness of a molding surface of a mold used when the base portion is formed through transfer is especially useful as a parameter for controlling the surface roughness of the light blocking portion of the louver.

As described above, in the method of manufacturing the louver of the present embodiment, the surface roughness of the light blocking portion of the louver is controlled. Specifically, as one method, the surface roughness of the light blocking portion is controlled by coating the base portion with a light blocking material under predetermined conditions. The predetermined conditions include selecting of a coating method, such as liquid-phase coating or vacuum film coating, and selecting of a coating apparatus. If the liquid-phase coating is used, the predetermined conditions include the physical properties of the coating material (e.g., viscosity, temperature, additives, etc.), a coating method (e.g., dispenser, inkjet, coater, etc.), and a drying method (e.g., natural drying, air blow, oven, etc.). The volume of solvent contained in the coating material is especially useful as a parameter for controlling the surface roughness of the light blocking portion of the louver. The above-described methods for controlling the surface roughness of the louver may be used, combined appropriately with each other, or with conditions changed as appropriate.

First Example

A first example of the method of manufacturing a louver of the present embodiment will be described with reference to FIGS. 10A to 10D and 11A to 11C. First, as illustrated in FIG. 10A, an appropriate amount of ultraviolet-curable resin material 11 is given onto the substrate 1 for forming the second base portion 3.

Then, as illustrated in FIG. 10B, the resin material 11 is pressed by using a mold 12 used for forming the shape of the second base portion 3 through transfer, so that the space between the mold 12 and the substrate 1 is filled with the resin material 11 such that no gap is formed. On the mold 12, a pattern is formed, and the pattern is used for forming a plurality of concentric concave and convex portions having different diameters in a main surface of the second base portion 3. The molding surface of the mold 12 is formed so that the shape of the molding surface is transferred to a portion of the second base portion 3, which is a base for forming the end surface 5D (having a desired surface roughness) on the display panel side of the light blocking portion 5. For example, in the second embodiment A illustrated in FIG. 17A, the molding surface of the mold 12 is formed so that the shape of the molding surface having a surface roughness Ra equal to or larger than 20 nm is transferred to a portion of the second base portion 3, which is a base of the end surface 5D on the display panel side of the light blocking portion 5. As a result, the end surface 5D on the display panel side of the light blocking portion 5 has a surface roughness Ra equal to or larger than 20 nm. Note that the shape of the molding surface of the mold 12 can be controlled by adjusting conditions of a cutting process or a blasting process performed when the molding surface is formed on the mold 12.

After the space between the mold 12 and the substrate 1 is filled with the resin material 11, the ultraviolet-curable resin material 11 is irradiated with ultraviolet light emitted from an ultraviolet light source 13, for curing the resin material 11, as illustrated in FIG. 10C. After the resin material 11 is irradiated with the ultraviolet light, the second base portion 3 that is in close contact with the substrate 1 is released from the mold 12, as illustrated in FIG. 10D. After that, the substrate 1 and the second base portion 3 may be set in an oven and heated for completely curing the resin material 11. In this manner, the surface of a portion of the second base portion 3 that is a base of the end surface 5D on the display panel side of the light blocking portion 5 has a predetermined surface roughness.

Then, the light blocking portion is formed on the surface 3b of the second base portion 3, which has been described with reference to FIG. 16B. Specifically, as illustrated in FIG. 11A, the substrate 1 is rotated on a rotation axis that is equal to the center line C of the plurality of concentric circles having different diameters, and the material for the light blocking portion 5 is applied onto the surface 3b of each concentric circle by using a dispenser 14. The coating material that contains the light blocking material is applied onto the surface 3b, with the dispenser 14 being tilted appropriately. Thus, the material can be applied onto the surface 3b alone, without being applied onto the surface 3a. After the coating material is applied onto the surface 3b, the coating material is heated and baked in an oven, for drying and curing the coating material. In this manner, the light blocking portion 5 is formed on the second base portion 3.

In this example, the surface of the base having a predetermined surface roughness is covered with the light blocking material, so that the end surface 5D on the display panel side having a predetermined surface roughness is formed in the light blocking portion 5. The shape of the front surface of the light blocking portion 5 (i.e., the end surface 5C on the eye side) that is exposed to the outside after the light blocking material is applied can be controlled under the conditions of application performed by using the dispenser 14.

For example, if the viscosity of the coating material is decreased by increasing the content of the solvent of the coating material used for forming the light blocking portion, a thin coating film is formed. As a result, the shape of the front surface of the light blocking portion 5 is made substantially equal to the shape of the surface of the base of the light blocking portion 5, with high accuracy. In contrast, if the viscosity of the coating material is increased by decreasing the content of the solvent of the coating material, the shape of the front surface of the light blocking portion 5 tends to be different from the shape of the surface of the base of the light blocking portion 5. In another case, the shape of the front surface of the light blocking portion 5 may be controlled by changing the drying condition (for example, whether air blow is performed or not) used after the coating material is applied. In this example, the coating material is applied after the content of the solvent of the coating material is adjusted so that the surface roughness of the front surface of the light blocking portion 5 becomes smaller than the surface roughness of the base of the light blocking portion 5. As a result, the end surface 5C on the eye side has lower surface roughness and higher flatness.

Then, an appropriate amount of ultraviolet-curable resin material 16 is given onto the second base portion 3 on which the light blocking portion 5 is formed. Then, the resin material 16 is pressed by using a mold plate 15 used for forming the shape of the flat surface of the first base portion 2 through transfer, so that the space between the mold plate 15 and the second base portion 3 on which the light blocking portion 5 is formed is filled with the resin material 16 such that no gap is formed. Note that the mold plate 15 is made of a transparent material that transmits the ultraviolet light, and that the molding surface of the mold plate 15 that contacts the resin material 16 is a flat surface.

After the space between the mold plate 15 and the second base portion 3 is filled with the resin material 16, the ultraviolet-curable resin material 16 is irradiated with ultraviolet light emitted from the ultraviolet light source 13, for curing the resin material 16, as illustrated in FIG. 11B. After the resin material 16 is irradiated with the ultraviolet light, the substrate 1, the second base portion 3, and the first base portion 2 are released from the mold 15, as illustrated in FIG. 11C. After that, the substrate 1, the second base portion 3, and the first base portion 2 may be set in an oven and heated for completely curing the resin material 16.

By using the first example of the above-described manufacturing method, the louver 23 of the present embodiment having two layers that are in close contact with each other can be made.

Second Example

Next, a second example of the method of manufacturing a louver of the present embodiment will be described with reference to FIGS. 12A to 12D and 13A to 13C. The second example differs from the above-described first example in that the substrate 1 is disposed on the first base portion 2 side, and that the surface 2b of the first base portion 2 illustrated in FIG. 16B is formed earlier above the substrate 1 by using a mold. In the second example, as illustrated in FIG. 12A, an appropriate amount of ultraviolet-curable resin material 11 is given onto the substrate 1 for forming the first base portion 2.

Then, as illustrated in FIG. 12B, the resin material 11 is pressed by using a mold 12 used for forming the shape of the first base portion 2 through transfer, so that the space between the mold 12 and the substrate 1 is filled with the resin material 11 such that no gap is formed. On the mold 12, a pattern is formed, and the pattern is used for forming a plurality of concentric concave and convex portions having different diameters in a main surface of the first base portion 2. The molding surface of the mold 12 is formed so that the shape of the molding surface is transferred to a portion of the first base portion 2, which is a base for forming the end surface 5C (having a desired surface roughness) on the eye side of the light blocking portion 5. For example, in the second embodiment A illustrated in FIG. 17A, the molding surface of the mold 12 is formed so that the shape of the molding surface having a surface roughness Ra smaller than 20 nm is transferred to a portion of the first base portion 2, which is a base of the end surface 5C on the eye side of the light blocking portion 5. As a result, the end surface 5C on the eye side of the light blocking portion 5 has a surface roughness Ra equal to or smaller than 20 nm. Note that the shape of the molding surface of the mold 12 can be controlled by adjusting conditions of a cutting process or a blasting process performed when the molding surface is formed on the mold 12.

After the space between the mold 12 and the substrate 1 is filled with the resin material 11, the ultraviolet-curable resin material 11 is irradiated with ultraviolet light emitted from the ultraviolet light source 13, for curing the resin material 11, as illustrated in FIG. 12C. After the resin material 11 is irradiated with the ultraviolet light, the first base portion 2 that is in close contact with the substrate 1 is released from the mold 12, as illustrated in FIG. 12D. After that, the substrate 1 and the first base portion 2 may be set in an oven and heated for completely curing the resin material 11. In this manner, the surface of a portion of the first base portion 2 that is a base of the end surface 5C on the eye side of the light blocking portion 5 has a surface roughness Ra smaller than 20 nm.

Then, the light blocking portion is formed on the surface 2b of the first base portion 2, which has been described with reference to FIG. 16B. Specifically, as illustrated in FIG. 13A, the substrate 1 is rotated on a rotation axis that is equal to the center line C of the plurality of concentric circles having different diameters, and the material for the light blocking portion 5 is applied onto the surface 2b of each concentric circle by using a dispenser 14. The coating material that contains the light blocking material is applied onto the surface 2b, with the dispenser 14 being tilted appropriately. Thus, the material can be applied onto the surface 2b alone, without being applied onto the surface 2a. After the coating material is applied onto the surface 3b, the coating material is heated and baked in an oven, for drying and curing the coating material. In this manner, the light blocking portion 5 is formed on the first base portion 2.

In this example, since the surface of the base of the light blocking portion having a surface roughness Ra smaller than 20 nm is coated with the light blocking material, the shape of the end surface 5C on the eye side is made equal to the shape of the surface of the base of the light blocking portion. As a result, the end surface 5C on the eye side has a surface roughness smaller than 20 nm. The shape of the front surface of the light blocking portion 5 (i.e., the end surface 5D on the display panel side) that is exposed to the outside after the light blocking material is applied can be controlled under the conditions of application performed by using the dispenser 14. For example, if the viscosity of the coating material is increased by decreasing the content of the solvent of the coating material, the shape of the front surface of the light blocking portion 5 tends to be different from the shape of the surface of the base of the light blocking portion. In another case, the shape of the front surface of the light blocking portion 5 may be controlled by changing the drying condition (for example, whether air blow is performed or not) used after the coating material is applied. In this example, the coating material is applied after the content of the solvent of the coating material is adjusted so that the surface roughness of the front surface of the light blocking portion 5 becomes larger than the surface roughness of the base of the light blocking portion. As a result, the surface roughness of the end surface 5D on the display panel side of the light blocking portion 5 has a surface roughness Ra equal to or larger than 20 nm.

Then, an appropriate amount of ultraviolet-curable resin material 16 is given onto the first base portion 2 on which the light blocking portion 5 is formed. Then, the resin material 16 is pressed by using a mold plate 15 used for forming the shape of the flat surface of the second base portion 3 through transfer, so that the space between the mold plate 15 and the first base portion 2 on which the light blocking portion 5 is formed is filled with the resin material 16 such that no gap is formed. Note that the mold plate 15 is made of a transparent material that transmits the ultraviolet light, and that the molding surface of the mold plate 15 that contacts the resin material 16 is a flat surface.

After the space between the mold plate 15 and the first base portion 2 is filled with the resin material 16, the ultraviolet-curable resin material 16 is irradiated with ultraviolet light emitted from the ultraviolet light source 13, for curing the resin material 16, as illustrated in FIG. 13B. After the resin material 16 is irradiated with the ultraviolet light, the substrate 1, the first base portion 2, and the second base portion 3 are released from the mold 15, as illustrated in FIG. 13C. After that, the substrate 1, the second base portion 3, and the first base portion 2 may be set in an oven and heated for completely curing the resin material 16.

By using the second example of the above-described manufacturing method, the louver 23 of the present embodiment having two layers that are in close contact with each other can be made. In this example, the shape of the surface of the mold having the surface roughness Ra smaller than 20 nm is transferred to the portion of the first base portion 2, which is a base of the end surface 5C on the eye side. In addition, the base is coated with the light blocking material, so that the light blocking portion 5 in which the surface roughness Ra of the end surface 5C on the eye side is smaller than 20 nm is formed.

If the louver of the present embodiment is mounted in the head mounted display, the display light can propagate to a user's eye in a state where the loss and disturbance are reduced, and it is possible to reduce the external light and the stray light, produced in the head mounted display, that reach user's eyes.

EXAMPLES

Hereinafter, specific examples and comparative examples will be described. The sample of each of the examples was made by using the second example of the above-described manufacturing method.

First, the conditions common to the examples and the comparative examples will be described. The substrate 1 used was an optical glass that contains boron and silicon. Specifically, the substrate 1 used was a disk-shaped plate having a diameter φ of 45 mm and made by using an S-BSL7 made by OHARA INC. The mold 12 used for forming the concave and convex portion in a base portion was made by cutting a NiP layer plated on a base metal material, by using a precision machine tool, and by forming a desired shape of the surface of the mold 12 that is to be inverted into the shape of the concave and convex portions of the base portion. The NiP layer plated on the base metal material was cut with high precision, and the surface roughness of the surface of the mold 12 was adjusted.

The first base portion 2 was made by using an ultraviolet-curable acrylic-resin compound that has a refractive index of 1.58 after the resin is cured. The annular light blocking portion 5 was made by applying the coating material of the light blocking portion 5 onto the concentric circles of the first base portion 2 by using a dispenser, from an oblique direction, while the substrate 1 was rotated on the center of rotation that is equal to the center of the concentric circles of the first base portion 2. The striped light blocking portion 5 was made by applying the coating material of the light blocking portion 5 onto the first base portion 2 by using a dispenser, from an oblique direction, while the first base portion 2 was scanned by the dispenser along a straight line. The reason the dispenser was used is that the dispenser can inject an appropriate amount of coating material for forming a film having a thickness of about and that the number (e.g., about 20) of the light blocking portions formed per one substrate is small. In addition, the use of dispenser is convenient for processes performed before and after the coating process. The coating material was made by diluting undiluted solution with organic solvent. Then, the substrate 1 and the first base portion 2 were set in an oven that was set at 80° C., and heated and dried for four hours.

The shape of the light blocking portions of Examples 5 to 8 and 10 to 11 and Comparative Example 4 is concentric in a plan view. A pitch P of light blocking portions (i.e., a distance between adjacent light blocking portions, or the difference between radii of adjacent concentric circles) was set at 1 mm. In addition, the length L1 of the light blocking portion 5 in the direction of the optical axis was set at 1 mm. In addition, the thickness t of the light blocking portion 5 (i.e., a width of the light blocking portion viewed from the direction of the optical axis OX) was set at 10 μm. The light blocking portion 5 of Example 9 has a striped shape in a plan view in which parallel stripes are formed as illustrated in FIG. 3A. The second base portion 3 was made by using the ultraviolet-curable resin-material compound, which is the same as that of the first base portion 2; and the louver element having two layers that are in close contact with each other was completed.

Each sample was evaluated as described below. The head mounted display in which a louver element to be evaluated had been mounted was set in a darkroom in which the head mounted display is not affected by the external light. In addition, a digital camera was set at a position that corresponds to a position of an eye of a user that wears the head mounted display.

First, for evaluating the deterioration of quality of images caused by the display light being reflected from a main surface and the end surface 5D of the light blocking portion, a chart in which black-and-white solid squares, each having sides of 1 mm, were arranged like a lattice, was displayed on the head mounted display, and the image of the chart was captured by the digital camera. The ratio of the white-color display portions to the black-color display portions, based on data, was 1:1. The light-intensity average value of five white-color display portions of an image captured by the digital camera was determined as an intensity of white-color display portion, and the light-intensity average value of five black-color display portions of an image captured by the digital camera was determined as an intensity of black-color display portion.

In a case where the ratio of the intensity of display light from the black-color display portion to the intensity of display light from the white-color display portion was equal to or smaller than 0.01, the sample was evaluated as "A" or "Good". In contrast, in a case where the ratio of the intensity of display light from the black-color display portion to the intensity of display light from the white-color display portion was larger than 0.01, the sample was evaluated as "B" or "Poor".

Next, for evaluating the deterioration of quality of images caused by the external light or the stray light, produced by the reflection of the external light, being reflected from an end surface of the light blocking portion 5 (in particular, the end surface 5C on the eye side), a white parallel light having a diameter of 5 mm and used instead of the external light or the stray light, produced by the reflection of the external light, was emitted from an LED lamp. The white parallel light was emitted from six directions. The six directions were defined such that three directions inclined by 45°, 60°, and 75° with respect to a Y-Z plane of the louver element were defined, and that the three angles were defined in two directions: an upward direction extending from the rear viewed from a user, and a sideward direction extending from the rear viewed by the user. In addition, the louver was irradiated with the white parallel light at three positions: a center position of the louver, a midpoint between the center and an outer circumferential edge of the louver in the upward direction Z, and a midpoint between the center and an outer circumferential edge of the louver in the sideward direction Y. Thus, the number of conditions on directions and positions of the irradiation are 18 in total. In addition, the intensity of the white parallel light per unit area was set 100 times larger than the intensity of light from a white screen of the display panel 21. In a state where a white screen was produced by the display panel 21 and the LED lamp was on, an image of the white screen was captured by the digital camera. The light-intensity average value of five white-color display portions captured by the digital camera was determined as an intensity of white-color display portion. After that, in a state where a black screen was produced by the display panel 21 and the light was emitted from the LED lamp under the above-described 18 conditions, the light-intensity average value of all portions of an image captured by the digital camera was determined an intensity of undesired light.

In a case where the ratio of the intensity of undesired light to the intensity of white-color display portion was equal to or smaller than 0.01, the sample was evaluated as "A" or "Good". In contrast, in a case where the ratio of the intensity of undesired light to the intensity of white-color display portion was larger than 0.01, the sample was evaluated as "B" or "Poor".

Example 5

One portion of the molding surface of the mold 12 used for forming the base portion is a portion whose shape is transferred to the base of the end surface 5C on the eye side, and the surface roughness Ra of the one portion of the molding surface of the mold 12 was set at 8 nm. The surface roughness Ra of a portion of the first base portion 2, which is a base of the end surface 5C on the eye side and to which the shape of the one portion of the molding surface of the mold 12 had been transferred, was 8 nm. The base of the end surface 5C on the eye side was coated with the coating material, which is the raw material of the light blocking portion 5, by using the dispenser 14. The coating raw material used was a solution in which an undiluted solution was diluted 4 times with organic solvent. The surface roughness Ra of the end surface 5C on the eye side was 8 nm. In addition, the surface roughness Ra of the end surface 5D on the display panel side was 100 nm. The surface roughness Ra of the main surface 5A of the light blocking portion closer to the center line C and the surface roughness Ra of the main surface 5B of the light blocking portion opposite to the center line C with respect to the light blocking portion were both 8 nm.

Example 6

The louver of Example 6 was made by using the same method as that for the louver of Example 5, except for the coating material used for making the light blocking portion 5. In Example 6, the coating raw material used was a solution in which an undiluted solution was diluted 1.5 times with organic solvent. As in Example 5, the surface roughness Ra of the end surface 5C on the eye side was 8 nm. In addition, as the result of changing the dilution factor, the surface roughness Ra of the end surface 5D on the display panel side was 9000 nm. The surface roughness Ra of the main surface 5A of the light blocking portion closer to the center line C and the surface roughness Ra of the main surface 5B of the light blocking portion opposite to the center line C with respect to the light blocking portion were both 8 nm.

Example 7

The louver of Example 7 was made by using the same method as that for the louver of Example 5, except for the coating material used for making the light blocking portion 5. In Example 7, the coating raw material used was a solution in which an undiluted solution was diluted 10 times with organic solvent. As in Example 5, the surface roughness Ra of the end surface 5C on the eye side was 8 nm. In addition, as the result of changing the dilution factor, the surface roughness Ra of the end surface 5D on the display panel side was 25 nm. The surface roughness Ra of the main surface 5A of the light blocking portion closer to the center line C and the surface roughness Ra of the main surface 5B of the light blocking portion opposite to the center line C with respect to the light blocking portion were both 8 nm.

Example 8

The louver of Example 8 was made by using the same method as that for the louver of Example 5, except that the surface roughness Ra of the portion of the molding surface of the mold 12 (used for forming the base portion), whose shape is transferred to the base of the end surface 5C on the eye side, was set at 20 nm. The surface roughness Ra of a portion of the first base portion 2, which is a base of the end surface 5C on the eye side and to which the shape of the portion of the molding surface of the mold 12 had been transferred, was 18 nm. The surface roughness Ra of the end surface 5C on the eye side, formed through the coating, was 18 nm. In addition, the surface roughness Ra of the end surface 5D on the display panel side was 100 nm. The surface roughness Ra of the main surface 5A of the light blocking portion closer to the center line C and the surface roughness Ra of the main surface 5B of the light blocking portion opposite to the center line C with respect to the light blocking portion were both 8 nm.

Example 9

The louver of Example 9 was made by using the same method as that for the louver of Example 5, except that the concave and convex portion of the mold 12 used for forming the base portion was stripe-shaped. As in Example 5, the surface roughness Ra of the end surface 5C on the eye side was 8 nm. In addition, the surface roughness Ra of the end surface 5D on the display panel side was 100 nm. The surface roughness Ra of the main surface 5A of the light blocking portion closer to the center line C and the surface roughness Ra of the main surface 5B of the light blocking portion opposite to the center line C with respect to the light blocking portion were both 8 nm.

Example 10

The louver of Example 10 was made by using the same method as that for the louver of Example 5, except that the surface roughness Ra of the portion of the molding surface of the mold 12 (used for forming the base portion), whose shape is transferred to the base of the end surface 5A closer to the center line C, was set at 100 nm. As in Example 5, the surface roughness Ra of the end surface 5C on the eye side was 8 nm, the surface roughness Ra of the end surface 5D on the display panel side was 100 nm, and the surface roughness Ra of the main surface 5B opposite to the center line C with respect to the light blocking portion was 8 nm. However, the surface roughness Ra of the main surface 5A closer to the center line C was 100 nm.

Example 11

The louver of Example 11 was made by using the same method as that for the louver of Example 7, except that the dilution factor for Example 11 was made larger than that of Example 7. As in Example 7, the surface roughness Ra of the end surface 5C on the eye side was 8 nm. In addition, as the result of changing the dilution factor, the surface roughness Ra of the end surface 5D on the display panel side was 8 nm. The surface roughness Ra of the main surface 5A of the light blocking portion closer to the center line C and the surface roughness Ra of the main surface 5B of the light blocking portion opposite to the center line C with respect to the light blocking portion were both 8 nm.

Comparative Example 4

The Comparative Example 4 is a specific example of the fourth comparative embodiment described with reference to FIG. 18A, and the louver of Comparative Example 4 was made by using the same method as that for the louver of Example 5, except that the end surface 5C on the eye side was roughened and had a surface roughness Ra of 100 nm. That is, one portion of the molding surface of the mold 12 used for forming the base portion is a portion whose shape is transferred to the base of the end surface 5C on the eye side, and the surface roughness Ra of the one portion of the molding surface of the mold 12 was set at 100 nm. The surface roughness Ra of the end surface 5C on the eye side of Comparative Example 4 was larger than those of the other examples, and was 100 nm.

Table 2 illustrates the evaluation results of the examples and the comparative example.

TABLE 2

| EVALUATION SAMPLE | SHAPE OF LIGHT BLOCKING PORTION | SURFACE ROUGHNESS Ra OF 5A | SURFACE ROUGHNESS Ra OF 5B | SURFACE ROUGHNESS Ra OF 5C | SURFACE ROUGHNESS Ra OF 5D | REFLECTION OF EXTERNAL LIGHT | REFLECTION OF DISPLAY LIGHT |
| --- | --- | --- | --- | --- | --- | --- | --- |
| EXAMPLE 5 | ANNULAR | 8 nm | 8 nm | 8 nm | 100 nm | A | A |
| EXAMPLE 6 | ANNULAR | 8 nm | 8 nm | 8 nm | 9000 nm | A | A |
| EXAMPLE 7 | ANNULAR | 8 nm | 8 nm | 8 nm | 25 nm | A | A |
| EXAMPLE 8 | ANNULAR | 8 nm | 8 nm | 18 nm | 100 nm | A | A |
| EXAMPLE 9 | LINEAR | 8 nm | 8 nm | 8 nm | 100 nm | A | A |
| EXAMPLE 10 | ANNULAR | 100 nm | 8 nm | 8 nm | 100 nm | A | A |
| EXAMPLE 11 | ANNULAR | 8 nm | 8 nm | 8 nm | 8 nm | A | B |
| COMPARATIVE EXAMPLE 4 | ANNULAR | 8 nm | 8 nm | 100 nm | 100 nm | B | A |

When the louver of each of Examples 5 to 11 was mounted in the head mounted display and used, it was possible to reduce the external light that significantly affects the quality of images, and that is reflected from the end surface 5C on the eye side and reaches user's eyes. In Examples 5 to 10, the deterioration in contrast caused by the display light being reflected from the end surface 5D on the display panel side was reduced. In Example 10, since the surface roughness Ra of the main surface 5A closer to the center line C was made larger than the surface roughness Ra of the main surface 5B opposite to the center line C with respect to the light blocking portion, it was also possible to reduce the influence caused by the external light being reflected from the main surfaces 5A and 5B. In contrast, when the louver of Comparative Example 4 was mounted in the head mounted display and used, it was observed that part of the external light (that significantly affects the quality of images) reflected from the end surface 5C on the eye side tends to easily reach user's eyes and cause the deterioration of quality of images.

Third Embodiment

Louver Body

The third embodiment differs from the first and second embodiments in that the louver 23 has a second light blocking portion 30, on the side surface 2D. The shape of the light blocking portion 5 as the first light blocking portion in the third embodiment may be different from that in the first and second embodiments.

Preferably, the surface roughness Ra of the main surface 5A closer to the center line C is larger than the surface roughness Ra of the main surface 5B opposite to the center line C with respect to the light blocking portion 5, as in the first embodiment.

Preferably, the end surface 5C on the eye side of the light blocking portion 5 has a surface roughness Ra smaller than 20 nm, as in the second embodiment.

Figure 21A:
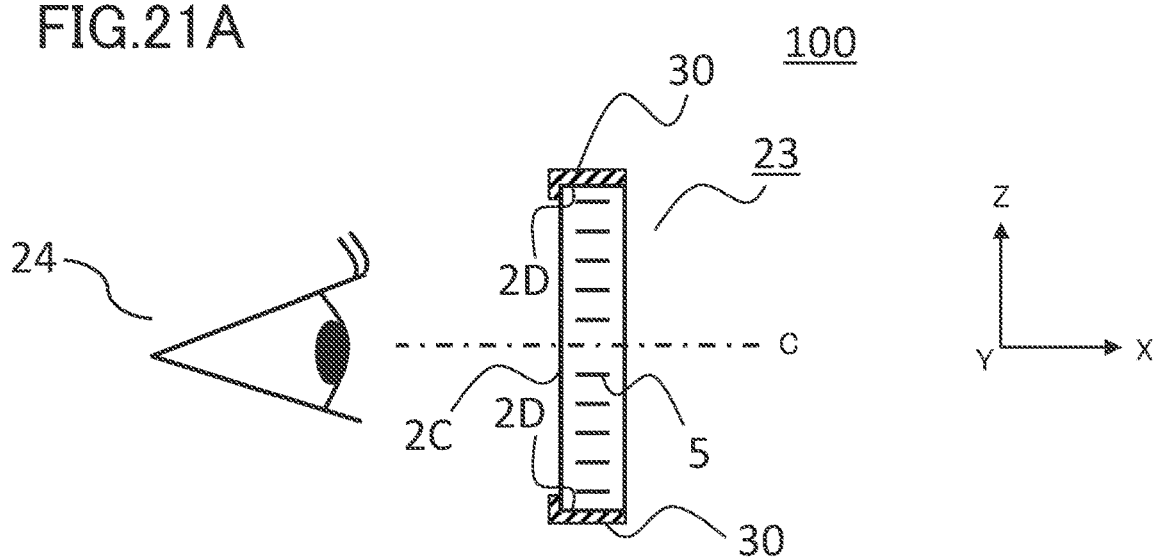
FIG. 21A is a schematic cross-sectional view illustrating a cross section of a plate-like louver 23 of the third embodiment, taken along a direction perpendicular to a main surface of the louver 23.

FIG. 21A is a schematic cross-sectional view illustrating a cross section of the plate-like louver 23 of the third embodiment, taken along a direction perpendicular to a main surface of the louver 23. The second light blocking portion 30 is formed on the side surface 2D of the louver 23.

Preferably, the second light blocking portion 30 is formed to cover all of the side surface 2D. Preferably, the second blocking portion 30 is formed to cover a part of the eye side of the surface 2C of the base portion. Preferably, the thickness of the second light blocking potion 30 is a value in a range equal to or larger than 0.1 μm and equal to or smaller than 45 The thickness of 0.1 μm or more is preferable to ensure sufficient light blocking performance against external light, and the thickness of 45 μm or less is preferable to maintain good outline accuracy of the element.

Figure 23A:
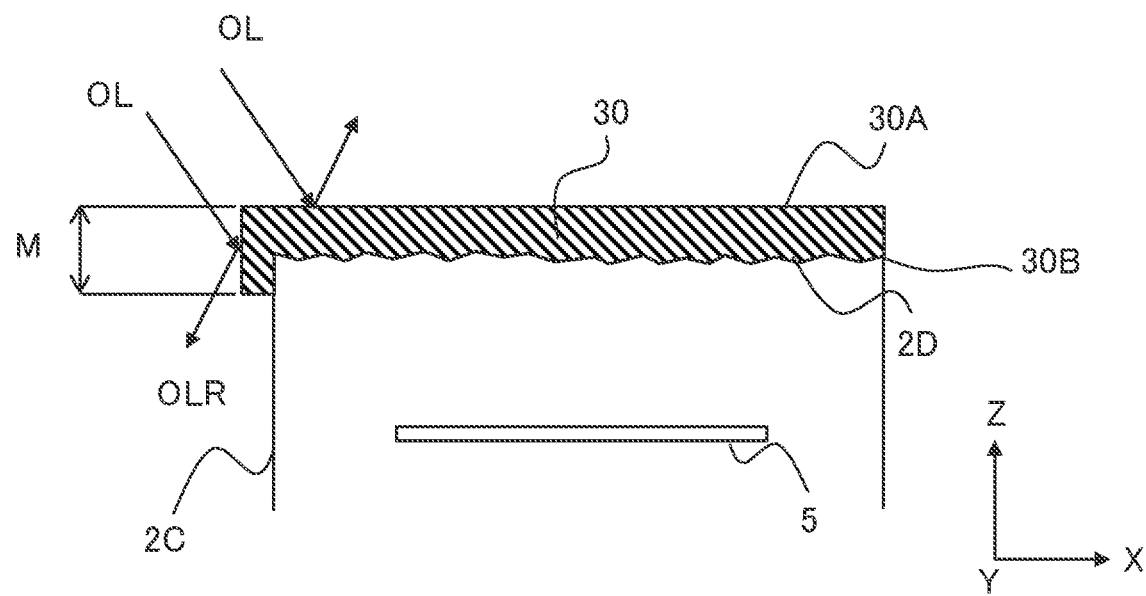
FIG. 23A is a schematic cross-sectional view for illustrating an optical effect of a light blocking portion of the embodiment 3A.

In the embodiment 3A, as shown in FIG. 23A, the second light blocking portion 30 is formed so as to cover the outer periphery of the eye side surface 2C of the louver 23. The length M of the second light blocking portion 30 covering the eye side surface 2D of the louver 23 is preferably 0.01 mm or more and 1 mm or less. If it is less than 0.01 mm, it is difficult to sufficiently cover the outer periphery from the viewpoint of manufacturing, and if it is more than 1 mm, the optical effective range of the louver may be narrowed.

The second light blocking portion 30 is made of a light-absorbing material that absorbs the visible light. The light-absorbing material used for the second light blocking portion 30 may be the same as or different from the light-absorbing material used for the light blocking portion 5 inside the louver element.

The material that absorbs the visible light may be selected appropriately from a coating material that contains pigment and a coating material that contains dye. In particular, a black coating material is preferably selected if higher light-absorption capacity is required, and a coating material that contains pigment is preferably used if higher durability is required. Examples of the pigment include ivory black, peach black, lamp black, bitumen, carbon black, and aniline black. Among these pigments, carbon black or aniline black is preferably used. Note that the color material can be selected and used as appropriate, for example, for producing the effect in accordance with a wavelength of the incident external light.

Surface Roughness of Second Light Blocking Portion

Figure 22:
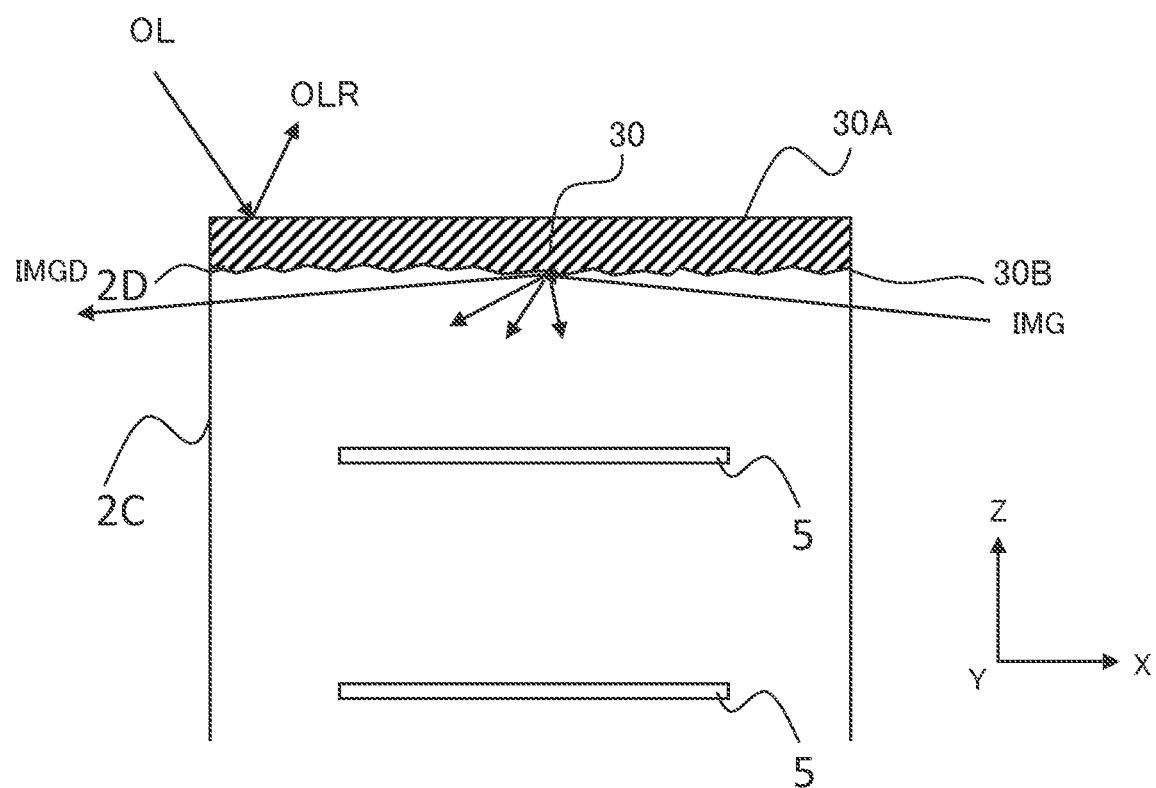
FIG. 22 is a schematic cross-sectional view for illustrating an optical effect of a light blocking portion of the third embodiment.

Next, surface roughness of the second light blocking portion 30 that is one of features of the present embodiment will be described with reference to FIG. 22. Preferably, the fifth surface 30A of the second light blocking portion 30 opposite to the centerline C of the louver 23 has a surface roughness Ra smaller than 20 nm. Preferably, the sixth surface 30B of the second light blocking portion 30 closer to the centerline C of the louver 23 has a surface roughness Ra larger than the surface roughness of the fifth surface 30A.

When the louver is used, components of the external light having lower incident angles with respect to the louver are blocked by a user's head. Thus, other components of the external light having higher incident angles with respect to the louver enter the housing.

The fifth surface 30A of the second light blocking portion 30 of the louver 23 of the third embodiment is a flat surface that has higher flatness and that has a surface roughness Ra smaller than 20 nm. Most of the external light OL irradiated on the fifth surface 30A of the second light-shielding portion 30 may be absorbed by the light-shielding portion. Thus, as illustrated in FIG. 22, a part of the external light OL that is incident on the fifth surface 30A of the second light blocking portion 30 at a high incident angle is reflected from the fifth surface 30A of the second light blocking portion 30, toward a direction in which the reflected external light OLR does not reach a user's eye. That is, in the third embodiment, it is possible to reduce the deterioration of quality of images, such as flare or ghost, caused by the reflection of the external light OL.

Next, the influence caused by the display light IMG with which the interface between the second light blocking portion 30 and the light transmitting portion is irradiated in the third embodiment will be described. In the third embodiment, since the sixth surface of the second light blocking portion 30, that is interface between the second light blocking portion 30 and the light transmitting portion 2, is a rough surface having a surface roughness Ra equal to or larger than 20 nm, the display light IMG is reflected as scattered light IMGD, as illustrated in FIG. 22. The scattered light reflected toward various directions has low intensity. Thus, even if part of the scattered light travels toward a user's eye in an optical path, the part of the scattered light, which has low intensity, hardly causes the deterioration of quality of images, such as ghost or the deterioration in contrast.

Further, in embodiment 3A, as shown in FIG. 23A, the second light blocking portion 30 is formed so as to cover the outer periphery of the eye side surface 2C of the louver 23. Therefore, as shown in FIG. 23A, the external light OL applied to the second light blocking portion is partially reflected as OLR in a direction not reaching the user's eye.

Figure 23B:
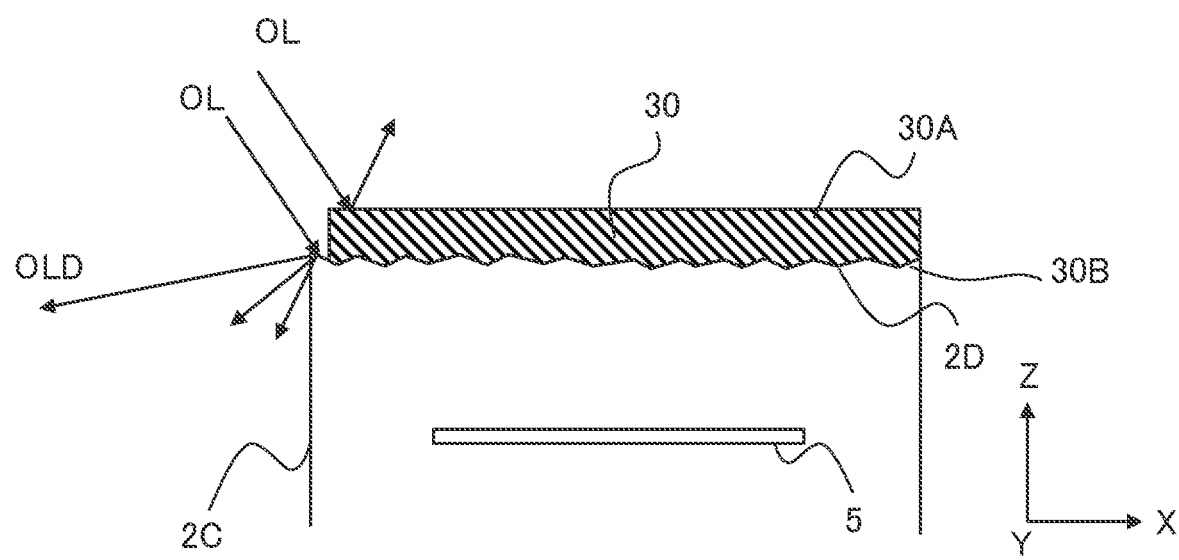
FIG. 23B is a schematic cross-sectional view for illustrating an optical effect of a light blocking portion of the embodiment 3B.

On the other hand, in Embodiment 3B, as shown in FIG. 23B, the light transmitting portion 2 is exposed on the outer periphery of the eye side surface 2C of the louver 23. Therefore, as shown in FIG. 23B, the external light OL is scattered, and the light beam directed to the user's eye as the scattered light OLD may cause effects such as ghost or the deterioration in contrast.

Both of the embodiment 3A and the embodiment 3B can reduce flare or ghost caused by the external light OL or the display light IMG. In addition to this, the embodiment 3A can effectively reduce the deterioration of quality of images, such as ghost or the deterioration in contrast, caused by the external light.

Method of Manufacturing Louver

Next, a method of manufacturing the louver of the present embodiment will be described. In particular, the process of providing the second light blocking portion 30 will be described.

In the method of manufacturing the louver of the present embodiment, the surface roughness of the interface of the second light blocking portion 30 of the louver with the light transmitting portion 2, that is sixth surface 30B, is controlled. Specifically, as one method, when the base portion that serves as a base of the second light blocking portion 30 is molded by using resin material, the surface roughness of the base portion is controlled so that the base portion has a predetermined surface roughness. The surface roughness of the base portion can be controlled under conditions of molding, used when the base portion is molded through transfer by using a mold. Specifically, the surface roughness of the base portion can be controlled by selecting a type of resin material, the temperature of the resin material obtained when the resin material is injected, a pressure keeping condition, and the like. The surface roughness of a molding surface of a mold used when the base portion is formed through transfer is especially useful as a parameter for controlling the surface roughness of the light blocking portion of the louver.

The surface roughness of the side surface of the substrate 1 is controlled by material of the substrate 1, adjusting conditions of a polishing process or blasting process. As described above, in the method of manufacturing the louver of the present embodiment, the surface roughness of the fifth surface 30A of the second light blocking portion 30 of the louver is controlled. Specifically, as one method, the surface roughness of the light blocking portion is controlled by coating the base portion with a light blocking material under predetermined conditions. The predetermined conditions include selecting of a coating method, such as liquid-phase coating or vacuum film coating, and selecting of a coating apparatus. If the liquid-phase coating is used, the predetermined conditions include the physical properties of the coating material (e.g., viscosity, temperature, additives, etc.), a coating method (e.g., dispenser, inkjet, coater, etc.), and a drying method (e.g., natural drying, air blow, oven, etc.). The volume of solvent contained in the coating material is especially useful as a parameter for controlling the surface roughness of the light blocking portion of the louver.

Figure 24:
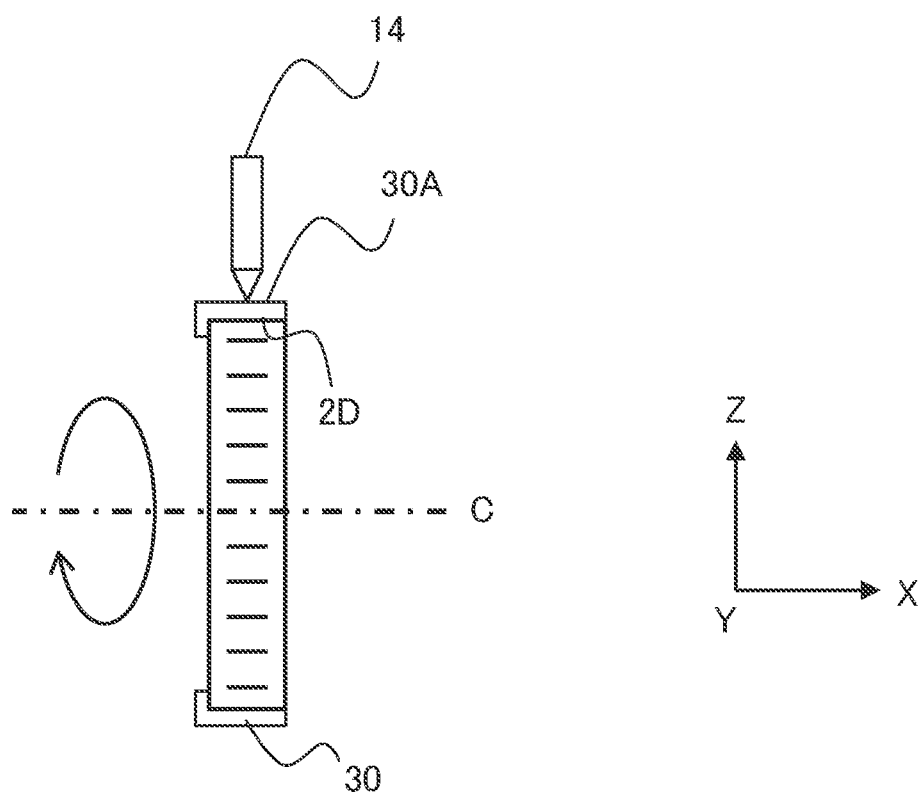
FIG. 24 is a diagram illustrating a stage in which a material for the second light blocking portion is applied by using a dispenser in the method of manufacturing a louver of the third embodiment.

The louver body is manufactured in the same manner as in the first embodiment or second embodiment. Then, the second light blocking portion 30 is formed on the side surface 2D of the louver body. Specifically, as illustrated in FIG. 24, the louver body is rotated on a rotation axis that is equal to the center line C, and the material for the second light blocking portion 30 is applied onto the side surface 2D by using a dispenser 14. After the coating material is applied onto the side surface 2D, the coating material is heated and baked in an oven, for drying and curing the coating material. In this manner, the second light blocking portion 30 is formed on the side surface 3D of the louver body.

In this example, the side surface 2D of the louver body has a surface roughness equal to or larger than 20 nm and equal to or smaller than 2000 nm. The side surface 2D of the louver body is covered with the light blocking material, so that the interface between the second light blocking portion 30 and the light transmitting potion 2 is formed. Thus, the surface shape of the sixth surface 30B is formed by inverting the surface shape of the side surface 2D of the louver body as it is, and the surface roughness is 20 nm or more and 2000 nm or less.

The shape of the fifth surface 30A of the second light blocking portion 30 that is exposed to the outside after the light blocking material is applied can be controlled under the conditions of application performed by using the dispenser 14. For example, if the viscosity of the coating material is decreased by increasing the content of the solvent of the coating material used for forming the second light blocking portion 30, a thin coating film is formed. As a result, the shape of the fifth surface 30A of the second light blocking portion 30 is made substantially equal to the shape of the surface of the base of the second light blocking portion 30, with high accuracy. In contrast, if the viscosity of the coating material is increased by decreasing the content of the solvent of the coating material, the shape of the fifth surface 30A of the second light blocking portion 30 tends to be different from the shape of the surface of the base of the second light blocking portion 30. In another case, the shape of the front surface of the second light blocking portion 30 may be controlled by changing the drying condition (for example, whether air blow is performed or not) used after the coating material is applied. In this example, the coating material is applied after the content of the solvent of the coating material is adjusted so that the surface roughness of the fifth surface 30A of the second light portion 30 becomes smaller than the surface roughness of the base of the second light blocking portion 30. As a result, the fifth surface 30A of the second light blocking portion 30 has lower surface roughness than the sixth surface 30B of the second light blocking portion 30.

If the louver of the present embodiment is mounted in the head mounted display, the display light can propagate to a user's eye in a state where the loss and disturbance are reduced, and it is possible to reduce the external light and the stray light, produced in the head mounted display, that reach a user's eyes.

EXAMPLES

Hereinafter, specific examples and comparative examples will be described. The sample of each of the examples was made by using the second example of the above-described manufacturing method.

First, the conditions common to the examples and the comparative examples will be described. The substrate 1 used was an optical glass that contains boron and silicon. Specifically, the substrate 1 used was a disk-shaped plate having a diameter φ of 45 mm and made by using an S-BSL7 made by OHARA INC. The mold 12 used for forming the concave and convex portion in a base portion was made by cutting a NiP layer plated on a base metal material, by using a precision machine tool, and by forming a desired shape of the surface of the mold 12 that is to be inverted into the shape of the concave and convex portions of the base portion. The NiP layer plated on the base metal material was cut with high precision, and the surface roughness of the surface of the mold 12 was adjusted.

The first base portion 2 was made by using an ultraviolet-curable acrylic-resin compound that has a refractive index of 1.58 after the resin is cured. The annular light blocking portion 5 was made by applying the coating material of the light blocking portion 5 onto the concentric circles of the first base portion 2 by using a dispenser, from an oblique direction, while the substrate 1 was rotated on the center of rotation that is equal to the center of the concentric circles of the first base portion 2. The striped light blocking portion 5 was made by applying the coating material of the light blocking portion 5 onto the first base portion 2 by using a dispenser, from an oblique direction, while the first base portion 2 was scanned by the dispenser along a straight line. The reason the dispenser was used is that the dispenser can inject an appropriate amount of coating material for forming a film having a thickness of about and that the number (e.g., about 20) of the light blocking portions formed per one substrate is small. In addition, the use of dispenser is convenient for processes performed before and after the coating process. The coating material was made by diluting undiluted solution with organic solvent. Then, the substrate 1 and the first base portion 2 were set in an oven that was set at 80° C., and heated and dried for four hours.

Figure 21B:
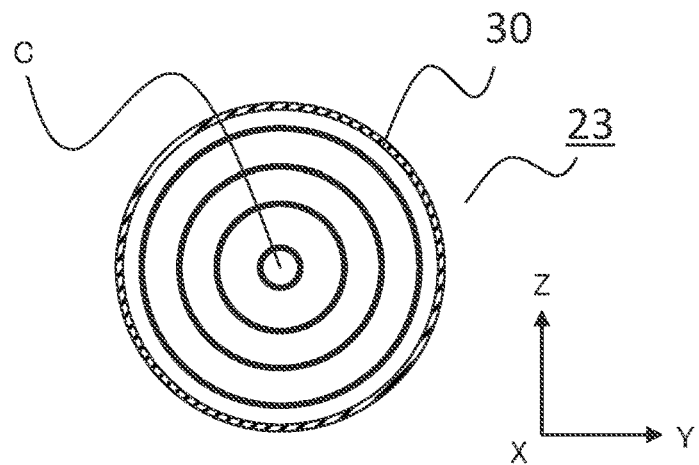
FIG. 21B is a plan view of the louver 23 in which a main surface of the louver 23 is viewed from a direction of an optical axis OX.
Figure 21C:
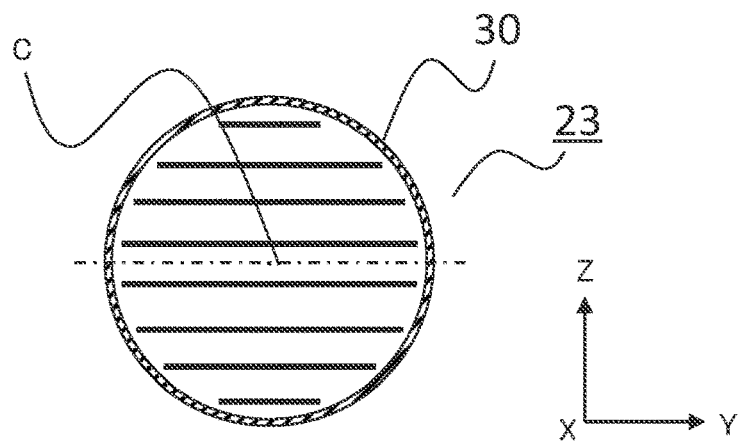
FIG. 21C is a plan view of a louver 23 of a modification in which a main surface of the louver 23 is viewed from the direction of the optical axis OX.

The shape of the first light blocking portions of Examples 12 to 14 and 16 to 17 and Comparative Example 5 is concentric in a plan view. A pitch P of light blocking portions (i.e., a distance between adjacent light blocking portions, or the difference between radii of adjacent concentric circles) was set at 1 mm as illustrated in FIG. 21B. In addition, the length L1 of the light blocking portion 5 in the direction of the optical axis was set at 1 mm. In addition, the thickness t of the first light blocking portion 5 (i.e., a width of the first light blocking portion viewed from the direction of the optical axis OX) was set at 10 μm. The first light blocking portion 5 of Example 15 has a striped shape in a plan view in which parallel stripes are formed as illustrated in FIG. 21C.

The second base portion 3 was made by using the ultraviolet-curable resin-material compound, which is the same as that of the first base portion 2; and the louver element having two layers that are in close contact with each other and not having the second light blocking portion was completed.

The second light blocking portion 30 was made by applying the coating material of the second light blocking portion 30 onto the center line C of the louver body 23 by using a dispenser. After the coating, the louver was set in an oven that was set at 80° C., and heated and dried for four hours. The refractive index obtained after the coating material was dried was 1.68.

Each sample was evaluated as described below. The head mounted display in which a louver element to be evaluated had been mounted was set in a darkroom in which the head mounted display is not affected by the external light. In addition, a digital camera was set at a position that corresponds to a position of an eye of a user that wears the head mounted display.

First, for evaluating the deterioration of quality of images caused by the display light being reflected from an interface between the sixth surface 30B of the second light blocking portion 30 and the light transmitting portion, a chart in which black-and-white solid squares, each having sides of 1 mm, were arranged like a lattice, was displayed on the head mounted display, and the image of the chart was captured by the digital camera. The ratio of the white-color display portions to the black-color display portions, based on data, was 1:1. The light-intensity average value of five white-color display portions of an image captured by the digital camera was determined as an intensity of white-color display portion, and the light-intensity average value of five black-color display portions of an image captured by the digital camera was determined as an intensity of black-color display portion.

In a case where the ratio of the intensity of display light from the black-color display portion to the intensity of display light from the white-color display portion was equal to or smaller than 0.01, the sample was evaluated as "A" or "Good". In contrast, in a case where the ratio of the intensity of display light from the black-color display portion to the intensity of display light from the white-color display portion was larger than 0.01, the sample was evaluated as "B" or "Poor".

Next, for evaluating the deterioration of quality of images caused by the external light or the stray light, produced by the reflection of the external light, being reflected from the fifth surface 30A of the second light blocking portion 30, a white parallel light having a diameter of 5 mm and used instead of the external light or the stray light, produced by the reflection of the external light, was emitted from an LED lamp. The white parallel light was emitted from six directions. The six directions were defined such that three directions inclined by 45°, 60°, and 75° with respect to a Y-Z plane of the louver element were defined, and that the three angles were defined in two directions: an upward direction extending from the rear viewed from a user, and a sideward direction extending from the rear viewed from a user. In addition, the louver was irradiated with the white parallel light at three positions: a center position of the louver, a midpoint between the center position and an outer circumferential edge of the louver in the upward direction Z, and a midpoint between the center position and an outer circumferential edge of the louver in the sideward direction Y. Thus, the number of conditions on directions and positions of the irradiation are 18 in total. In addition, the intensity of the white parallel light per unit area was set 100 times larger than the intensity of light from a white screen of the display panel 21. In a state where the white screen was produced by the display panel 21 and the LED lamp was on, an image of the white screen was captured by the digital camera. The light-intensity average value of five white-color display portions of an image captured by the digital camera was determined as an intensity of white-color display portion. After that, in a state where a black screen was produced by the display panel 21 and the light was emitted from the LED lamp under the above-described 18 conditions, the light-intensity average value of all portions of an image captured by the digital camera was determined an intensity of undesired light.

In a case where the ratio of the intensity of undesired light to the intensity of white-color display portion was equal to or smaller than 0.01, the sample was evaluated as "A" or "Excellent". In a case where the ratio of the intensity of undesired light to the intensity of white-color display portion was larger than 0.01 and equal to or smaller than 0.02, the sample was evaluated as "A-" or "Good". In contrast, in a case where the ratio of the intensity of undesired light to the intensity of white-color display portion was larger than 0.02, the sample was evaluated as "B" or "Poor".

Example 12

The substrate 1 had a side surface roughness Ra of 100 nm. The surface roughness Ra of the molding surface of the mold 12 for forming the base portion was set at 100 nm. The surface roughness Ra of the side surface 2D of the louver body 23, whose shape was formed by the mold 12 through transfer, was 100 nm. The side surface 2D of the louver body 23 was coated with the coating material, which is the raw material of the second light blocking portion 30, by using the dispenser 14. The coating material was coated to a range of 0.3 mm from the side surface 2D of the louver 23 so as to cover the surface 2C on the eye side from the side surface 2D of the louver.

The coating raw material used was a solution in which an undiluted solution was diluted 4 times with organic solvent. The surface roughness Ra of the sixth surface 30B of the second light blocking portion 30 was 100 nm. The surface roughness Ra of the fifth surface 30A of the second light blocking portion 30 was 8 nm. As described above, in Example 12, the surface roughness Ra of the surfaces of the second light blocking portion 30B satisfies the relationship of 30B>30A.

Example 13

The coating material was coated so that the corners was exposed without covering the eye side surface 2C from the side surface 2D of the louver body 23. Otherwise, Example 13 was prepared in the same manner as in Example 12.

Example 14

The substrate 1 had a side surface roughness Ra of 1800 nm. The surface roughness Ra of the molding surface of the mold 12 for forming the base portion was set at 1800 nm. The surface roughness Ra of the side surface 2D of the louver body, whose shape was formed by the mold 12 through transfer, was 1800 nm. The side surface 2D of the louver body was coated with the coating material, which is the raw material of the second light blocking portion 30, by using the dispenser 14. The coating material was coated to a range of 0.3 mm from the side surface 2D of the louver so as to cover the surface 2C on the eye side from the side surface 2D of the louver.

The coating raw material used was a solution in which an undiluted solution was diluted 4 times with organic solvent. The surface roughness Ra of the sixth surface 30B of the second light blocking portion 30 was 1800 nm. The surface roughness Ra of the fifth surface 30A of the second light blocking portion 30 was 18 nm.

Example 15

The louver of Example 15 was made by using the same method as that for the louver of Example 12, except that the concave and convex portion of the mold 12 used for forming the base portion was stripe-shaped. The surface roughness Ra of the surface 30B of the second light blocking portion 30 was 100 nm. The surface roughness Ra of the surface 30A of the second light blocking portion 30 was 8 nm.

Example 16

The louver of Example 16 was made by using the same method as that for the louver of Example 12, except for the coating material used for making the second light blocking portion 30. In Example 16, the coating raw material used was a solution in which an undiluted solution was diluted 20 times with organic solvent.

The surface roughness Ra of the sixth surface 30B of the second light blocking portion 30 was 20 nm. The surface roughness Ra of the fifth surface 30A of the second light blocking portion 30 was 20 nm.

Example 17

The substrate 1 had a side surface roughness Ra of 18 nm. The surface roughness Ra of the molding surface of the mold 12 for forming the base portion was set at 18 nm. The surface roughness Ra of the side surface 2D of the louver body 23, whose shape was formed by the mold 12 through transfer, was 18 nm. The louver of Example 17 was made by using the same method as that for the louver of Example 12, except for the coating material used for making the second light blocking portion 30. In Example 17, the coating raw material used was a solution in which an undiluted solution was diluted 20 times with organic solvent. The surface roughness Ra of the sixth surface 30B of the second light blocking portion 30 was 18 nm. The surface roughness Ra of the fifth surface 30A of the second light blocking portion 30 was 18 nm.

Comparative Example 5

No coating material is applied to the side surface 2D of the louver, and no second light blocking portion is formed. Otherwise, a louver sample was prepared in the same manner as in Comparative Example 1. Although there was no second light blocking portion, the surface roughness Ra of the side surface 2D of the louver was 100 nm.

Table 3 illustrates the evaluation results of the examples and the comparative example.

TABLE 3

| EVALUATION SAMPLE | SHAPE OF FIRST LIGHT BLOCKING PORTION | OUTER PERIPHERY OF SURFACE 2C | SURFACE ROUGHNESS Ra OF FIFTH SURFACE 30A OF SECOND LIGHT BLOCKING PORTION | SURFACE ROUGHNESS Ra OF SIXTH SURFACE 30B OF SECOND LIGHT BLOCKING PORTION | REFLECTION OF EXTERNAL LIGHT | REFLECTION OF DISPLAY LIGHT |
|---|---|---|---|---|---|---|
| EXAMPLE 12 | ANNULAR | COVERED | 8 nm | 100 nm | A | A |
| EXAMPLE 13 | ANNULAR | NOT COVERED | 8 nm | 100 nm | A− | A |
| EXAMPLE 14 | ANNULAR | COVERED | 18 nm | 1800 nm | A | A |
| EXAMPLE 15 | LINEAR | COVERED | 8 nm | 100 nm | A | A |
| EXAMPLE 16 | ANNULAR | COVERED | 20 nm | 20 nm | A− | A |
| EXAMPLE 17 | ANNULAR | COVERED | 18 nm | 18 nm | A | A− |
| COMPARATIVE EXAMPLE 5 | ANNULAR | NOT COVERED | — | — | B | B |

When the louver of each of Examples 12 to 17 was mounted in the head mounted display and used, it was possible to reduce the external light that significantly affects the quality of images, and that is reflected from the side surface of the louver. In Examples 12 to 17, the deterioration in contrast caused by the display light being reflected from the side surface of the louver was reduced. In particular, in Example 12 and Examples 14 to 17, the effect of suppressing the influence of scattered external light can also be obtained by covering the outer periphery of the surface 2C on the eye side with the second light-shielding portion 30.

In contrast, when the louver of Comparative Example 5 was mounted in the head mounted display and used, it was observed that scattering of external light and/or reflection of display light and cause the deterioration of quality of images.

The present invention is not limited to the above-described embodiments and examples, and can be variously modified in the technical concept of the present invention. The above-described different embodiments and examples may be combined with each other and embodied.

As an example, in the above-described manufacturing method, the surface roughness of the base portion that is a base of the light blocking portion was controlled by controlling the molding conditions such as the surface roughness of the transfer surface of the mold, and the surface roughness of the surface of the light blocking portion exposed to the outside after the light blocking material is applied is controlled by controlling the content of the solvent of the coating material or controlling the drying condition. However, the method of controlling the surface roughness of the light blocking portion is not limited to the method described as examples in the embodiments. For example, the surface roughness of the light blocking portion may be controlled by performing a cutting process or a blasting process on the surface of the light blocking portion exposed to the outside after the light blocking portion is coated with the light blocking material. In a case where the light blocking portion is formed through vacuum film coating (e.g., deposition), the surface roughness of the surface may be controlled by adjusting conditions of film coating.

Figure 14:
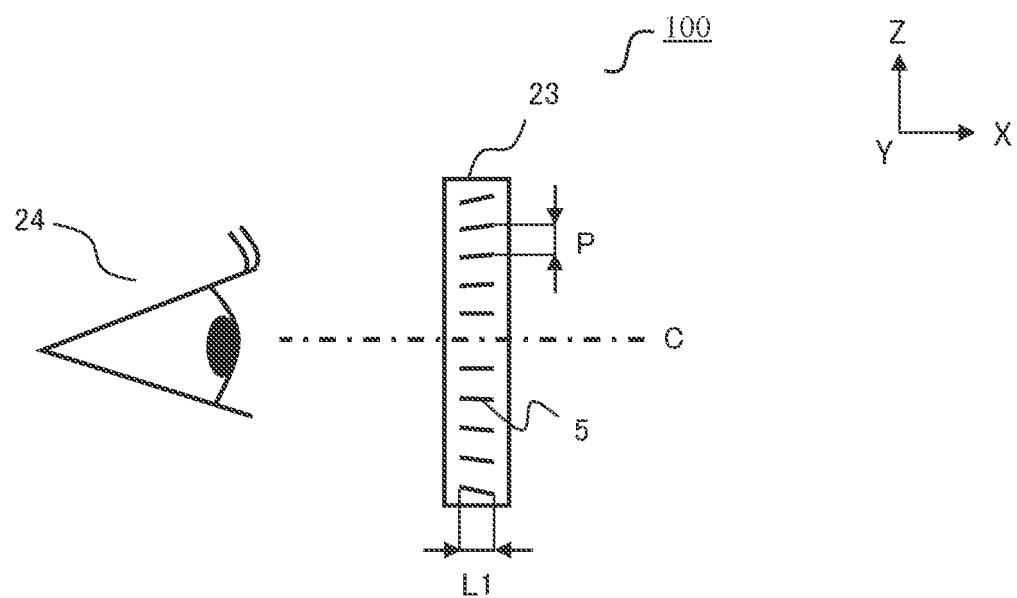
FIG. 14 is a schematic cross-sectional view illustrating an embodiment in which the slopes of main surfaces of a light blocking portion 5 vary.
Figure 15:
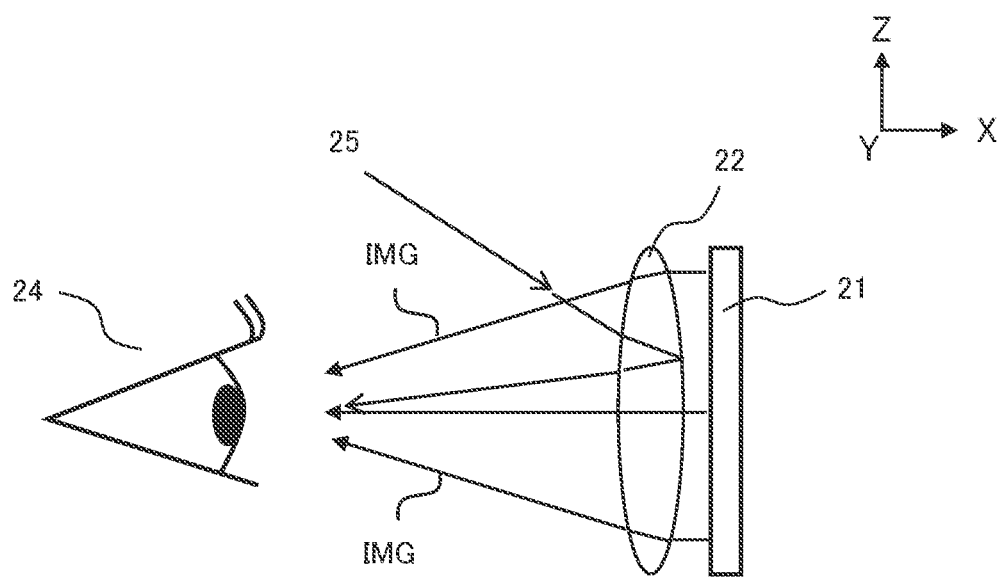
FIG. 15 is a schematic diagram illustrating a configuration of a conventional head mounted display.

In addition, the shape of the light blocking portion 5 is not limited to the shape illustrated as an example in FIG. 1, and may be modified as appropriate in accordance with the angle of view of the display panel 21 or the optical element 22. For example, as in FIG. 14 that illustrates a cross section, the slope of the main surface of the light blocking portion 5 may be changed more as the main surface is separated more from the center line C of the louver 23.

In addition, the shape of the light blocking portion 5 in a plan view is not limited to the plurality of concentric circles illustrated in FIG. 3B and the shape of stripes as illustrated in FIG. 3C. The shape of the light blocking portion 5 in a plan view may be a shape of arcs of a plurality of concentric circles having different diameters, or a shape of a plurality of ellipses or polygons having different diameters.

In addition, the method of evaluating the quality of images is not limited to the method of the above-described examples. For example, for evaluating the deterioration of quality of images caused by the display light being reflected from the main surface of the light blocking portion, various charts including a checked pattern and a checkered pattern may be displayed on the display panel, and uniformity of an image in a screen, contrast, sharpness, and the like may be evaluated by an observer through subjective evaluation.

In addition, for evaluating the deterioration of quality of images caused by the external light and the stray light, produced by the external light reflected in the housing, being reflected from the main surface of the light blocking portion, the deterioration of quality of images may be evaluated by an observer through subjective evaluation in a state where a black screen is displayed on the display panel and the LED lamp is turned on and off.

The louver of the present invention may be mounted in another optical apparatus other than the head mounted display. Examples of the other optical apparatus include a handheld display, a camera that captures still and/or moving images, a microscope, and an endoscope.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-118034, filed Jul. 16, 2021, Japanese Patent Application No. 2022-45093, filed Mar. 22, 2022, and Japanese Patent Application No. 2022-97691, filed Jun. 17, 2022, which are hereby incorporated by reference herein in their entirety.

What is claimed is:

1. A louver comprising:
a light blocking portion including a first surface and a second surface; and
a base portion made of a transparent material,
wherein the light blocking portion is formed in the base portion, being made of a light blocking material,
wherein the second surface is a surface that is in contact with the transparent material and that is located on an outer-edge side of the base portion,
wherein the first surface is a surface that is in contact with the transparent material and that is opposite to the second surface,
wherein a surface roughness of the first surface is larger than a surface roughness of the second surface, and
wherein a surface roughness Ra of the first surface is equal to or larger than 20 nm and is equal to or smaller than 2000 nm.

2. The louver according to claim 1, wherein a surface roughness Ra of the second surface is equal to or smaller than 20 nm.

3. A head mounted display comprising:
the louver according to claim 1;
a display panel; and
an optical portion configured to transmit display light outputted from the display panel, toward a user's eye,
wherein the louver is disposed on an optical path extending from the optical portion toward the user's eye.

4. An optical apparatus comprising:
the louver according to claim 1; and
a housing that supports the louver.

* * * * *